US012125468B2

(12) United States Patent
Yamanashi et al.

(10) Patent No.: US 12,125,468 B2
(45) Date of Patent: Oct. 22, 2024

(54) AUDIO PROCESSING SYSTEM, AUDIO PROCESSING DEVICE, AND AUDIO PROCESSING METHOD

(71) Applicant: Panasonic Intellectual Property Management Co., Ltd., Osaka (JP)

(72) Inventors: Tomofumi Yamanashi, Kanagawa (JP); Yutaka Banba, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 170 days.

(21) Appl. No.: 17/895,319

(22) Filed: Aug. 25, 2022

(65) Prior Publication Data

US 2022/0406286 A1 Dec. 22, 2022

Related U.S. Application Data

(63) Continuation of application No. PCT/JP2021/005114, filed on Feb. 10, 2021.

(30) Foreign Application Priority Data

Mar. 18, 2020 (JP) ................................ 2020-048463

(51) Int. Cl.
*G10K 11/178* (2006.01)
*G10L 21/0208* (2013.01)
(Continued)

(52) U.S. Cl.
CPC ....... *G10K 11/17854* (2018.01); *H04R 1/406* (2013.01)

(58) Field of Classification Search
None
See application file for complete search history.

(56) References Cited

U.S. PATENT DOCUMENTS 8,130,941 B2 3/2012 Taniguchi et al.
8,644,494 B2 2/2014 Taniguchi et al.
(Continued)

FOREIGN PATENT DOCUMENTS

CA 2832848 A1 * 5/2014 .............. H04R 3/00
JP 2009276528 A 11/2009
(Continued)

OTHER PUBLICATIONS

International Search Report, mailed Apr. 20, 2021, for International Patent Application No. PCT/JP2021/005114. (2 pages).

*Primary Examiner* — Qin Zhu
(74) *Attorney, Agent, or Firm* — Seed IP Law Group LLP

(57) ABSTRACT

An audio processing system includes at least one first microphone, at least one adaptive filter, and a processor. The at least one first microphone acquires a first audio signal and outputs a first signal based on the first audio signal. The first audio signal includes at least one of a first audio component generated at a first position and a second audio component generated at a second position different from the first position. The first signal is input to the at least one adaptive filter. The at least one adaptive filter outputs a passing signal based on the first signal. The processor, when executing a program stored in a memory, performs: making a determination of which of the first audio component and the second audio component the first audio signal includes more; and controlling a filter coefficient of the adaptive filter based on a result of the determination.

9 Claims, 22 Drawing Sheets

(51) Int. Cl.

| | |
|---|---|
| ***H04R 1/40*** | (2006.01) |
| ***H04R 3/00*** | (2006.01) |
| ***H04S 7/00*** | (2006.01) |

(56) References Cited

U.S. PATENT DOCUMENTS

| | | | | |
|---|---|---|---|---|
| 8,644,495 | B2 | 2/2014 | Taniguchi et al. | |
| 10,424,315 | B1 * | 9/2019 | Ganeshkumar | H04R 1/1008 |
| 10,863,296 | B1 * | 12/2020 | Thoshkahna | H04R 29/005 |
| 2008/0317254 | A1 * | 12/2008 | Kano | G10K 11/17857 381/71.4 |
| 2013/0073283 | A1 | 3/2013 | Yamabe | |
| 2015/0256660 | A1 * | 9/2015 | Kaller | H04M 1/585 379/391 |
| 2018/0190282 | A1 * | 7/2018 | Mohammad | G10K 11/178 |
| 2020/0219493 | A1 * | 7/2020 | Li | G10L 15/22 |
| 2020/0357377 | A1 * | 11/2020 | Bastyr | G10K 11/17817 |
| 2021/0264936 | A1 * | 8/2021 | Miyamoto | G10L 21/0232 |

FOREIGN PATENT DOCUMENTS

| | | | |
|---|---|---|---|
| JP | 4889810 | B2 | 3/2012 |
| JP | 2013078117 | A | 4/2013 |

* cited by examiner

AUDIO PROCESSING SYSTEM, AUDIO PROCESSING DEVICE, AND AUDIO PROCESSING METHOD

CROSS-REFERENCE TO RELATED APPLICATIONS

This application is a continuation of International Application No. PCT/JP2021/005114, filed on Feb. 10, 2021 which claims the benefit of priority of the prior Japanese Patent Application No. 2020-048463, filed on Mar. 18, 2020, the entire contents of which are incorporated herein by reference.

FIELD

The present disclosure relates to an audio processing system, an audio processing device, and an audio processing method.

BACKGROUND

In a vehicle-mounted voice recognition device and a hands-free call, an echo canceller for removing surrounding voice and recognizing only voice of a speaker is known. Japanese Patent No. 4889810 discloses an echo canceller that switches the number of adaptive filters to operate and the number of taps in accordance with the number of voice sources.

When echo cancellation is performed by using an adaptive filter, surrounding voice collected by a voice collection device is input to the adaptive filter as a reference signal. For example, when voice collection devices are provided to address, one by one, voice sources that can emit voice and one reference signal is output from one voice collection device, voice included in the reference signal can be identified as having occurred at a position of a voice source addressed by a voice collection device from which the reference signal has been input. Target voice can be obtained by subtracting the reference signal from a signal including the target voice in consideration of the generation position of surrounding voice included in the reference signal.

In contrast, when the number of voice collection devices is smaller than the number of voice sources that can emit voice, one reference signal may include voice from a plurality of voice sources. In that case, the position where the voice included in the reference signal is generated cannot be identified only from the reference signal. Therefore, it may be difficult to obtain target voice by removing surrounding voice. It is beneficial if target voice can be obtained by removing surrounding voice even when the number of voice collection devices is smaller than the number of voice sources that can emit voice. Furthermore, it is beneficial if an amount of processing for obtaining target voice by removing surrounding voice can be reduced.

The present disclosure relates to an audio processing system, an audio processing device, and an audio processing method capable of solving at least one of the above-described problems in echo cancellation using an adaptive filter.

SUMMARY

An audio processing system according to an aspect of the present disclosure includes at least one first microphone, at least one adaptive filter, a memory, and a processor coupled to the memory. The at least one first microphone acquires a first audio signal and outputs a first signal based on the first audio signal. The first audio signal includes at least one of a first audio component generated at a first position and a second audio component generated at a second position different from the first position. The first signal is input to the at least one adaptive filter. The at least one adaptive filter outputs a passing signal based on the first signal. The processor, when executing a program stored in the memory, performs: making a determination of which of the first audio component and the second audio component the first audio signal includes more; and controlling a filter coefficient of the adaptive filter based on a result of the determination.

An audio processing device according to an aspect of the present disclosure includes a memory and a processor coupled to the memory. The processor when executing a program stored in the memory, performs receiving at least one first signal based on a first audio signal including at least one of a first audio component generated at a first position and a second audio component generated at a second position different from the first position. The audio processing device further includes at least one adaptive filter that outputs a passing signal based on the first signal. The processor further performs: making a determination of which of the first audio component and the second audio component the first audio signal includes more; and controlling a filter coefficient of the adaptive filter based on a result of the determination.

An audio processing method according to an aspect of the present disclosure includes: receiving a first signal based on a first audio signal including at least one of a first audio component generated at a first position and a second audio component generated at a second position different from the first position; the first signal being input to at least one adaptive filter and the at least one adaptive filter outputting a passing signal based on the first signal; making a determination of which of the first audio component and the second audio component the first audio signal includes more; and controlling a filter coefficient of the adaptive filter based on a result of the determination.

Note that these comprehensive or specific aspects may be implemented by a system, a method, an integrated circuit, a computer program, or a recording medium, or may be implemented by any combination of a system, a device, a method, an integrated circuit, a computer program, and a recording medium.

DETAILED DESCRIPTION

Embodiments of the present disclosure will be described in detail below with appropriate reference to the drawings. Note, however, that unnecessarily detailed description may be omitted. Note that the accompanying drawings and the following description are provided for those skilled in the art to fully understand the present disclosure, and are not intended to limit the subject matter described in the claims.

First Embodiment

Figure 1:
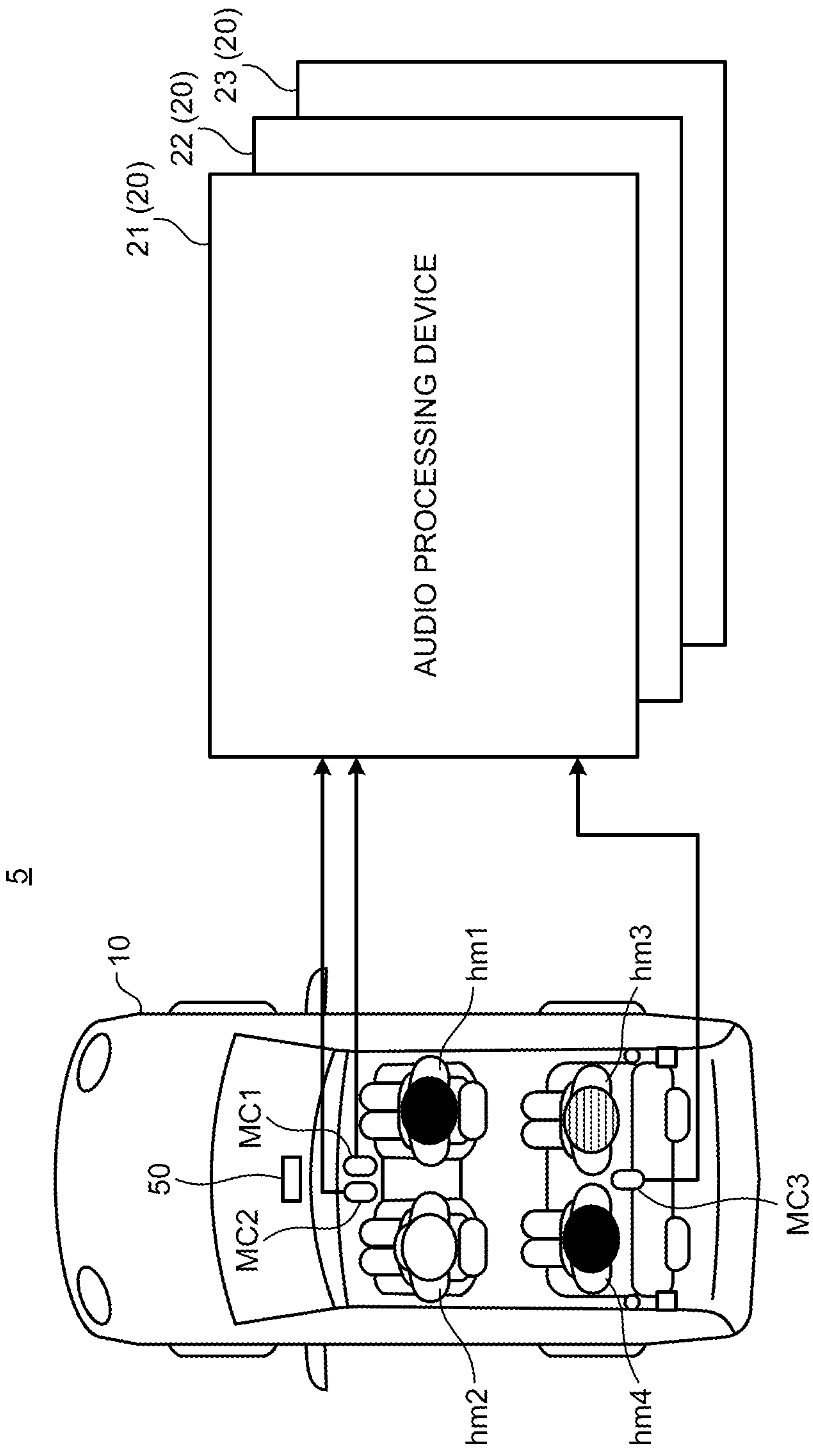
FIG. 1 illustrates one example of the schematic configuration of an audio processing system in a first embodiment.

FIG. 1 illustrates one example of the schematic configuration of an audio processing system 5 according to a first embodiment. The audio processing system 5 is mounted on a vehicle 10, for example. An example in which the audio processing system 5 is mounted on the vehicle 10 will be described below. A plurality of seats is provided in the interior of the vehicle 10. The plurality of seats includes, for example, four seats of a driver seat, a passenger seat, and right and left rear seats. The right rear seat is one example of a first position. The left rear seat is one example of a second position. The number of seats is not limited thereto. The audio processing system 5 includes a microphone MC1, a microphone MC2, a microphone MC3, and audio processing devices 20. The outputs of the audio processing devices 20 are input to a voice recognition engine (not illustrated). A voice recognition result from the voice recognition engine is input to an electronic device 50.

The microphone MC1 collects voice uttered by a driver hm1. In other words, the microphone MC1 acquires an audio signal including an audio component uttered by the driver hm1. The microphone MC1 is disposed on the right side of an overhead console, for example. The microphone MC2 collects voice uttered by an occupant hm2. In other words, the microphone MC2 acquires an audio signal including an audio component uttered by the occupant hm2. The microphone MC2 is disposed on the left side of the overhead console, for example. The microphone MC3 collects voice uttered by an occupant hm3 and voice uttered by an occupant hm4. In other words, the microphone MC3 acquires audio signals including an audio component uttered by the occupant hm3 and an audio component uttered by the occupant hm4. The microphone MC3 is disposed near the center of the ceiling of the rear seats, for example. The microphone MC1 is located farther from the right seat of the rear seats than the microphone MC3 is. The microphone MC2 is located farther from the left seat of the rear seats than the microphone MC3 is.

The arrangement positions of the microphone MC1, the microphone MC2, and the microphone MC3 are not limited to the described example. For example, the microphone MC1 may be disposed on the right front surface of a dashboard. The microphone MC2 may be disposed on the left front surface of the dashboard.

Each microphone may be a directional microphone or an omnidirectional microphone. Each microphone may be a small micro electro mechanical systems (MEMS) microphone or an electret condenser microphone (ECM). Each microphone may be a microphone capable of performing beamforming. For example, each microphone may be a microphone array that has directionality in a direction of each seat and that can collect voice in a directional method.

In the embodiment, the audio processing system 5 includes a plurality of audio processing devices 20 that address the respective microphones. Specifically, the audio processing system 5 includes an audio processing device 21, an audio processing device 22, and an audio processing device 23. The audio processing device 21 addresses the microphone MC1. The audio processing device 22 addresses the microphone MC2. The audio processing device 23 addresses the microphone MC3. The audio processing device 21, the audio processing device 22, and the audio processing device 23 may be collectively referred to as the audio processing devices 20 below.

Although, in the configuration in FIG. 1, the audio processing device 21, the audio processing device 22, and the audio processing device 23 are described as being configured by different pieces of hardware, one audio processing device 20 may implement the functions of the audio processing device 21, the audio processing device 22, and the audio processing device 23. Alternatively, some of the audio processing device 21, the audio processing device 22, and the audio processing device 23 may be configured by common hardware, and the others may be configured by different pieces of hardware.

In the embodiment, each of the audio processing devices 20 is disposed in each seat near each corresponding microphone. For example, the audio processing device 21 is disposed in the driver seat. The audio processing device 22 is disposed in the passenger seat. The audio processing device 23 is disposed in a rear seat. Each of the audio processing devices 20 may be disposed in the dashboard.

Figure 2:
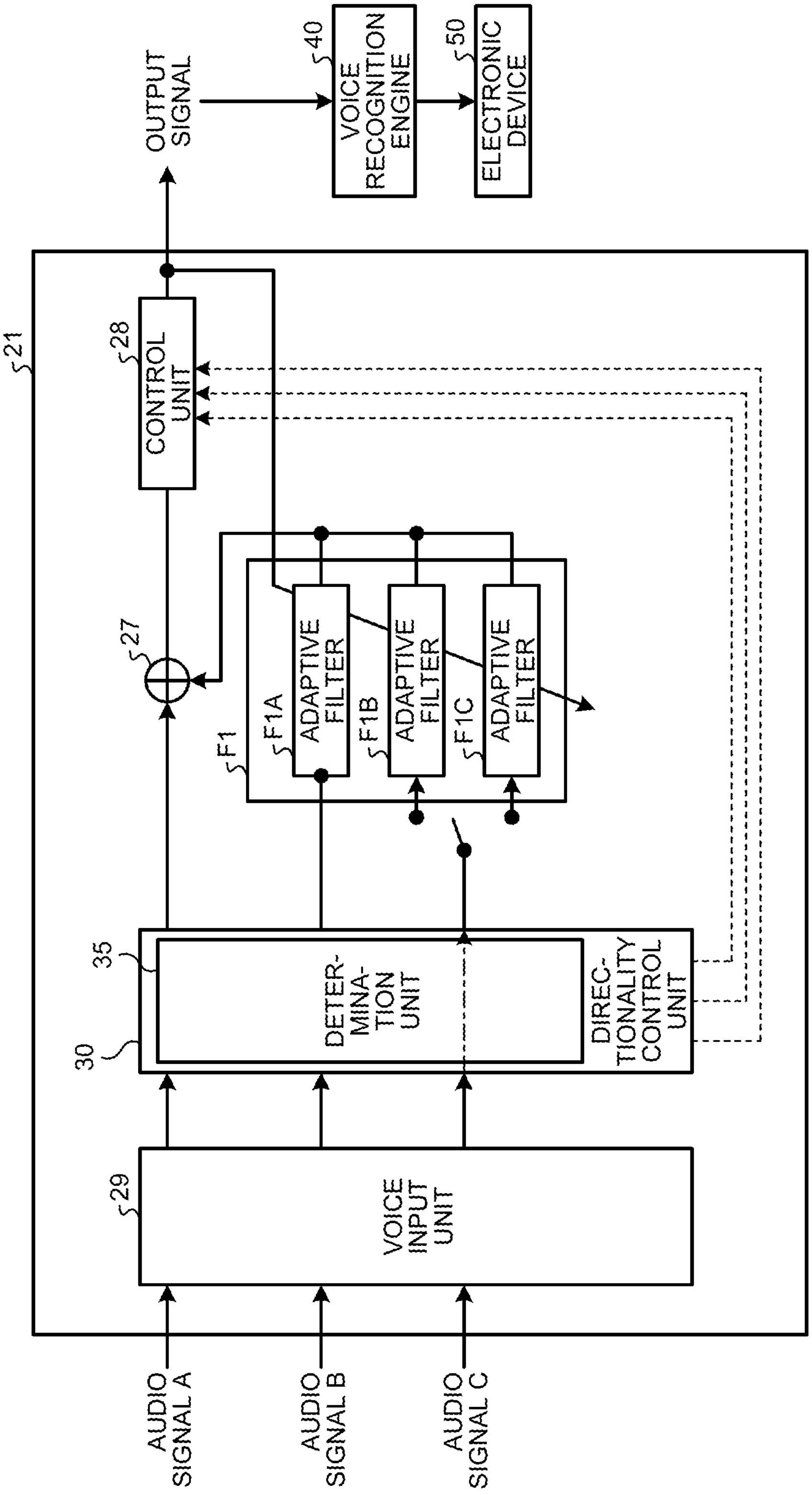
FIG. 2 is a block diagram illustrating the configuration of an audio processing device in the first embodiment.

FIG. 2 is a block diagram illustrating the configuration of the audio processing system 5 and the configuration of the audio processing device 21. As illustrated in FIG. 2, the audio processing system 5 further includes a voice recognition engine 40 and the electronic device 50 in addition to the audio processing device 21, the audio processing device 22, and the audio processing device 23. The outputs of the audio processing devices 20 are input to the voice recognition engine 40. The voice recognition engine 40 recognizes voice included in an output signal from at least one of the audio processing devices 20, and outputs a voice recognition result. The voice recognition engine 40 generates a voice recognition result and a signal based on the voice recognition result. The signal based on the voice recognition result is, for example, an operation signal of the electronic device 50. A voice recognition result from the voice recognition engine 40 is input to the electronic device 50. The voice recognition engine 40 may be a device separate from the audio processing device 20. The voice recognition engine 40 is disposed inside a dashboard, for example. The voice recognition engine 40 may be accommodated and disposed inside a seat. Alternatively, the voice recognition engine 40 may be an integrated device incorporated into the audio processing device 20.

A signal output from the voice recognition engine 40 is input to the electronic device 50. The electronic device 50 performs, for example, an operation of addressing an operation signal. The electronic device 50 is disposed on, for example, the dashboard of the vehicle 10. The electronic device 50 is, for example, a car navigation device. The electronic device 50 may be a panel meter, a television, or a mobile terminal.

Although FIG. 1 illustrates a case where four people are on the vehicle, the number of people who are on the vehicle is not limited thereto. The number of occupants is only required to be equal to or less than the maximum riding capacity of the vehicle. For example, when the vehicle has the maximum riding capacity of six, the number of occupants may be six, or may be five or less.

All of the audio processing device 21, the audio processing device 22, and the audio processing device 23 have similar configurations and functions except for a part of the configuration of a filter unit to be described later. Here, the audio processing device 21 will be described. The audio processing device 21 sets voice uttered by the driver hm1 as a target component. Here, being sett as a target component means being set as an audio signal to be acquired. The audio processing device 21 outputs, as an output signal, an audio signal obtained by inhibiting a crosstalk component of an audio signal collected by the microphone MC1. Here, the crosstalk component is a noise component including a voice of an occupant other than an occupant who utters the voice set as the target component.

As illustrated in FIG. 2, the audio processing device 21 includes a voice input unit 29, a directionality control unit 30, a filter unit F1, a control unit 28, and an addition unit 27. The directionality control unit 30 may be directionality control circuitry. The control unit 28 may be control circuitry. The filter unit F1 includes a plurality of adaptive filters. The control unit 28 controls the filter coefficients of the plurality of adaptive filters.

Each of the microphone MC1, the microphone MC2, and the microphone MC3 collects voice, and outputs a signal based on an audio signal of the collected voice to the voice input unit 29. The audio signals of voice collected by the microphone MC1, the microphone MC2, and the microphone MC3 are input to the voice input unit 29.

The microphone MC1 outputs an audio signal A to the voice input unit 29. The audio signal A includes voice of the driver hm1 and noise including voice of an occupant other than the driver hm1. Here, in the audio processing device 21, the voice of the driver hm1 is a target component, and the noise including voice of an occupant other than the driver hm1 is a crosstalk component. The microphone MC1 corresponds to a second microphone. Voice collected by the microphone MC1 corresponds to a second audio signal. The voice of an occupant other than the driver hm1 includes at least one of voice of the occupant hm3 and voice of the occupant hm4. The audio signal A corresponds to a second signal.

The microphone MC2 outputs an audio signal B to the voice input unit 29. The audio signal B includes voice of the occupant hm2 and noise including voice of an occupant other than the occupant hm2. The microphone MC2 corresponds to a third microphone. Voice collected by the microphone MC2 corresponds to a third audio signal. The voice of an occupant other than the occupant hm2 includes at least one of voice of the occupant hm3 and voice of the occupant hm4. The audio signal B corresponds to a third signal.

The microphone MC3 outputs an audio signal C to the voice input unit 29. The audio signal C includes voice of the occupant hm3, voice of the occupant hm4, and noise including voice of an occupant other than the occupant hm3 and the occupant hm4. The microphone MC3 corresponds to a first microphone. Voice collected by the microphone MC3 corresponds to a first audio signal. Voice of the occupant hm3 corresponds to a first audio component, and voice of the occupant hm4 corresponds to a second audio component. The audio signal C corresponds to a first signal.

The voice input unit 29 outputs the audio signal A, the audio signal B, and the audio signal C. The voice input unit 29 corresponds to a reception unit, which may be reception circuitry.

Although, in the embodiment, the audio processing device 21 includes one voice input unit 29 to which audio signals from all the microphones are input, the audio processing device 21 may include the voice input unit 29 to which a corresponding audio signal is input for each microphone. For example, an audio signal of voice collected by the microphone MC1 may be input to a voice input unit corresponding to the microphone MC1. An audio signal of voice collected by the microphone MC2 may be input to another voice input unit corresponding to the microphone MC2. An audio signal of voice collected by the microphone MC3 may be input to another voice input unit corresponding to the microphone MC3.

The audio signal A, the audio signal B, and the audio signal C output from the voice input unit 29 are input to the directionality control unit 30. The directionality control unit 30 performs directionality control processing by using the audio signal A and the audio signal B. In the directionality control processing, an audio signal including more voice in a target direction is generated based on, for example, an audio signal. The directionality control processing is, for example, beamforming. Then, the directionality control unit 30 outputs a first directional signal obtained by performing the directionality control processing on the audio signal A. For example, the directionality control unit 30 obtains the first directional signal by performing the directionality control processing on the audio signal A so that the audio signal A includes more voice in a direction from the microphone MC1 toward the driver seat. Furthermore, the directionality control unit 30 outputs a second directional signal obtained by performing the directionality control processing on the audio signal B. For example, the directionality control unit 30 obtains the second directional signal by performing the directionality control processing on the audio signal B so that the audio signal B includes more voice in a direction from the microphone MC2 toward the passenger seat.

Furthermore, the directionality control unit 30 includes a determination unit 35. The determination unit 35 may be determination circuitry. The determination unit 35 determines whether an audio component has been input to the microphone MC3. For example, the determination unit 35 determines that an audio signal has been input to the microphone MC3 when the audio signal C has a strength greater than at least one of the strength of the first directional signal and the strength of the second directional signal, and determines that an audio signal has not been input to the microphone MC3 when this is not the case.

Furthermore, the determination unit 35 determines which of voice of the occupant hm3 and voice of the occupant hm4 the audio signal C includes more. In the embodiment, the determination unit 35 determines which of voice of the occupant hm3 and voice of the occupant hm4 the audio signal C includes more based on the first directional signal and the second directional signal. In other words, the determination unit 35 determines which of voice of the occupant hm3 and voice of the occupant hm4 the audio signal C includes more based on the audio signal A and the audio signal B. For example, when the occupant hm3 gives utterance and the occupant hm4 does not give utterance, the audio signal C includes voice of the occupant hm3, and does not include voice of the occupant hm4. It is, however, difficult to determine which of voice of the occupant hm3 and voice of the occupant hm4 is included only by the audio signal C. Thus, the determination unit 35 determines which of voice of the occupant hm3 and voice of the occupant hm4 the audio signal C includes more in the following method. Here, a case of "the audio signal C includes more voice of the occupant hm3" also includes a case where the audio signal C includes voice of the occupant hm3 and does not include voice of the occupant hm4. For example, the determination unit 35 compares the strength of the first directional signal with that of the second directional signal. Then, when the first directional signal has a strength greater than the strength of the second directional signal, the determination unit 35 determines that the audio signal C includes more voice of the occupant hm3. Alternatively, when the second directional signal has a strength greater than the strength of the first directional signal, the determination unit 35 determines that the audio signal C includes more voice of the occupant hm4. The determination unit 35 may determine which voice the audio signal C includes more based on the strength of the first directional signal and the strength of the second directional signal at the timing when the audio signal C is maximized. The strength of a signal may also be referred to as the magnitude of a signal or the level of a signal.

Although, in the embodiment, the determination unit 35 of the directionality control unit 30 determines whether an audio component has been input to the microphone MC3 and which of voice of the occupant hm3 and voice of the occupant hm4 the audio signal C includes more, the audio processing device 21 may include the determination unit 35 separately from the directionality control unit 30. In that case, the determination unit 35 is connected between the voice input unit 29 and the directionality control unit 30, for example. For example, the function of the determination unit 35 is implemented by a processor executing a program held in a memory. The function of the determination unit 35 may be implemented by hardware. Alternatively, the audio processing device 21 may include only the determination unit 35, and is not required to include the directionality control unit 30. For example, the determination unit 35 may determine that an audio signal has been input to the microphone MC3 when the audio signal C has a strength greater than at least one of the strength of the audio signal A and the strength of the audio signal B, and determine that an audio signal has not been input to the microphone MC3 when this is not the case. Furthermore, for example, the determination unit 35 may determine which of voice of the occupant hm3 and voice of the occupant hm4 the audio signal C includes more based on the audio signal A and the audio signal B.

Here, the reason why voice of which occupant the audio signal C includes more can be determined by comparing the strength of the first directional signal with that of the second directional signal will be described. Since the voice uttered by the occupant hm3 on the right seat of the rear seats advances forward, the microphone MC1 and the microphone MC2 also collect the voice. The distance between the right seat of the rear seats and the microphone MC2 is greater than the distance between the right seat of the rear seats and the microphone MC1. Therefore, voice of the occupant hm3 is more attenuated until the microphone MC2 collects the voice. Furthermore, when the directionality control unit 30 performs the directionality control processing on the audio signal A, for example, processing of including more voice in a direction from the microphone MC1 toward the driver seat is performed. A direction of arrival of voice of the occupant hm3 to the microphone MC1 is closer to a direction from the microphone MC1 toward the driver seat than a direction of arrival of voice of the occupant hm4 to the microphone MC1 is. Thus, when the occupant hm3 gives utterance, the first directional signal has a strength greater than that of the second directional signal.

The same applies to voice of the occupant hm4. That is, since the distance between the left seat of the rear seats and the microphone MC1 is greater than the distance between the left seat of the rear seats and the microphone MC2, voice of the occupant hm4 is more attenuated until the microphone MC1 collects the voice. A direction of arrival of voice of the occupant hm4 to the microphone MC2 is closer to a direction from the microphone MC2 toward the passenger seat than a direction of arrival of voice of the occupant hm3 to the microphone MC2 is. Thus, when the occupant hm4 gives utterance, the second directional signal has a strength greater than that of the first directional signal.

Figure 3A:
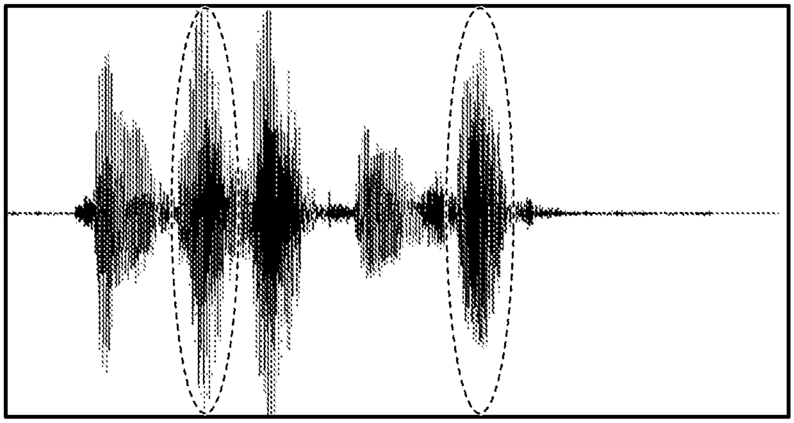
FIG. 3A illustrates a time waveform of an audio signal (audio signal C) used in the audio processing device.
Figure 3B:
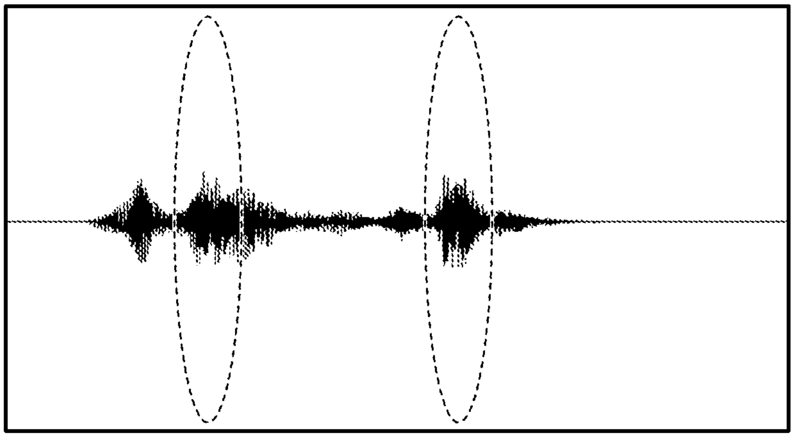
FIG. 3B illustrates a time waveform of an audio signal (first directional signal) used in the audio processing device.
Figure 3C:
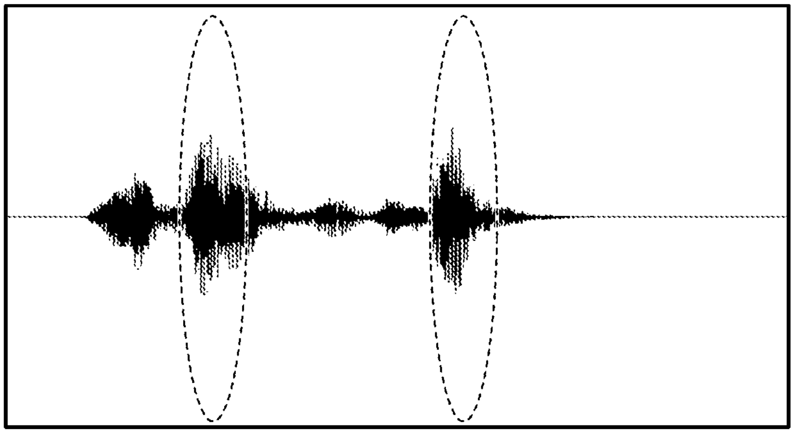
FIG. 3C illustrates a time waveform of an audio signal (second directional signal) used in the audio processing device.

Determination of voice of which occupant the audio signal C includes more will be specifically described with reference to FIGS. 3A, 3B, 3C, and 4. FIGS. 3A, 3B, and 3C illustrate time waveforms of the audio signal C, the first directional signal, and the second directional signal output from the directionality control unit 30, respectively. The vertical axes represent time, and the horizontal axes represent amplitude. Two peaks of a time waveform in FIG. 3A are surrounded by broken lines. Furthermore, substantially the same positions as those of the peaks surrounded by the broken lines in FIG. 3A are also surrounded by broken lines in FIGS. 3B and 3C. It can be seen that peaks appear also in FIGS. 3B and 3C at positions similar to those of the peaks appearing in FIG. 3A, and that peaks appearing in FIG. 3C are larger than peaks appearing in FIG. 3B by comparing the portions surrounded by the broken lines with each other. Therefore, it can be seen that the second directional signal includes more components derived from the audio signal C than the first directional signal.

Figure 4:
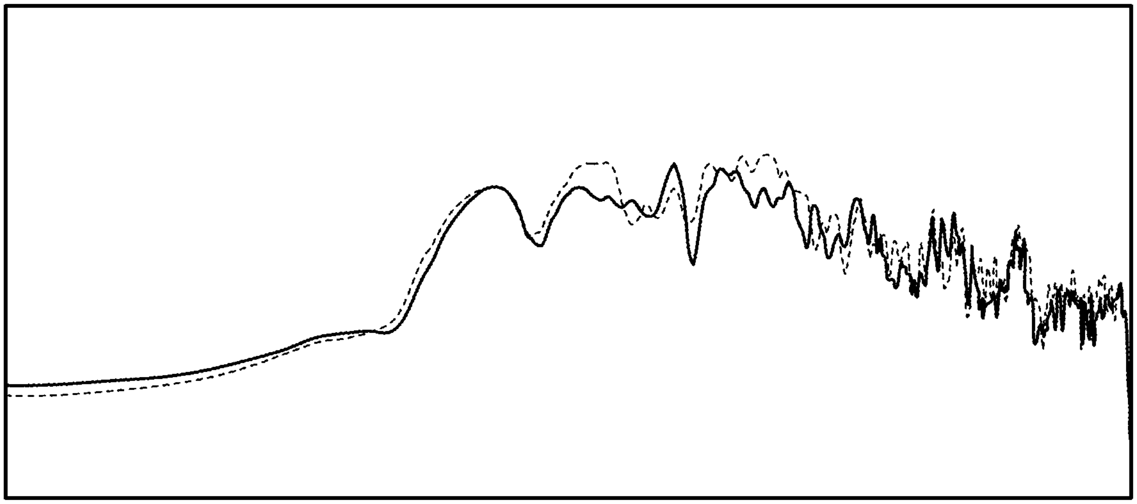
FIG. 4 illustrates an averaged frequency spectrum of an audio signal used in the audio processing device.

FIG. 4 is obtained by averaging frequency spectra of the time waveforms in FIGS. 3B and 3C. In FIG. 4, a solid line indicates a frequency spectrum of the strength of the first directional signal, and a broken line indicates a frequency spectrum of the strength of the second directional signal. In the example in FIG. 4, if a value of a root mean square of a strength within a predetermined time range is calculated, the second directional signal is approximately 3.5 dB larger than the first directional signal. In this example, the audio signal C is determined to include more voice of the occupant hm4.

A method of determining which of voice of the occupant hm3 and voice of the occupant hm4 the audio signal C includes more is not limited to the above-described method. For example, the vehicle 10 may have seating information on whether each seat has an occupant. The determination unit 35 may make the determination based on the seating information received from the vehicle 10. For example, when receiving, from the vehicle 10, seating information indicating that the right seat of the rear seats has an occupant and a left seat of the rear seats has no occupant, the determination unit 35 may determine that the audio signal C includes more voice of the occupant hm3.

Alternatively, the vehicle 10 may include a camera and an image analysis unit. The camera captures an image of each occupant. The image analysis unit analyzes the image captured by the camera. The determination unit 35 may make a determination based on an image analysis result from the image analysis unit. For example, when receiving, from the image analysis unit, an image analysis result indicating that the mouth of the occupant hm3 is open and the mouth of the occupant hm4 is closed in an image, the determination unit 35 may determine that the audio signal C includes more voice of the occupant hm3.

Alternatively, the determination unit 35 may make a determination from the last determination result. For example, when the audio signal C is determined to include more voice of the occupant hm3, the audio signal C may continue to be determined to include more voice of the occupant hm3 until the audio signal C has a certain strength or less. This is because, when utterance continues, utterance of the same occupant is highly likely to continue.

The determination unit 35 outputs, to the control unit 28, a result of determination of whether an audio component has been input to the microphone MC3 and a result of determination of which of voice of the occupant hm3 and voice of the occupant hm4 the audio signal C includes more. The determination unit 35 outputs the determination result to the control unit 28 as, for example, a flag. The flag indicates a value of "0" or "1". Here, "0" indicates that no audio component has been input to the microphone MC3, and "1" indicates that an audio component has been input to the microphone MC3. Alternatively, "0" indicates that the audio signal C includes more voice of the occupant hm3, and "1" indicates that the audio signal C includes more voice of the occupant hm4. For example, when the audio signal C includes more voice of the occupant hm3, the determination unit 35 outputs a flag "1, 0" to the control unit 28 as a determination result. Among the two flags in this example, the first flag indicates a result of determination of whether an audio component has been input to the microphone MC3, and the second flag indicates a result of determination of voice of which occupant the audio signal includes more. The determination unit 35 may be allowed to determine a case where the audio signal C includes more voice of the occupant hm3, a case where the audio signal C includes more voice of the occupant hm4, and a case where the audio signal C equally includes voice of the occupant hm3 and voice of the occupant hm4. The determination unit 35 may simultaneously output a result of determination of whether an audio component has been input to the microphone MC3 and a result of determination of which of voice of the occupant hm3 and voice of the occupant hm4 the audio signal C includes more. Alternatively, the determination unit 35 may output a result of determination of whether or not an audio component has been input at the time of completion of determination of whether an audio component has been input to the microphone MC3. Next, the determination unit 35 may output a result of determination of voice of which occupant the audio signal includes more at the time of completion of determination of voice of which occupant the audio signal includes more.

Furthermore, the directionality control unit 30 outputs the first directional signal to the addition unit 27, and outputs the second directional signal and the audio signal C to the filter unit F1.

The filter unit F1 includes an adaptive filter F1A, an adaptive filter F1B, and an adaptive filter F1C. The adaptive filter has a function of changing characteristics in a process of signal processing. The filter unit F1 is used for processing of inhibiting a crosstalk component other than voice of the driver hm1 included in voice collected by the microphone MC1. Although, in the embodiment, the filter unit F1 includes three adaptive filters, the number of adaptive filters is appropriately set based on the number of input audio signals and a processing amount of the crosstalk inhibiting processing. The processing of inhibiting crosstalk will be described in detail later.

The second directional signal is input to the adaptive filter F1A as a reference signal. The adaptive filter F1A outputs a passing signal P1A based on a filter coefficient C1A and the second directional signal. When the audio signal C is determined to include more voice of the occupant hm3, the audio signal C is input to the adaptive filter F1B as a reference signal. The adaptive filter F1B outputs a passing signal P1B based on a filter coefficient C1B and the audio signal C. In contrast, when the audio signal C is determined to include more voice of the occupant hm4, the audio signal C is input to the adaptive filter F1C as a reference signal. When the determination unit 35 can determine a case where the audio signal C includes more voice of the occupant hm3, a case where the audio signal C includes more voice of the occupant hm4, and a case where the audio signal C equally includes voice of the occupant hm3 and voice of the occupant hm4, the filter unit F1 may include an adaptive filter F1D. When the audio signal C is determined to equally include voice of the occupant hm3 and voice of the occupant hm4, the audio signal C is input to the adaptive filter F1D as a reference signal. The adaptive filter F1C outputs a passing signal P1C based on a filter coefficient C1C and the audio signal C. The filter unit F1 adds together and outputs the passing signal P1A and the passing signal P1B or the passing signal P1C. When the filter unit F1 includes the adaptive filter F1D, the adaptive filter F1D outputs a passing signal P1D based on a filter coefficient C1D and the audio signal C. The filter unit F1 adds together and outputs the passing signal P1A and any one of the passing signal P1B, the passing signal P1C, and the passing signal P1D. In the embodiment, the adaptive filter F1A, the adaptive filter F1B, and the adaptive filter F1C are implemented by a processor executing a program. The adaptive filter F1A, the adaptive filter F1B, and the adaptive filter F1C may have physically separated different hardware configurations.

Here, the operation of the adaptive filter will be outlined. The adaptive filter is used for inhibiting a crosstalk component. For example, when least mean square (LMS) is used as filter coefficient update algorithm, the adaptive filter minimizes a cost function defined by a root mean square of an error signal. The error signal here is the difference between an output signal and a target component.

Here, a finite impulse response (FIR) filter is exemplified as the adaptive filter. Other types of adaptive filters may be used. For example, an infinite impulse response (IIR) filter may be used.

When the audio processing device 21 uses one FIR filter as the adaptive filter, the error signal, which is the difference between an output signal of the audio processing device 21 and a target component, is expressed by Expression (1) below.

$$e(n)=d(n)-\Sigma_{i=1}^{l-1}w_i x(n-i) \quad (1)$$

Here, n represents time, e(n) represents an error signal, d(n) represents a target component, wi represents a filter coefficient, x(n) represents a reference signal, and l represents a tap length. As the tap length l is increased, the adaptive filter can faithfully reproduce the acoustic characteristics of an audio signal. When there is no reverberation, the tap length I may be set as l. For example, the tap length l is set to a certain value. For example, when the target component is voice of the driver hm1, the reference signal x(n) is the second directional signal and the audio signal C.

The control unit 28 controls the filter coefficient of the adaptive filter based on a determination result of the determination unit 35. In the embodiment, the control unit 28 determines to which of an adaptive filter FB and an adaptive filter FC the audio signal C is to be input based on a flag serving as a determination result output from the determination unit 35. A filter coefficient CB of the adaptive filter FB is updated such that an error signal is minimized when the audio signal C includes more voice of the occupant hm3. In contrast, a filter coefficient CC of the adaptive filter FC is updated such that an error signal is minimized when the audio signal C includes more voice of the occupant hm4. Therefore, an error signal may be allowed to be reduced by differently using adaptive filters depending on which voice the audio signal C includes more.

For example, when receiving a flag “0” from the determination unit 35, the control unit 28 determines that the audio signal C includes more voice of the occupant hm3. Then, the control unit 28 controls the filter unit F1 such that audio signal C is input to the adaptive filter FB.

The addition unit 27 generates an output signal by subtracting a subtraction signal from a target audio signal output from the voice input unit 29. In the embodiment, the subtraction signal is obtained by adding together a passing signal PA and a passing signal PB or a passing signal PC output from the filter unit F1. The addition unit 27 outputs an output signal to the control unit 28.

The control unit 28 outputs the output signal output from the addition unit 27. The output signal of the control unit 28 is input to the voice recognition engine 40. Alternatively, the output signal may be directly input from the control unit 28 to the electronic device 50. When the output signal is directly input from the control unit 28 to the electronic device 50, the control unit 28 and the electronic device 50 may be connected by wire or wirelessly. For example, the electronic device 50 may be a mobile terminal, and the output signal may be directly input from the control unit 28 to the mobile terminal via a wireless communication network. The output signal input to the mobile terminal may be output as voice from a speaker of the mobile terminal.

Furthermore, the control unit 28 updates the filter coefficient of each adaptive filter with reference to the output signal output from the addition unit 27 and the flag serving as the determination result output from the determination unit 35.

First, the control unit 28 determines an adaptive filter whose filter coefficient is to be updated based on the determination result. Specifically, the control unit 28 sets an adaptive filter to which the audio signal C is input among the adaptive filter F1A, the adaptive filter F1B, and the adaptive filter F1C as a target whose filter coefficient is to be updated. Furthermore, the control unit 28 does not set an adaptive filter to which the audio signal C has not been input among the adaptive filter F1B and the adaptive filter F1C as a target whose filter coefficient is to be updated. For example, when receiving a flag “0” from the determination unit 35, the control unit 28 determines that the audio signal C includes more voice of the occupant hm3. In other words, the control unit 28 determines that the audio signal C is input to the adaptive filter F1B. Then, the control unit 28 sets the adaptive filter FB as a target whose filter coefficient is to be updated, and does not set the adaptive filter F1C as a target whose filter coefficient is to be updated.

Then, the control unit 28 updates the filter coefficient of an adaptive filter whose filter coefficient has been set to be updated such that the value of the error signal in Expression (1) approaches zero.

The update of a filter coefficient in the case where LMS is used as an update algorithm will be described. When the filter coefficient w(n) at the time n is updated to be the filter coefficient w(n+1) at the time n+1, the relation between w(n+1) and w(n) is expressed by Expression (2) below.

$$w(n+1)=w(n)-\alpha x(n)e(n) \quad (2)$$

Here, $\alpha$ represents a correction coefficient of a filter coefficient. The term $\alpha x(n)e(n)$ corresponds to an update amount.

Note that algorithm at the time of updating a filter coefficient is not limited to LMS, and other algorithm may be used. For example, algorithm such as independent component analysis (ICA) and normalized least mean square (NLMS) may be used.

At the time of updating a filter coefficient, the control unit 28 sets the strength of an input reference signal to zero for an adaptive filter whose filter coefficient has not been set to be updated. For example, when receiving the flag “0” from the determination unit 35, the control unit 28 sets the second directional signal input to the adaptive filter F1A as a reference signal and the audio signal C input to the adaptive filter F1B as a reference signal as being input with the strengths at the time when the second directional signal and the audio signal C were output from the directionality control unit 30. In contrast, the control unit 28 sets the strength of the audio signal C input to the adaptive filter FIC as a reference signal as zero. Here, “setting the strength of a reference signal input to the adaptive filter” includes inhibiting the strength of a reference signal input to the adaptive filter to near zero. Furthermore, “setting the strength of a reference signal input to the adaptive filter to zero” includes performing setting such that no reference signal is input to the adaptive filter. Adaptive filtering is not required to be performed for an adaptive filter in which the strength of an input reference signal has been set to zero. This can reduce a processing amount of crosstalk inhibiting processing using an adaptive filter.

Then, the control unit 28 updates a filter coefficient of only an adaptive filter whose filter coefficient has been set to be updated, and does not update a filter coefficient of an adaptive filter whose filter coefficient has not been set to be updated. This can reduce a processing amount of crosstalk inhibiting processing using an adaptive filter.

For example, a case where the driver seat is set as a target seat and a case where the driver hm1, the occupant hm2, and the occupant hm4 do not give utterance and the occupant hm3 gives utterance will be considered. In this case, utterance of an occupant other than the driver hm1 leaks into an audio signal of voice collected by the microphone MC1. In other words, the audio signal A includes a crosstalk component. The audio processing device 21 may update an adaptive filter to cancel the crosstalk component and minimize an error signal. In this case, since there is no utterance at the driver seat, the error signal is ideally a silent signal. Furthermore, in the above-described case, when the driver hm1 gives utterance, the utterance of the driver hm1 leaks into a microphone other than the microphone MC1. Also in this case, the utterance of the driver hm1 is not canceled by processing of the audio processing device 21. This is because the utterance of the driver hm1 included in the audio signal A is temporally earlier than the utterance of the driver hm1 included in another audio signal. This depends on causality. Therefore, the audio processing device 21 can reduce the crosstalk component included in the audio signal A by updating an adaptive filter such that an error signal is minimized regardless of whether or not an audio signal of a target component is included.

In the embodiment, the functions of the voice input unit 29, the directionality control unit 30, the filter unit F1, the control unit 28, and the addition unit 27 are implemented by a processor executing a program held in a memory. Alternatively, the voice input unit 29, the directionality control unit 30, the filter unit F1, the control unit 28, and the addition unit 27 may be configured by different pieces of hardware.

Although the audio processing device 21 has been described, the audio processing device 22, the audio processing device 23, and an audio processing device 24 also have substantially similar configurations except for the filter unit. The audio processing device 22 sets voice uttered by the occupant hm2 as a target component. The audio processing device 22 outputs, as an output signal, an audio signal obtained by inhibiting a crosstalk component of an audio signal collected by the microphone MC2. Therefore, the audio processing device 22 is different from the audio processing device 21 in that the audio processing device 22 includes a filter unit to which the first directional signal and the audio signal C are input. Similarly, the audio processing device 23 sets voice uttered by the occupant hm3 or the occupant hm4 as a target component. The audio processing device 23 outputs, as an output signal, an audio signal obtained by inhibiting a crosstalk component of an audio signal collected by the microphone MC3. Therefore, the audio processing device 23 is different from the audio processing device 21 in that the audio processing device 23 includes a filter unit to which the audio signal A, the audio signal B, and the audio signal C are input.

Figure 5:
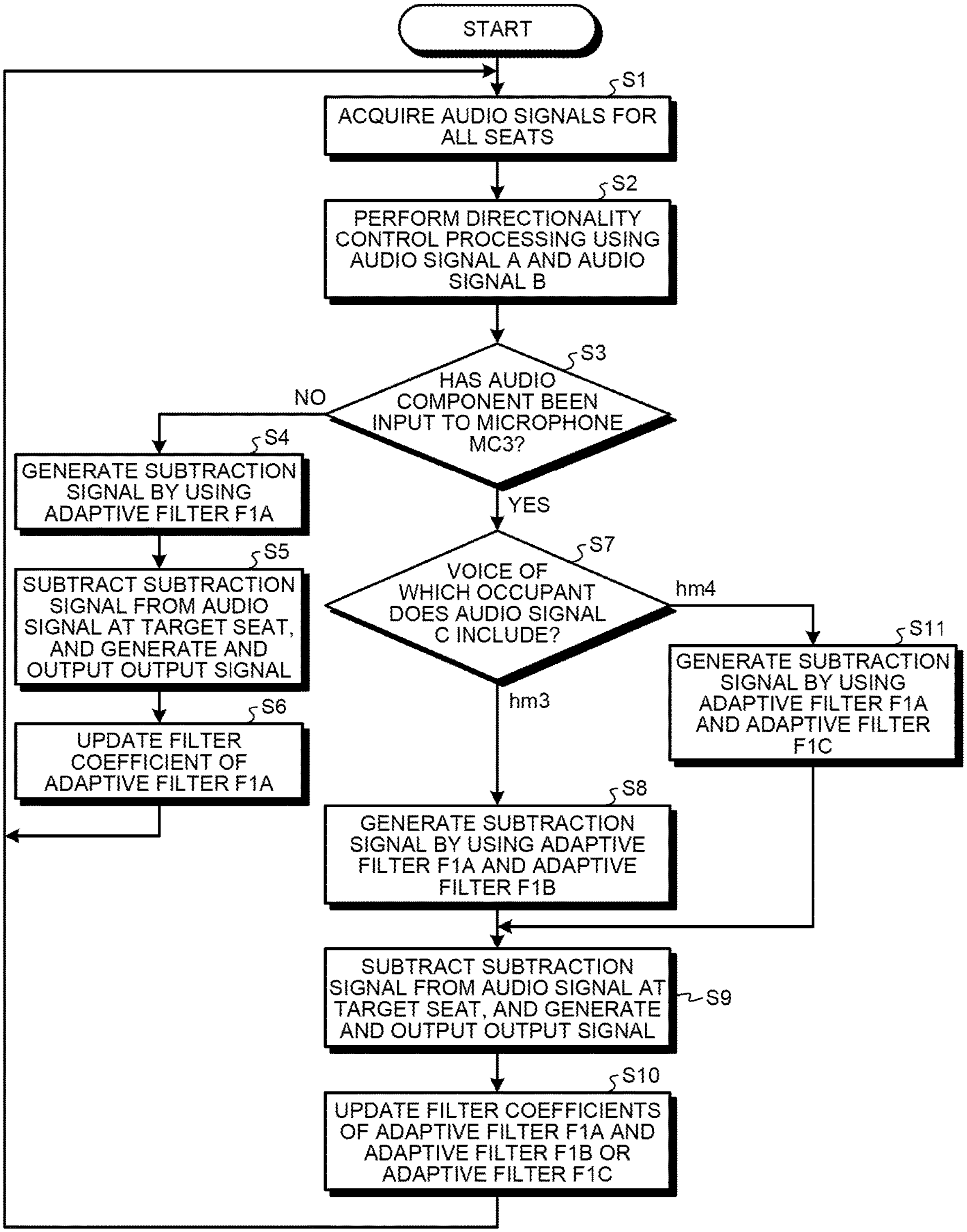
FIG. 5 is a flowchart illustrating an operation procedure of the audio processing device in the first embodiment.

FIG. 5 is a flowchart illustrating an operation procedure of the audio processing device 21. First, the audio signal A, the audio signal B, and the audio signal C are input to the voice input unit 29 (S1). Next, the directionality control unit 30 performs directionality control processing using the audio signal A and the audio signal B, and generates the first directional signal and the second directional signal (S2). Then, the determination unit 35 determines whether an audio component has been input to the microphone MC3 (S3). The determination unit 35 outputs the determination result as a flag to the control unit 28. When the determination unit 35 determines that the audio signal has not been input to the microphone MC3 (S3: No), the control unit 28 causes the strength of the audio signal C input to the filter unit F1 to be zero, and does not change the strength of the second directional signal. Then, the filter unit F1 generates a subtraction signal as follows (S4). The adaptive filter F1A passes the second directional signal, and outputs the passing signal P1A. The adaptive filter F1B passes the audio signal C, and outputs the passing signal P1B. The adaptive filter F1C passes the audio signal C, and outputs the passing signal P1C. The filter unit F1 adds together the passing signal P1A, the passing signal P1B, and the passing signal P1C, and outputs these signals as a subtraction signal. The addition unit 27 subtracts the subtraction signal from the first directional signal, and generates and outputs an output signal (S5). The output signal is input to the control unit 28, and output from the control unit 28. Next, the control unit 28 updates the filter coefficient of the adaptive filter F1A based on the output signal so that the target component included in the output signal is maximized (S6). Then, the audio processing device 21 performs Step S1 again.

When the determination unit 35 determines that an audio signal has been input to the microphone MC3 (S3: Yes), the determination unit 35 determines by which of the occupant hm3 and the occupant hm4 the audio component input to the microphone MC3 is caused (S7). In other words, the determination unit 35 determines which of voice of the occupant hm3 and voice of the occupant hm4 the audio signal C includes more. The determination unit 35 outputs this determination result as a flag to the control unit 28. When the audio signal C includes more voice of the occupant hm3 (S7: hm3), the filter unit F1 generates a subtraction signal as follows (S8). The control unit 28 controls the filter unit F1 such that the audio signal C is input to the adaptive filter F1B. In contrast, the control unit 28 controls the filter unit F1 such that the audio signal C is input to the adaptive filter F1C with a strength of zero. In other words, the control unit 28 does not change the strength of the second directional signal input to the adaptive filter F1A and the strength of the audio signal C input to the adaptive filter F1B, but changes the strength of the audio signal C input to the adaptive filter F1C to zero. Then, the filter unit F1 generates a subtraction signal by an operation similar to that in Step S4. Similarly to Step S5, the addition unit 27 subtracts the subtraction signal from the first directional signal, and generates and outputs an output signal (S9). Next, the control unit 28 updates the filter coefficient of the adaptive filter to which an audio signal is input based on the output signal so that the target component included in the output signal is maximized (S10). Specifically, the filter coefficients of the adaptive filter F1A and the adaptive filter F1B are updated. Then, the audio processing device 21 performs Step S1 again.

When the audio signal C is determined to include more voice of the occupant hm4 in Step S7 (S7: hm4), the filter unit F1 generates a subtraction signal as follows (S11). The control unit 28 controls the filter unit F1 such that the audio signal C is input to the adaptive filter F1C. In contrast, the control unit 28 controls the filter unit F1 such that the audio signal C is input to the adaptive filter F1B with a strength of zero. In other words, the control unit 28 does not change the strength of the second directional signal input to the adaptive filter F1A and the strength of the audio signal C input to the adaptive filter F1C, but changes the strength of the audio signal C input to the adaptive filter F1B to zero. Then, the filter unit F1 generates a subtraction signal by an operation similar to that in Step S4. Similarly to Step S5, the addition unit 27 subtracts the subtraction signal from the first directional signal, and generates and outputs an output signal (S9). Next, the control unit 28 updates the filter coefficient of the adaptive filter to which an audio signal is input based on the output signal so that the target component included in the output signal is maximized (S10). Specifically, the filter coefficients of the adaptive filter F1A and the adaptive filter F1C are updated. Then, the audio processing device 21 performs Step S1 again.

In the embodiment, the filter coefficient is not updated for an adaptive filter to which an audio signal is input with a strength of zero. This can reduce a processing amount of the control unit 28 as compared with that in a case where the filter coefficients of all adaptive filters are constantly updated. In contrast, the control unit 28 may constantly update the filter coefficients of all the adaptive filters. The control unit 28 can constantly perform the same processing by constantly updating the filter coefficients of all the adaptive filters, so that the processing is simplified. Furthermore, the filter coefficient of a certain adaptive filter can be accurately updated by constantly updating the filter coefficients of all the adaptive filters, for example, even immediately after the change from a state in which an audio signal with a strength of zero is input to a state in which an audio signal with a strength of not zero is input.

As described above, the audio processing system 5 in the first embodiment determines voice of a specific speaker with high accuracy by acquiring a plurality of audio signals with a plurality of microphones and subtracting a subtraction signal generated by using an adaptive filter from a certain audio signal by using another audio signal as a reference signal. In the first embodiment, one microphone can collect a plurality of pieces of voice generated at different positions. Specifically, the microphone MC3 collects voice of the occupant hm3 and voice of the occupant hm4 in the rear seats. Then, it is determined which of a plurality of pieces of voice an audio signal based on collected voice includes, and an adaptive filter to which an audio signal is input is changed depending on which voice is included. This allows an audio signal of a target component to be accurately determined even when one microphone collects a plurality of pieces of voice. Therefore, since a microphone is not required to be provided one by one for each seat, costs can be reduced. Furthermore, when a target component is determined by using an adaptive filter, the number of reference signals used for processing can be reduced as compared with that in a case where signals output from microphones provided for all the seats are used as reference signals. This can reduce an amount of processing of canceling a crosstalk component. Furthermore, the filter coefficient is not required to be updated for an adaptive filter to which an audio signal is input with a strength of zero. This can further reduce a processing amount as compared with that in a case where the filter coefficients are constantly updated for all adaptive filters.

Second Embodiment

An audio processing system 5A according to a second embodiment is different from the audio processing system 5 according to the first embodiment in that the audio processing system 5A includes an audio processing device 20A instead of the audio processing device 20 and the audio processing system 5A includes a microphone MC4. An audio processing device 20A according to the second embodiment is different from the audio processing device 20 according to the first embodiment in that the audio processing device 20A includes an abnormality detection unit, which may be abnormality detection circuitry, and uses an audio signal D.

The audio processing device 20A according to the second embodiment detects the presence or absence of abnormality in each microphone. The audio processing device 20A performs directionality control processing and processing of canceling a crosstalk component by using an audio signal output from a microphone in which no abnormality has been detected. The audio processing device 20A will be described below with reference to FIGS. 6, 7, and 8. The same configurations and operations as those described in the first embodiment are denoted by the same reference signs, and the description thereof will be omitted or simplified.

Figure 6:
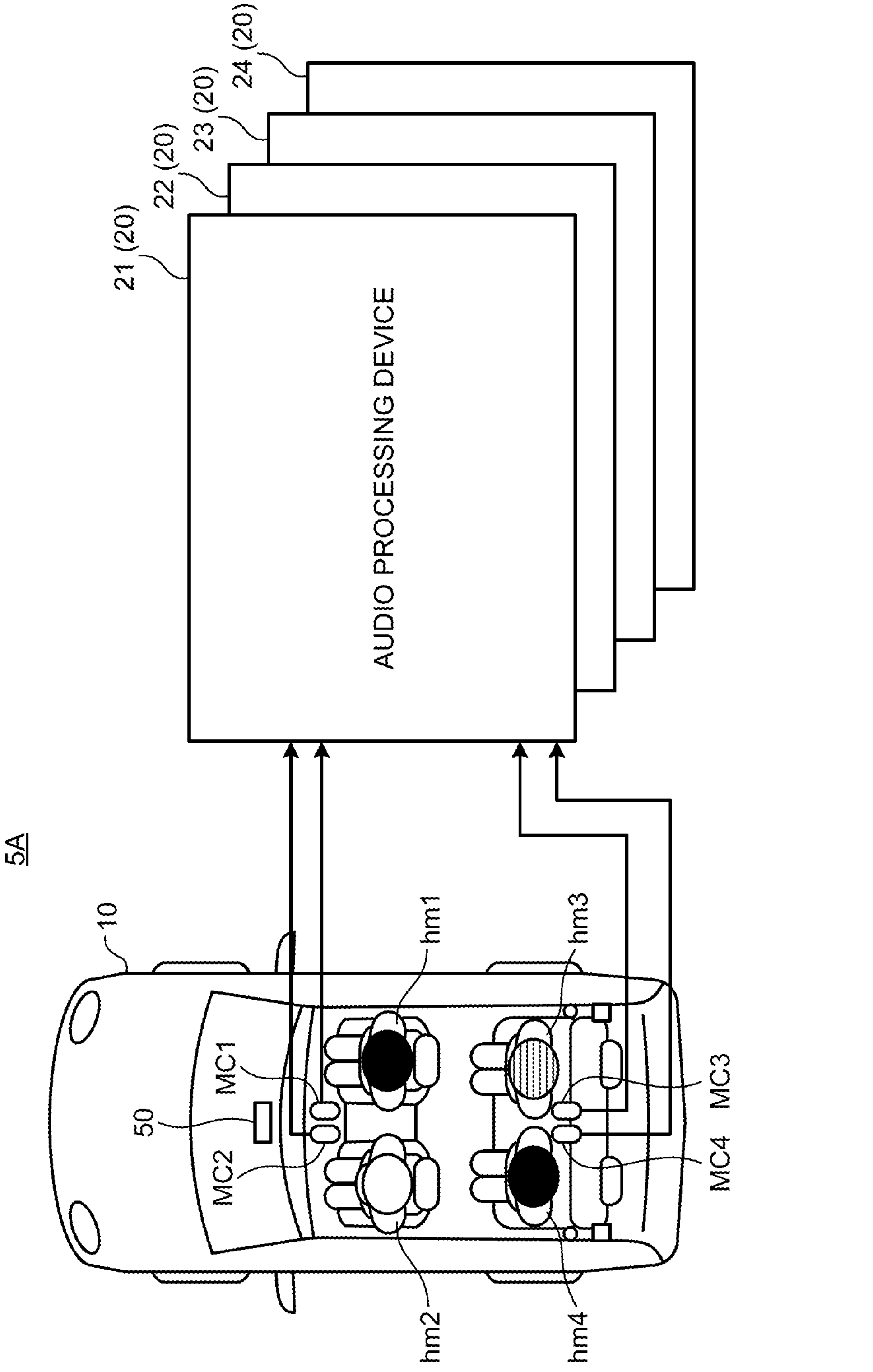
FIG. 6 illustrates one example of the schematic configuration of an audio processing system in a second embodiment.

Details of the audio processing system 5A according to the second embodiment will be described with reference to FIG. 6. FIG. 6 illustrates one example of the schematic configuration of the audio processing system 5A according to the second embodiment. The audio processing system 5 includes the microphone MC1, the microphone MC2, the microphone MC3, the microphone MC4, and the audio processing device 20A. In the embodiment, the microphone MC3 collects voice uttered by the occupant hm3. In other words, the microphone MC3 acquires an audio signal including an audio component uttered by the occupant hm3. The microphone MC3 is disposed on the right side near the center of the ceiling of the rear seats, for example. In the embodiment, the microphone MC4 collects voice uttered by the occupant hm4. In other words, the microphone MC4 acquires an audio signal including an audio component uttered by the occupant hm4. The microphone MC4 is disposed on the left side near the center of the ceiling of the rear seats, for example. The microphone MC1 is located farther from the right seat of the rear seats than the microphone MC3 is. The microphone MC2 is located farther from the left seat of the rear seats than the microphone MC4 is. The microphone MC4 is located closer to the left seat of the rear seats than the microphone MC3 is. In the embodiment, the audio processing system 5A includes a plurality of audio processing devices 20A that address the respective microphones. Specifically, the audio processing system 5A includes an audio processing device 21A, an audio processing device 22A, an audio processing device 23A, and an audio processing device 24A. The audio processing device 21A addresses the microphone MC1. The audio processing device 22A addresses the microphone MC2. The audio processing device 23A addresses the microphone MC3. The audio processing device 24A addresses the microphone MC4. The audio processing device 21A, the audio processing device 22A, the audio processing device 23A, and the audio processing device 24A may be collectively referred to as the audio processing devices 20A below.

Although, in the configuration in FIG. 6, the audio processing device 21A, the audio processing device 22A, the audio processing device 23A, and the audio processing device 24A are described as being configured by different pieces of hardware, one audio processing device 20A may implement the functions of the audio processing device 21A, the audio processing device 22A, the audio processing device 23A, and the audio processing device 24A. Alternatively, some of the audio processing device 21A, the audio processing device 22A, the audio processing device 23A, and the audio processing device 24A may be configured by common hardware, and the others may be configured by different pieces of hardware.

In the embodiment, each of the audio processing devices 20A is disposed in each seat near each corresponding microphone. For example, the audio processing device 21A is disposed in the driver seat. The audio processing device 22A is disposed in the passenger seat. The audio processing device 23A is disposed in the right seat of the rear seats. The audio processing device 24A is disposed in the left seat of the rear seats. Each of the audio processing devices 20A may be disposed in the dashboard.

Figure 7:
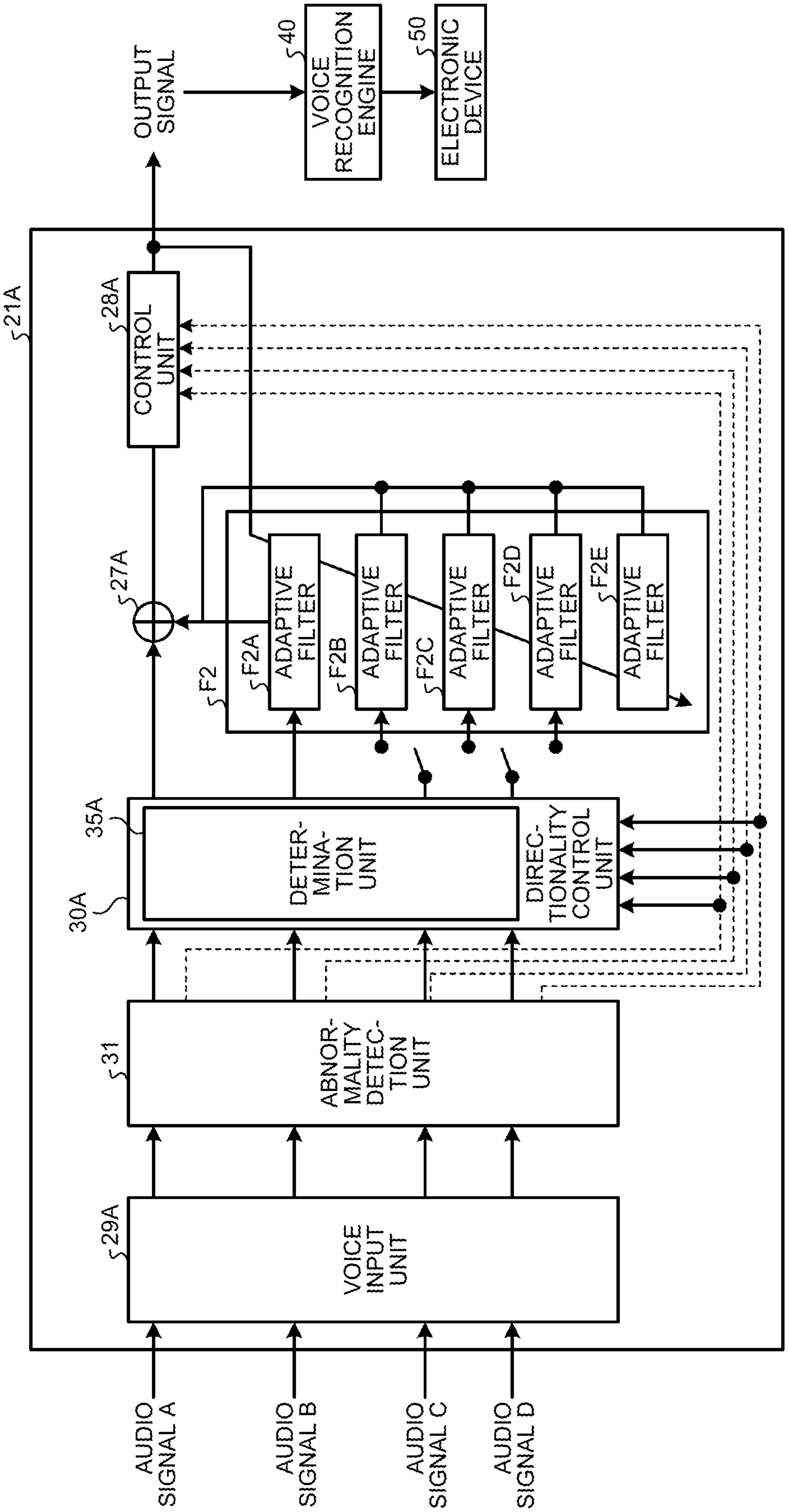
FIG. 7 is a block diagram illustrating the configuration of an audio processing device in the second embodiment.

FIG. 7 is a block diagram illustrating the configuration of the audio processing device 21A. All of the audio processing device 21A, the audio processing device 22A, the audio processing device 23A, and the audio processing device 24A have similar configurations and functions except for a part of the configuration of a filter unit to be described later. Here, the audio processing device 21A will be described. The audio processing device 21A sets voice uttered by the driver hm1 as a target. The audio processing device 21A outputs, as an output signal, an audio signal obtained by inhibiting a crosstalk component of an audio signal collected by the microphone MC1.

As illustrated in FIG. 7, the audio processing device 21A includes a voice input unit 29A, the abnormality detection unit 31, a directionality control unit 30A, a filter unit F2, a control unit 28A, and an addition unit 27A. The filter unit F2 includes a plurality of adaptive filters. The control unit 28A controls the filter coefficients of the adaptive filters of the filter unit F2.

The audio signals of voice collected by the microphone MC1, the microphone MC2, the microphone MC3, and the microphone MC4 are input to the voice input unit 29A. In other words, each of the microphone MC1, the microphone MC2, the microphone MC3, and the microphone MC4 outputs a signal based on an audio signal of the collected voice to the voice input unit 29. Since the microphone MC1 and the microphone MC2 are similar to those in the first embodiment, detailed description thereof will be omitted.

The microphone MC3 outputs an audio signal C to the voice input unit 29A. The audio signal C includes voice of the occupant hm3 and noise including voice of an occupant other than the occupant hm3. The microphone MC3 corresponds to a first microphone. Furthermore, the microphone MC3 corresponds to a fourth microphone. Voice collected by the microphone MC3 corresponds to a first audio signal. Furthermore, voice collected by the microphone MC3 corresponds to a fourth audio signal. The voice of the occupant hm3 corresponds to the first audio component. The audio signal C corresponds to a first signal. Furthermore, the audio signal C corresponds to a fourth signal.

The microphone MC4 outputs an audio signal D to the voice input unit 29A. The audio signal D includes voice of the occupant hm4 and noise including voice of an occupant other than the occupant hm4. The microphone MC4 corresponds to the first microphone. Furthermore, the microphone MC4 corresponds to a fifth microphone. Voice collected by the microphone MC4 corresponds to the first audio signal. Furthermore, voice collected by the microphone MC4 corresponds to a fifth audio signal. The voice of the occupant hm4 corresponds to the second audio component. The audio signal D corresponds to the first signal. Furthermore, the audio signal D corresponds to a fifth signal.

The voice input unit 29A outputs the audio signal A, the audio signal B, the audio signal C, and the audio signal D. The voice input unit 29A corresponds to a reception unit.

Although, in the embodiment, the audio processing device 21A includes one voice input unit 29A to which audio signals from all the microphones are input, the audio processing device 21A may include the voice input unit 29A to which a corresponding audio signal is input for each microphone. For example, an audio signal of voice collected by the microphone MC1 may be input to a voice input unit corresponding to the microphone MC1. An audio signal of voice collected by the microphone MC2 may be input to another voice input unit corresponding to the microphone MC2. An audio signal of voice collected by the microphone MC3 may be input to another voice input unit corresponding to the microphone MC3. An audio signal of voice collected by the microphone MC4 may be input to another voice input unit corresponding to the microphone MC4.

The audio signal A, the audio signal B, the audio signal C, and the audio signal D output from the voice input unit 29A are input to the abnormality detection unit 31. The abnormality detection unit 31 detects the presence or absence of abnormality in the microphone MC3 and the microphone MC4, and transmits abnormality information on the abnormality of the microphone MC3 and the microphone MC4 to the control unit 28A. Here, the abnormality of a microphone includes a failure of the microphone, a connection failure between the microphone and another device, and battery exhaustion of the microphone. The connection failure between the microphone and another device includes disconnection of a cable that electrically connects the microphone and the other device. The abnormality detection unit 31 may be allowed to detect the presence or absence of abnormality in the microphone MC1 and the microphone MC2, and may transmit abnormality information on the abnormality of the microphone MC1 and the microphone MC2 to the control unit 28A. For example, the abnormality detection unit 31 detects the presence or absence of abnormality of a microphone that addresses an audio signal based on the audio signal. For example, when an audio signal has a strength smaller than a threshold, the abnormality detection unit 31 determines that a microphone that addresses the audio signal has abnormality. When a period in which an audio signal has a strength smaller than a threshold has a certain length or more or when a frequency at which an audio signal has a strength smaller than a threshold has a certain level or more in a certain period, the abnormality detection unit 31 may determine that a microphone that addresses the audio signal has abnormality. The abnormality detection unit 31 outputs a determination result of the presence or absence of abnormality in each microphone to the control unit 28A as a flag, for example. The flag is one example of the abnormality information. The flag indicates a value of "0" or "1" for each audio signal. Here, "1" means that a corresponding microphone has been determined to have abnormality, and "0" means that a corresponding microphone has not been determined to have abnormality. For example, when determining that the microphones MC1, MC2, and MC4 have no abnormality and determining that the microphone MC3 has abnormality, the abnormality detection unit 31 outputs a flag "0, 0, 1, 0" to the control unit 28 as a determination result. After detecting abnormality of each microphone, the abnormality detection unit 31 outputs the audio signal A, the audio signal B, the audio signal C, and the audio signal D to the directionality control unit 30A.

Although, in the embodiment, the audio processing device 21A includes one abnormality detection unit 31 to which all the audio signals are input, the audio processing device 21A may include the abnormality detection unit 31 to which a corresponding audio signal is input for each audio signal. For example, the audio processing device 21A may separately include an abnormality detection unit to which the audio signal A is input, an abnormality detection unit to which the audio signal B is input, an abnormality detection unit to which the audio signal C is input, and an abnormality detection unit to which the audio signal D is input.

The audio signal A, the audio signal B, the audio signal C, and the audio signal D output from the abnormality detection unit 31 are input to the directionality control unit 30A. The directionality control unit 30 performs the directionality control processing by using an audio signal output from a microphone excluding a microphone in which abnormality has been detected by the abnormality detection unit 31 and a microphone on the same side as the microphone. The directionality control processing is, for example, beamforming. Here, "on the same side" means that microphones are the same in that they are either on the front seat side or on the rear seat side. In the embodiment, the microphone MC1 and the microphone MC2 are on the same side, and the microphone MC3 and the microphone MC4 are on the same side. For example, when abnormality of the microphone MC3 is detected, the directionality control unit 30A performs the directionality control processing by using the audio signal A and the audio signal B. Then, the directionality control unit 30A outputs two directional signals obtained by performing the directionality control processing by using two audio signals. For example, the directionality control unit 30A outputs a first directional signal obtained by performing the directionality control processing on the audio signal A. Furthermore, the directionality control unit 30A outputs a second directional signal obtained by performing the directionality control processing on the audio signal B. For example, when no abnormality is detected in any microphone, the directionality control unit 30A performs the directionality control processing by using all the audio signals, and outputs the obtained directional signal. For example, in addition to the first directional signal and the second directional signal, the directionality control unit 30A outputs a third directional signal and a fourth directional signal. The third directional signal is obtained by performing the directionality control processing on the audio signal C. The fourth directional signal is obtained by performing the directionality control processing on the audio signal D. For example, when the abnormality detection unit 31 can detect abnormality of the microphone MC2 and detects abnormality in the microphone MC2, the directionality control unit 30A outputs the third directional signal and the fourth directional signal. The third directional signal is obtained by performing the directionality control processing on the audio signal C. The fourth directional signal is obtained by performing the directionality control processing on the audio signal D.

Furthermore, the directionality control unit 30A determines whether an audio component has been input to a microphone on the same side as the microphone in which abnormality is detected. For example, when the microphone MC3 is determined to have abnormality, the directionality control unit 30A determines that an audio signal has been input to the microphone MC4 when the audio signal D output from the microphone MC4, which is a microphone on the same side as the microphone MC3, has a strength greater than that of at least one of the strength of the first directional signal and the strength of the second directional signal, and determines that no audio signal has been input to the microphone MC4 when this is not the case.

Furthermore, the directionality control unit 30A includes a determination unit 35A. The determination unit 35A determines voice of which occupant an audio signal output from the microphone on the same side as the microphone in which abnormality has been detected includes more based on an audio signal output from a microphone in which no abnormality has been detected. The reason for making such a determination will be described. For example, a crosstalk component including voice of the occupant hm3 is removed from the target component by using the audio signal C output from the microphone MC3. When the microphone MC3 is determined to have abnormality, however, the audio signal C also has abnormality, so that the crosstalk component including voice of the occupant hm3 is difficult to be removed by using the audio signal C. In that case, the voice of the occupant hm3 also leaks into the microphone MC4. Thus, removal of the crosstalk component including the voice of the occupant hm3 using the audio signal D output from the microphone MC4 is conceivable. Both voice of the occupant hm3 and voice of the occupant hm4 may leak into the microphone MC4. Thus, it is determined which of voice of the occupant hm3 and voice of the occupant hm4 the audio signal D includes more. When the audio signal D includes more voice of the occupant hm3, the crosstalk component including voice of the occupant hm3 can be removed by using the audio signal D.

For example, when the microphone MC3 is determined to have abnormality, the determination unit 35A determines which of voice of the occupant hm3 and voice of the occupant hm4 the audio signal D includes more based on the first directional signal and the second directional signal. In other words, the determination unit 35A determines which of voice of the occupant hm3 and voice of the occupant hm4 the audio signal C includes more based on the audio signal A and the audio signal B. A specific determination method is similar to that described in the first embodiment.

The determination unit 35A outputs, to the control unit 28A, a result of determination of which of voice of the occupant hm3 and voice of the occupant hm4 the audio signal C or the audio signal D includes more. The determination unit 35A outputs the determination result to the control unit 28A as, for example, a flag. The flag indicates a value of "0" or "1". Here, "0" indicates that the audio signal includes more voice of the occupant hm3, and "1" indicates that the audio signal includes more voice of the occupant hm4. For example, when the microphones MC1, MC2, and MC4 are determined to have no abnormality and the microphone MC3 is determined to have abnormality, the directionality control unit 30A transmits a flag as a determination result regarding the audio signal D. For example, when the audio signal D is determined to include more voice of the occupant hm3, the directionality control unit 30A outputs a flag "0" to the control unit 28A as a determination result.

For example, when abnormality of the microphone MC3 is detected, the directionality control unit 30A outputs the first directional signal to the addition unit 27A, and outputs the second directional signal, the audio signal C, and the audio signal D to the filter unit F2.

Although, in the embodiment, the determination unit 35A of the directionality control unit 30A determines whether an audio component has been input to a microphone on the same side as a microphone in which abnormality has been detected, and determines voice of which occupant an audio signal output from the microphone on the same side as the microphone in which abnormality has been detected includes more, the audio processing device 21A may include the determination unit 35A separately from the directionality control unit 30A. In that case, the determination unit 35A is connected between the abnormality detection unit 31 and the directionality control unit 30A, for example. Alternatively, the audio processing device 21A may include only the determination unit 35A, and is not required to include the directionality control unit 30A. Since the determination unit 35A has a configuration and a function similar to those described in the first embodiment, detailed description thereof will be omitted.

The filter unit F2 includes an adaptive filter F2A, an adaptive filter F2B, an adaptive filter F2C, an adaptive filter F2D, and an adaptive filter F2E. The filter unit F2 is used for processing of inhibiting a crosstalk component other than voice of the driver hm1 included in voice collected by the microphone MC1. Although, in the embodiment, the filter unit F2 includes five adaptive filters, the number of adaptive filters is appropriately set based on the number of input audio signals and a processing amount of the crosstalk inhibiting processing. The processing of inhibiting crosstalk will be described in detail later.

The second directional signal is input to the adaptive filter F2A as a reference signal. The adaptive filter F2A outputs a passing signal P2A based on a filter coefficient C2A and the second directional signal. When the microphone MC4 is determined to have abnormality and the audio signal C is determined to include more voice of the occupant hm3, the audio signal C is input to the adaptive filter F2B as a reference signal. The adaptive filter F2B outputs a passing signal P2B based on a filter coefficient C2B and the audio signal C. Even when the microphone MC4 is not determined to have abnormality, the audio signal C may be input to the adaptive filter F2B as a reference signal. In contrast, when the microphone MC4 is determined to have abnormality and the audio signal C is determined to include more voice of the occupant hm4, the audio signal C is input to the adaptive filter F2C as a reference signal. The adaptive filter F2C outputs a passing signal 2C based on a filter coefficient C2C and the audio signal C. Similarly, when the microphone MC3 is determined to have abnormality and the audio signal D is determined to include more voice of the occupant hm3, the audio signal D is input to the adaptive filter F2D as a reference signal. The adaptive filter F2D outputs a passing signal P2D based on a filter coefficient C2D and the audio signal D. Even when the microphone MC3 is not determined to have abnormality, the audio signal D may be input to the adaptive filter F2D as a reference signal. In contrast, when the microphone MC3 is determined to have abnormality and the audio signal D is determined to include more voice of the occupant hm4, the audio signal D is input to the adaptive filter F2E as a reference signal. The adaptive filter F2E outputs a passing signal P2E based on a filter coefficient C2E and the audio signal D. The filter unit F1 adds together and outputs the passing signal P2A, the passing signal P2B or a passing signal P2C, and the passing signal P2D or the passing signal P2E. In the embodiment, the adaptive filter F2A, the adaptive filter F2B, the adaptive filter F2C, the adaptive filter F2D, and the adaptive filter F2E are implemented by a processor executing a program. The adaptive filter F2A, the adaptive filter F2B, the adaptive filter F2C, the adaptive filter F2D, and the adaptive filter F2E may have physically separated different hardware configurations.

In the embodiment, the filter unit F2 has been described as including two adaptive filters to which the audio signal C can be input and two adaptive filters to which the audio signal D can be input. The filter unit F2 may include two adaptive filters to which the second directional signal can be input. For example, the abnormality detection unit 31 may be allowed to detect abnormality of the microphone MC2. The filter unit F2 may separately include an adaptive filter F2A1 and an adaptive filter F2A2. When the abnormality of the microphone MC2 is detected, the second directional signal is input to the adaptive filter F2A1. When the abnormality of the microphone MC2 is not detected, the second directional signal is input to the adaptive filter F2A2.

The control unit 28A controls the filter coefficient of an adaptive filter based on a determination result of the abnormality detection unit 31 and a determination result of the determination unit 35A. In the embodiment, the control unit 28A determines to which of the adaptive filter F2B and the adaptive filter F2C the audio signal C is to be input based on a flag serving as a determination result output from the abnormality detection unit 31 and a flag serving as a determination result output from the determination unit 35A. Furthermore, in the embodiment, the control unit 28A determines to which of the adaptive filter F2D and the adaptive filter F2E the audio signal D is to be input based on a flag serving as a determination result output from the abnormality detection unit 31 and a flag serving as a determination result output from the determination unit 35A. The filter coefficient C2B of the adaptive filter F2B is updated such that an error signal is minimized when the audio signal C includes more voice of the occupant hm3. Furthermore, a filter coefficient C2C of the adaptive filter F2C is updated such that an error signal is minimized when the audio signal C includes more voice of the occupant hm4. The filter coefficient C2D of the adaptive filter F2D is updated such that an error signal is minimized when the audio signal D includes more voice of the occupant hm3. Furthermore, the filter coefficient C2E of the adaptive filter F2E is updated such that an error signal is minimized when the audio signal D includes more voice of the occupant hm4. Therefore, an error signal may be allowed to be reduced by differently using adaptive filters depending on which voice the audio signal C includes more or which voice the audio signal D includes more. When the filter unit F2 includes two adaptive filters to which the second directional signal can be input, the control unit 28A may determine to which adaptive filter the second directional signal is input.

For example, when receiving a flag "0, 0, 1, 0" from the abnormality detection unit 31 and receiving a flag "0" from the determination unit 35A, the control unit 28A determines that the microphone MC3 has abnormality and the audio signal D includes more voice of the occupant hm3. Then, the control unit 28A controls the filter unit F2 such that audio signal D is input to the adaptive filter F2D.

The addition unit 27A generates an output signal by subtracting a subtraction signal from target audio signals output from the voice input unit 29. In the embodiment, the subtraction signal is obtained by adding together a passing signal P2A, the passing signal P2B or the passing signal P2C, and the passing signal P2D or the passing signal P2E output from the filter unit F2. The addition unit 27A outputs an output signal to the control unit 28A.

The control unit 28A outputs the output signal output from the addition unit 27A. Use of the output signal is similar to that in the first embodiment.

Furthermore, the control unit 28A updates the filter coefficient of each adaptive filter with reference to an output signal output from the addition unit 27A, a flag serving as a determination result output from the abnormality detection unit 31, and a flag serving as a determination result output from the determination unit 35A.

First, the control unit 28A determines an adaptive filter whose filter coefficient is to be updated based on the determination result. Specifically, the control unit 28A sets an adaptive filter to which the audio signal C is input among the adaptive filter F2A, the adaptive filter F2B, the adaptive filter F2C, the adaptive filter F2D, and the adaptive filter F2E as a target whose filter coefficient is to be updated. Furthermore, the control unit 28A does not set an adaptive filter to which no audio signal has been input among the adaptive filter F2B, the adaptive filter F2C, the adaptive filter F2D, and the adaptive filter F2E as a target whose filter coefficient is to be updated. For example, when receiving a flag "0, 0, 1, 0" from the abnormality detection unit 31 and receiving a flag "0" from the determination unit 35A, the control unit 28A determines that the microphone MC3 has abnormality and the audio signal D includes more voice of the occupant hm3. In other words, the control unit 28A determines that audio signal C is not to be input to either the adaptive filter F2B or the adaptive filter F2C, the audio signal D is to be input to the adaptive filter F2D, and the audio signal D is not to be input to the adaptive filter F2E. Then, the control unit 28A sets the adaptive filter F2D as a target whose filter coefficient is to be updated, and does not set the adaptive filter F2B, the adaptive filter F2C, and the adaptive filter F2E as targets whose filter coefficients are to be updated.

Then, the control unit 28A updates the filter coefficient of an adaptive filter whose filter coefficient has been set to be updated such that the value of the error signal in Expression (1) approaches zero. A specific method of updating a filter coefficient is similar to that described in the first embodiment.

The control unit 28A updates a filter coefficient of only an adaptive filter whose filter coefficient has been set to be updated, and does not update a filter coefficient of an adaptive filter whose filter coefficient has not been set to be updated. This can reduce a processing amount of crosstalk inhibiting processing using an adaptive filter.

In the embodiment, the functions of the voice input unit 29, the abnormality detection unit 31, the directionality control unit 30A, the filter unit F2, the control unit 28A, and the addition unit 27A are implemented by a processor executing a program held in a memory. Alternatively, the voice input unit 29, the abnormality detection unit 31, the directionality control unit 30A, the filter unit F2, the control unit 28A, and the addition unit 27A may be configured by different pieces of hardware.

Although the audio processing device 21A has been described, the audio processing device 22A, the audio processing device 23A, and an audio processing device 24A also have substantially similar configurations except for the filter unit. The audio processing device 22A sets voice uttered by the occupant hm2 as a target component. The audio processing device 22A outputs, as an output signal, an audio signal obtained by inhibiting a crosstalk component of an audio signal collected by the microphone MC2. Therefore, the audio processing device 22 is different from the audio processing device 21A in that the audio processing device 22 includes a filter unit to which the first directional signal, the audio signal C, and the audio signal D are input. The same applies to the audio processing device 23A and the audio processing device 24A.

Figure 8:
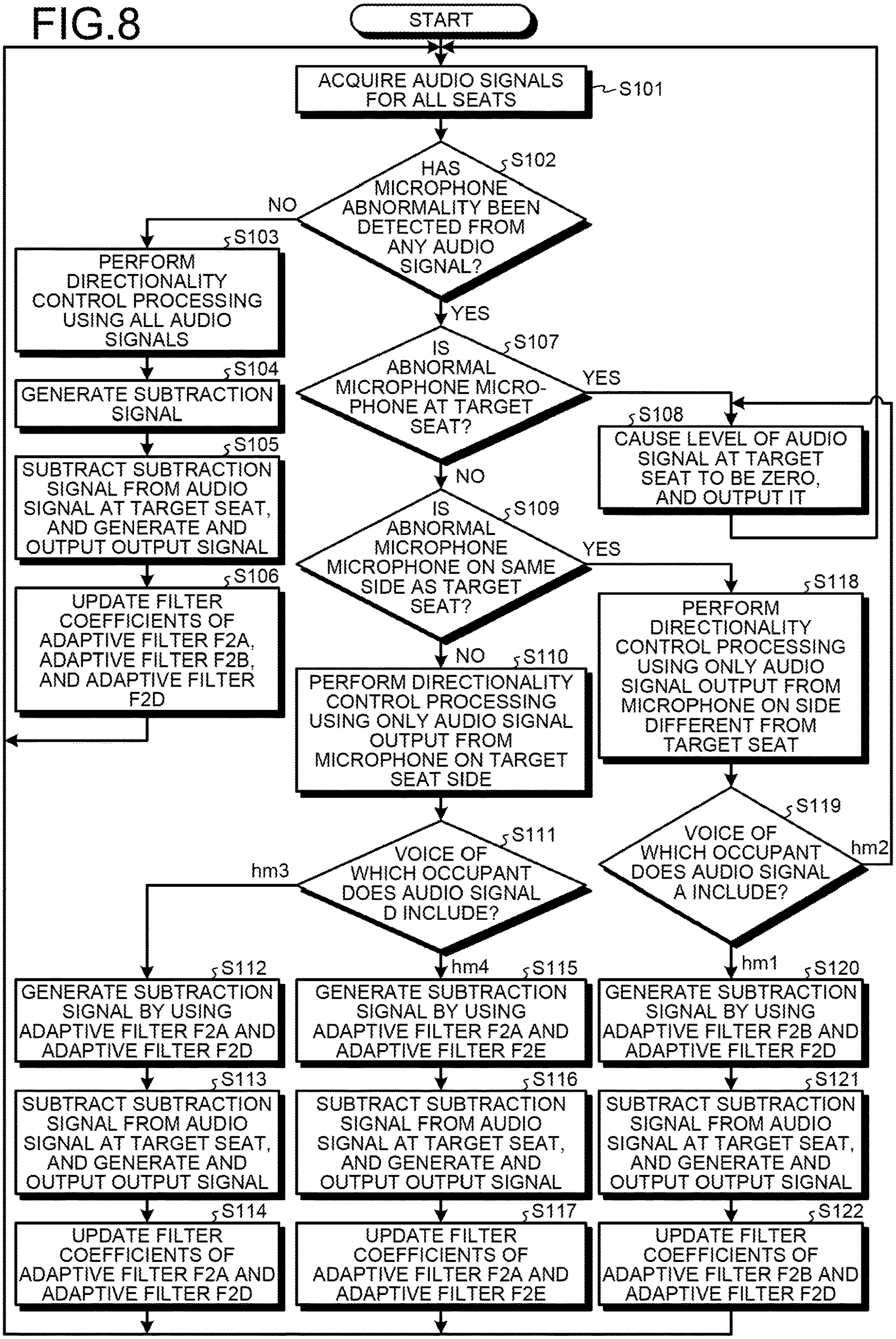
FIG. 8 is a flowchart illustrating an operation procedure of the audio processing device in the second embodiment.

FIG. 8 is a flowchart illustrating an operation procedure of the audio processing device 21A. First, the audio signal A, the audio signal B, the audio signal C, and the audio signal D are input to the voice input unit 29A (S101). Next, the abnormality detection unit 31 determines the presence or absence of abnormality of each microphone based on each audio signal (S102). The abnormality detection unit 31 outputs the determination result to the control unit 28A as a flag. When no abnormality is detected in any microphone (S102: No), the directionality control unit 30A performs directionality control processing by using all audio signals (S103). The directionality control unit 30A outputs a directional signal to the filter unit F2. The filter unit F2 generates a subtraction signal as follows (S104). The adaptive filter F2A passes the second directional signal, and outputs the passing signal P2A. The adaptive filter F2B passes the third directional signal, and outputs the passing signal P2B. The adaptive filter F2D passes the fourth directional signal, and outputs the passing signal P2D. The filter unit F2 adds together the passing signal P2A, the passing signal P2B, and the passing signal P2D, and outputs these signals as a subtraction signal. The addition unit 27A subtracts the subtraction signal from the first directional signal, and generates and outputs an output signal (S105). The output signal is input to the control unit 28A, and output from the control unit 28A. Next, the control unit 28A updates the filter coefficients of the adaptive filter F2A, the adaptive filter F2B, and the adaptive filter F2D based on an output signal such that a target component included in the output signal is maximized with reference to a flag serving as a determination result output from the abnormality detection unit 31 and a flag serving as a determination result output from the directionality control unit 30A (S106). Then, the audio processing device 21A performs Step S1 again.

When abnormality is detected in any of the microphones in Step S102 (S102: Yes), the abnormality detection unit 31 determines whether the microphone in which the abnormality has been detected is a microphone in a target seat (S107). Here, the target seat is a seat at which voice serving as a target component is acquired. In the audio processing device 21A, the target seat is the driver seat, and the microphone in the target seat is the microphone MC1. The abnormality detection unit 31 outputs the determination result to the control unit 28A as a flag. When the microphone in which the abnormality is detected is the microphone in the target seat, the control unit 28A sets the strength of the audio signal A received from the voice input unit 29A to zero, and outputs the audio signal A as an output signal (S108). In this case, the control unit 28A does not update the filter coefficients of the adaptive filter F2A, the adaptive filter F2B, the adaptive filter F2C, the adaptive filter F2D, and the adaptive filter F2E. Then, the audio processing device 21A performs Step S101 again.

When the microphone in which the abnormality has been detected is not the microphone in the target seat in Step S107 (S107: No), the abnormality detection unit 31 determines whether the microphone in which the abnormality has been detected is a microphone on the same side as the target seat (S109). When the microphone in which the abnormality has been detected is not the microphone on the same side as the target seat (S109: No), the abnormality detection unit 31 outputs the determination result to the control unit 28A as a flag. The directionality control unit 30A performs directionality control processing using the audio signal A and the audio signal B, and generates the first directional signal and the second directional signal (S110). Then, the determination unit 35A determines which audio component has been input to the microphone, which is on the same side as the microphone in which the abnormality has been detected and in which no abnormality has been detected (S111). For example, when abnormality is detected in the microphone MC3, the determination unit 35A determines which of voice of the occupant hm3 and voice of the occupant hm4 has been input to the microphone MC4. In other words, the determination unit 35A determines which of voice of the occupant hm3 and voice of the occupant hm4 the audio signal D includes more. The determination unit 35A outputs this determination result as a flag to the control unit 28A. Description will be given below on the assumption that abnormality has been detected in the microphone MC3. When the audio signal D includes more voice of the occupant hm3 (S111: hm3), the filter unit F2 generates a subtraction signal as follows (S112). The adaptive filter F2A passes the second directional signal, and outputs the passing signal P2A. The control unit 28A controls the filter unit F2 such that the audio signal C is input to the adaptive filter F2B with a strength of zero. Furthermore, the control unit 28 controls the filter unit F2 such that the audio signal C is input to the adaptive filter F2C with a strength of zero. In contrast, the control unit 28A controls the filter unit F2 such that audio signal D is input to the adaptive filter F2D. Furthermore, the control unit 28A controls the filter unit F2 such that the audio signal D is input to the adaptive filter F2E with a strength of zero. In other words, the control unit 28A does not change the strength of the second directional signal input to the adaptive filter F2A and the strength of the audio signal D input to the adaptive filter F2D, but changes the strengths of the audio signal C input to the adaptive filter F2B, the audio signal C input to the adaptive filter F2C, and the audio signal D input to the adaptive filter F2E to zero. Then, the filter unit F2 generates a subtraction signal by an operation similar to that in Step S104. Similarly to Step S5, the addition unit 27A subtracts the subtraction signal from the first directional signal, and generates and outputs an output signal (S113). Next, the control unit 28A updates the filter coefficient of the adaptive filter to which an audio signal is input based on the output signal so that the target component included in the output signal is maximized (S114). Specifically, the filter coefficients of the adaptive filter F2A and the adaptive filter F2D are updated. Then, the audio processing device 21 performs Step S101 again.

When the audio signal D is determined to include more voice of the occupant hm4 in Step S111 (S111: hm4), the filter unit F2 generates a subtraction signal as follows (S115). The adaptive filter F2A passes the second directional signal, and outputs the passing signal P2A. The control unit 28A controls the filter unit F2 such that the audio signal C is input to the adaptive filter F2B with a strength of zero. Furthermore, the control unit 28A controls the filter unit F2 such that the audio signal C is input to the adaptive filter F2C with a strength of zero. In contrast, the control unit 28A controls the filter unit F2 such that the audio signal D is input to the adaptive filter F2D with a strength of zero. Furthermore, the control unit 28A controls the filter unit F2 such that audio signal D is input to the adaptive filter F2E. In other words, the control unit 28 does not change the strength of the second directional signal input to the adaptive filter F2A and the strength of the audio signal D input to the adaptive filter F2E, but changes the strengths of the audio signal C input to the adaptive filter F2B, the audio signal C input to the adaptive filter F2C, and the audio signal D input to the adaptive filter F2D to zero. Then, the filter unit F2 generates a subtraction signal by an operation similar to that in Step S4. Similarly to Step S5, the addition unit 27A subtracts the subtraction signal from the first directional signal, and generates and outputs an output signal (S116). Next, the control unit 28A updates the filter coefficient of the adaptive filter to which an audio signal is input based on the output signal so that the target component included in the output signal is maximized (S117). Specifically, the filter coefficients of the adaptive filter F2A and the adaptive filter F2E are updated. Then, the audio processing device 21 performs Step S101 again.

Note that, when the filter unit F2 includes two adaptive filters to which the second directional signal can be input, steps so far are partially changed as follows. For example, when the abnormality detection unit 31 can detect abnormality of the microphone MC2, and the filter unit F2 separately includes the adaptive filter F2A1 to which the second directional signal is input when the abnormality of the microphone MC2 is detected and the adaptive filter F2A2 to which the second directional signal is input when the abnormality of the microphone MC2 is not detected, the adaptive filter F2A to which the second directional signal is input in the steps so far is only required to be read as the adaptive filter F2A2. Steps to be described below are performed when the abnormality detection unit 31 can detect abnormality of the microphone MC2, and the filter unit F2 separately includes the adaptive filter F2A1 to which the second directional signal is input when the abnormality of the microphone MC2 is detected and the adaptive filter F2A2 to which the second directional signal is input when the abnormality of the microphone MC2 is not detected.

In Step S109, when the microphone in which the abnormality has been detected is the microphone on the same side as the target seat, the abnormality detection unit 31 outputs the determination result to the control unit 28A as a flag. In this example, the abnormality in the microphone MC2 is detected. The directionality control unit 30A performs the directionality control processing using the audio signal C and the audio signal D, and generates the third directional signal and the fourth directional signal (S118). Then, the determination unit 35A determines which audio component has been input to the microphone which is on the same side as the microphone in which the abnormality has been detected and in which no abnormality has been detected (S119). For example, when abnormality is detected in the microphone MC2, the determination unit 35A determines which of voice of the driver hm1 and voice of the occupant hm2 has been input to the microphone MC1. In other words, the determination unit 35A determines which of voice of the driver hm1 and voice of the occupant hm2 the audio signal A includes more. The determination unit 35A outputs this determination result as a flag to the control unit 28A.

When the audio signal A includes more of voice of the occupant hm2, the control unit 28A sets the strength of the audio signal A to zero, and outputs the audio signal A as an output signal (S108). In this case, the control unit 28A does not update the filter coefficients of the adaptive filter F2A1, the adaptive filter F2A2, the adaptive filter F2B, the adaptive filter F2C, the adaptive filter F2D, and the adaptive filter F2E. Then, the audio processing device 21A performs Step S101 again.

When the audio signal A includes more voice of the driver hm1, the filter unit F2 generates a subtraction signal as follows (S120). The control unit 28A controls the filter unit F2 such that the audio signal B is input to the adaptive filter F2A1 with a strength of zero. In contrast, the control unit 28A controls the filter unit F2 such that third directional signal is input to the adaptive filter F2B. Furthermore, the control unit 28A controls the filter unit F2 such that the fourth directional signal is input to the adaptive filter F2D. In other words, the control unit 28A does not change the strength of the third directional signal input to the adaptive filter F2B and the strength of the fourth directional signal input to the adaptive filter F2D, but changes the strength of the audio signal B input to the adaptive filter F2A1 to zero. The adaptive filter F2B passes the third directional signal, and outputs the passing signal P2B. The adaptive filter F2D passes the fourth directional signal, and outputs the passing signal P2D. The filter unit F2 adds together the passing signal P2B and the passing signal P2D, and outputs these signals as a subtraction signal. The addition unit 27A subtracts the subtraction signal from the audio signal A, and generates and outputs an output signal (S121). The output signal is input to the control unit 28A, and output from the control unit 28A. Next, the control unit 28A updates the filter coefficients of the adaptive filter F2B and the adaptive filter F2D based on the output signal such that a target component included in the output signal is maximized with reference to a flag serving as a determination result output from the abnormality detection unit 31 and a flag serving as a determination result output from the determination unit 35A (S122). Then, the audio processing device 21A performs Step S101 again.

Note that, although an example in which the abnormality detection unit 31 can detect the abnormality of the microphone MC1 and the microphone MC2 has been described, the abnormality detection unit 31 may be allowed to detect the abnormality of only the microphone MC3 and the microphone MC4. In that case, Steps S107, S108, S109, and S118 to S122 are omitted in the flowchart of FIG. 8.

In the embodiment, the filter coefficient is not updated for an adaptive filter to which an audio signal is input with a strength of zero. This can reduce a processing amount of the control unit 28A as compared with that in a case where the filter coefficients of all adaptive filters are constantly updated. In contrast, the control unit 28A may constantly update the filter coefficients of all the adaptive filters. The control unit 28A can constantly perform the same processing by constantly updating the filter coefficients of all the adaptive filters, so that the processing is simplified. Furthermore, the filter coefficient of a certain adaptive filter can be accurately updated by constantly updating the filter coefficients of all the adaptive filters, for example, even immediately after the change from a state in which an audio signal with a strength of zero is input to a state in which an audio signal with a strength of not zero is input.

As described above, the audio processing system 5A in the second embodiment determines voice of a specific speaker with high accuracy by acquiring a plurality of audio signals with a plurality of microphones and subtracting a subtraction signal generated by using an adaptive filter from a certain audio signal by using another audio signal as a reference signal. Furthermore, in the second embodiment, even when abnormality is detected in some microphones, a crosstalk component can be canceled based on voice leaking into another microphone. This allows voice of a specific speaker to be obtained with high accuracy even when a microphone has abnormality. Furthermore, in the second embodiment, when a target component is obtained by using an adaptive filter, an audio signal output from a microphone in which abnormality is detected is not used as a reference signal. This can reduce an amount of processing of canceling a crosstalk component. Furthermore, the filter coefficient is not required to be updated for an adaptive filter to which an audio signal is input with a strength of zero. This can further reduce a processing amount as compared with that in a case where the filter coefficients are constantly updated for all adaptive filters.

Third Embodiment

An audio processing system 5B according to a third embodiment is different from the audio processing system 5A according to the second embodiment in that the audio processing system 5B includes an audio processing device 20B instead of the audio processing device 20A and the audio processing system 5B does not include the directionality control unit 30A.

The audio processing device 20B according to the third embodiment detects the presence or absence of abnormality in each microphone. The audio processing device 20B performs processing of canceling a crosstalk component by using an audio signal output from a microphone in which abnormality has not been detected. The audio processing device 20B will be described below with reference to FIGS. 9, 10, and 11. The same configurations and operations as those described in the first embodiment and the second embodiment are denoted by the same reference signs, and the description thereof will be omitted or simplified.

Figure 9:
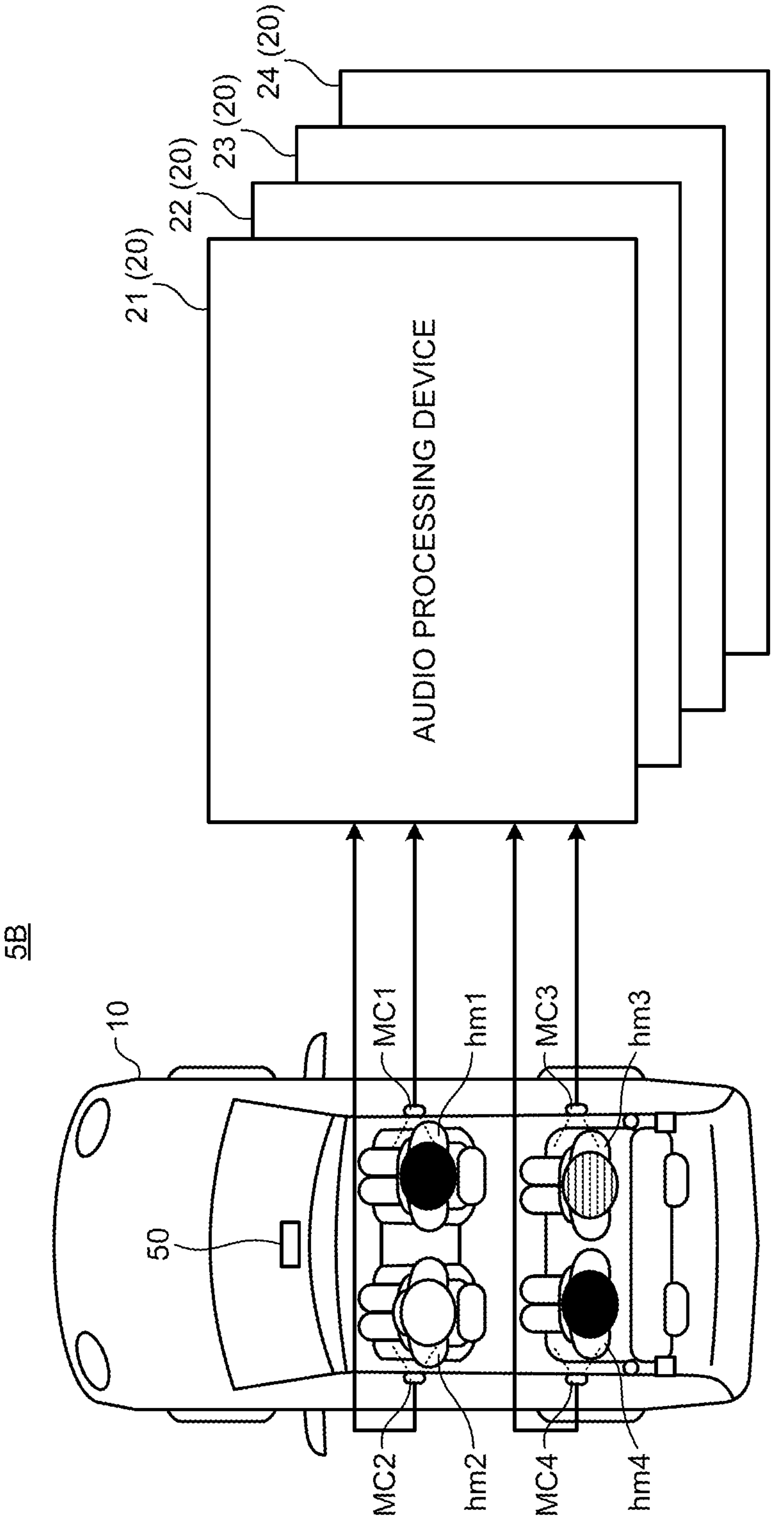
FIG. 9 illustrates one example of the schematic configuration of an audio processing system in a third embodiment.

Details of the audio processing system 5B according to the second embodiment will be described with reference to FIG. 9. FIG. 9 illustrates one example of the schematic configuration of the audio processing system 5B according to the third embodiment. The audio processing system 5B includes the microphone MC1, the microphone MC2, the microphone MC3, the microphone MC4, and the audio processing device 20B. In the embodiment, the microphone MC1 is disposed on, for example, an assist grip on the right side of the driver seat. In the embodiment, the microphone MC2 is disposed on, for example, an assist grip on the left side of the passenger seat. In the embodiment, the microphone MC3 is disposed on, for example, an assist grip on the right side of a rear seat. In the embodiment, the microphone MC4 is disposed on, for example, an assist grip on the left side of a rear seat. The microphone MC1 is located farther from the right seat of the rear seats than the microphone MC3 is. The microphone MC2 is located farther from the left seat of the rear seats than the microphone MC4 is. The microphone MC4 is located closer to the left seat of the rear seats than the microphone MC3 is.

In the embodiment, the audio processing system 5B includes a plurality of audio processing devices 20B that address the respective microphones. Specifically, the audio processing system 5B includes an audio processing device 21B, an audio processing device 22B, an audio processing device 23B, and an audio processing device 24B. The audio processing device 21B addresses the microphone MC1. The audio processing device 22B addresses the microphone MC2. The audio processing device 23B addresses the microphone MC3. The audio processing device 24B addresses the microphone MC4. The audio processing device 21B, the audio processing device 22B, the audio processing device 23B, and the audio processing device 24B may be collectively referred to as the audio processing devices 20B below.

Although, in the configuration in FIG. 9, the audio processing device 21B, the audio processing device 22B, the audio processing device 23B, and the audio processing device 24B are described as being configured by different pieces of hardware, one audio processing device 20B may implement the functions of the audio processing device 21B, the audio processing device 22B, the audio processing device 23B, and the audio processing device 24B. Alternatively, some of the audio processing device 21B, the audio processing device 22B, the audio processing device 23B, and the audio processing device 24B may be configured by common hardware, and the others may be configured by different pieces of hardware.

Also in the embodiment, each of the audio processing devices 20B is disposed in each seat near each corresponding microphone.

Figure 10:
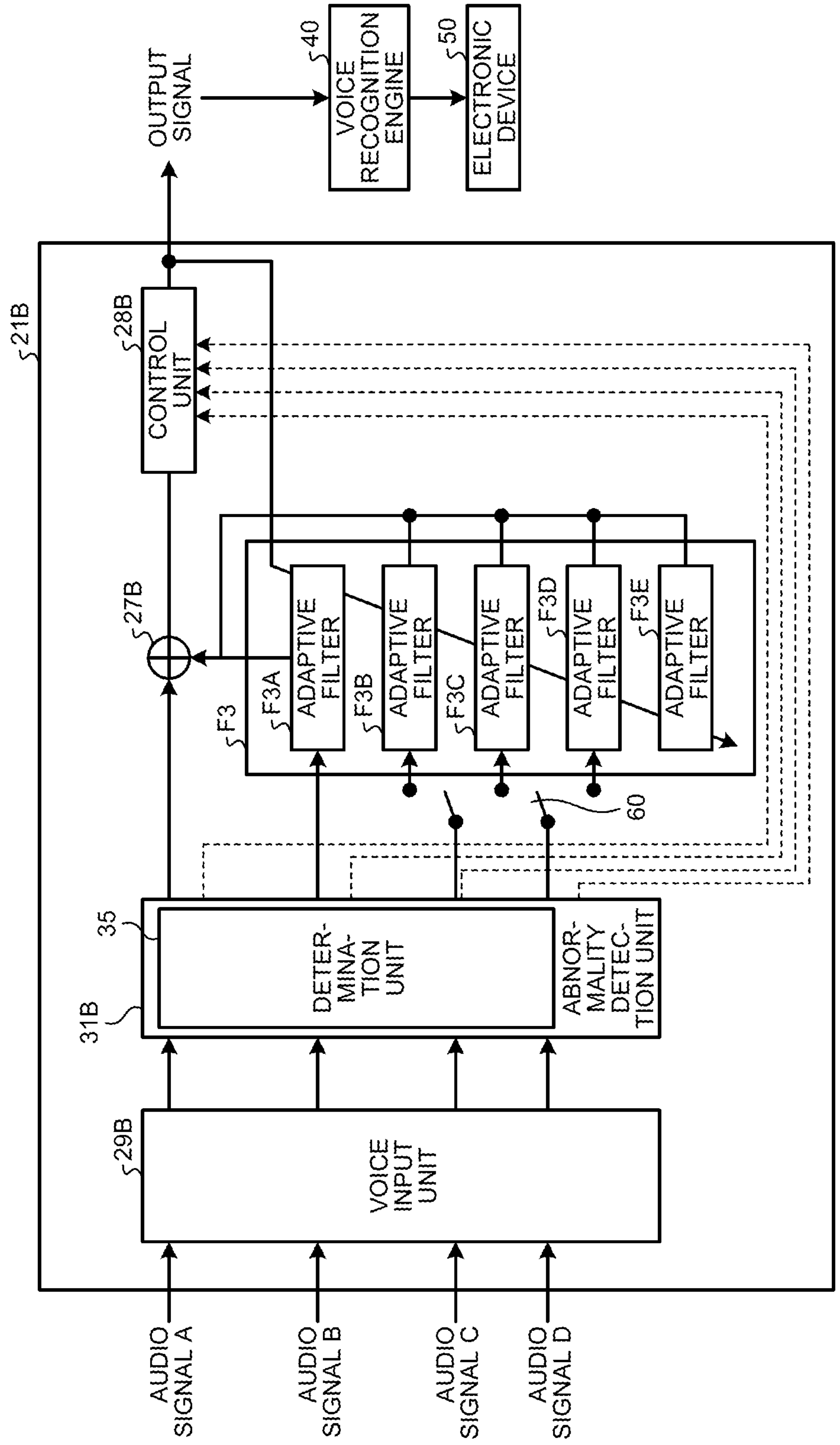
FIG. 10 is a block diagram illustrating the configuration of an audio processing device in the third embodiment.

FIG. 10 is a block diagram illustrating the configuration of the audio processing device 21B. All of the audio processing device 21B, the audio processing device 22B, the audio processing device 23B, and the audio processing device 24B have similar configurations and functions except for a part of the configuration of a filter unit to be described later. Here, the audio processing device 21B will be described. The audio processing device 21B sets voice uttered by the driver hm1 as a target. The audio processing device 21B outputs, as an output signal, an audio signal obtained by inhibiting a crosstalk component of an audio signal collected by the microphone MC1.

As illustrated in FIG. 10, the audio processing device 21B includes a voice input unit 29B, an abnormality detection unit 31B, a filter unit F3, a control unit 28B, and an addition unit 27B. The filter unit F3 includes a plurality of adaptive filters. The control unit 28B controls the filter coefficients of the adaptive filters of the filter unit F3.

Since the microphone MC1, the microphone MC2, the microphone MC3, the microphone MC4, and the voice input unit 29B are similar to those in the second embodiment, the description thereof will be omitted.

In the embodiment, the abnormality detection unit 31B includes a determination unit 35B. The determination unit 35B has a function of determining voice of which occupant an audio signal output from the microphone on the same side as the microphone in which abnormality has been detected includes more based on an audio signal output from a microphone in which no abnormality has been detected.

For example, when the microphone MC3 is determined to have abnormality, the determination unit 35B determines which of voice of the occupant hm3 and voice of the occupant hm4 the audio signal D includes more based on the audio signal A and the audio signal B. A specific determination method is similar to that described in the first embodiment and the second embodiment. Since the determination unit 35B has a configuration and a function similar to those described in the first embodiment, detailed description thereof will be omitted.

The abnormality detection unit 31B outputs a determination result of the presence or absence of abnormality in each microphone to the control unit 28B. The determination unit 35B outputs, to the control unit 28B, a result of determination of which of voice of the occupant hm3 and voice of the occupant hm4 the audio signal C or the audio signal D includes more. The determination unit 35B outputs the determination result to the control unit 28B as, for example, a flag. The flag indicates a value of "0" or "1". Here, "1" means that a corresponding microphone has been determined to have abnormality, and "0" means that a corresponding microphone has not been determined to have abnormality. Alternatively, "0" indicates that the audio signal includes more voice of the occupant hm3, and "1" indicates that the audio signal includes more voice of the occupant hm4. For example, when determining that the microphones MC1, MC2, and MC4 have no abnormality, determining that the microphone MC3 has abnormality, and determining that the audio signal D includes more voice of the occupant hm3, the determination unit 35B outputs a flag "0, 0, 1, 0, 0" to the control unit 28B as a determination result. Among the five flags in this example, the first four flags indicate results of determinations of the presence or absence of abnormality of a microphone, and the last one indicates a result of determination of voice of which occupant the audio signal includes more. The abnormality detection unit 31B may output the result of determination of the presence or absence of abnormality of a microphone at the same time as the determination unit 35B outputs a result of determination of voice of which occupant the audio signal includes more. Alternatively, the abnormality detection unit 31B may output the result of determination of the presence or absence of abnormality of a microphone as a flag at the time of completion of determination of the presence or absence of abnormality of a microphone. Next, the determination unit 35B may output a result of determination of voice of which occupant the audio signal includes more as a flag at the time of completion of determination of voice of which occupant the audio signal includes more.

After detecting abnormality of each microphone, the abnormality detection unit 31B outputs the audio signal A, the audio signal B, the audio signal C, and the audio signal D to the filter unit F3.

The filter unit F3 includes an adaptive filter F3A, an adaptive filter F3B, an adaptive filter F3C, an adaptive filter F3D, and an adaptive filter F3E. The filter unit F3 is used for processing of inhibiting a crosstalk component other than voice of the driver hm1 included in voice collected by the microphone MC1. The filter unit F3 in the embodiment is similar to the filter unit F2 in the second embodiment except that the audio signal B is input to an adaptive filter F3A instead of the second directional signal, and thus detailed description thereof will be omitted. The adaptive filter F3A outputs a passing signal P3A based on a filter coefficient C3A and the audio signal B. An adaptive filter F3B outputs a passing signal P3B based on a filter coefficient C3B and the audio signal C. An adaptive filter F3C outputs a passing signal P3C based on a filter coefficient C3C and the audio signal C. An adaptive filter F3D outputs a passing signal P3D based on a filter coefficient C3D and the audio signal D. The adaptive filter F3E outputs a passing signal P3E based on a filter coefficient C3E and the audio signal D. Also in the embodiment, the filter unit F3 may include two adaptive filters to which the audio signal B can be input. For example, the abnormality detection unit 31B may be allowed to detect abnormality of the microphone MC2. The filter unit F2 may separately include the adaptive filter F2A1 and the adaptive filter F2A2. When the abnormality of the microphone MC2 is detected, the audio signal B is input to the adaptive filter F2A1. When the abnormality of the microphone MC2 is not detected, the audio signal B is input to the adaptive filter F2A2.

The control unit 28B controls the filter coefficient of the adaptive filter based on a determination result of the abnormality detection unit 31B. In the embodiment, the control unit 28B determines to which of the adaptive filter F3B and the adaptive filter F3C the audio signal C is to be input based on a flag serving as determination results output from the abnormality detection unit 31B and the determination unit 35B. Furthermore, in the embodiment, the control unit 28B determines to which of the adaptive filter F3D and the adaptive filter F3E the audio signal D is to be input based on a flag serving as determination results output from the abnormality detection unit 31B and the determination unit 35B. Since the control on a filter coefficient is similar to that performed by the control unit 28A in the second embodiment, detailed description thereof will be omitted.

The addition unit 27B generates an output signal by subtracting a subtraction signal from target audio signals output from the voice input unit 29. In the embodiment, the subtraction signal is obtained by adding together the passing signal P3A, the passing signal P3B or the passing signal P3C, and the passing signal P3D or the passing signal P3E output from the filter unit F3. The addition unit 27B outputs an output signal to the control unit 28B.

The control unit 28B outputs the output signal output from the addition unit 27B. Use of the output signal is similar to that in the first embodiment.

Furthermore, the control unit 28B updates the filter coefficient of each adaptive filter with reference to an output signal output from the addition unit 27B, a flag serving as a determination result output from the abnormality detection unit 31, and a flag serving as a determination result output from the determination unit 35B. Since the update of a filter coefficient is similar to that performed by the control unit 28A in the second embodiment, detailed description thereof will be omitted.

In the embodiment, the functions of the voice input unit 29, the abnormality detection unit 31B, the filter unit F3, the control unit 28B, and the addition unit 27B are implemented by a processor executing a program held in a memory. Alternatively, the voice input unit 29, the abnormality detection unit 31B, the filter unit F3, the control unit 28B, and the addition unit 27B may be configured by different pieces of hardware.

Although the audio processing device 21B has been described, the audio processing device 22B, the audio processing device 23B, and an audio processing device 24B also have substantially similar configurations except for the filter unit. The audio processing device 22B sets voice uttered by the occupant hm2 as a target component. The audio processing device 22B outputs, as an output signal, an audio signal obtained by inhibiting a crosstalk component of an audio signal collected by the microphone MC2. Therefore, the audio processing device 22B is different from the audio processing device 21B in that the audio processing device 22B includes a filter unit to which the audio signal A, the audio signal C, and the audio signal D are input. The same applies to the audio processing device 23B and the audio processing device 24B.

Figure 11:
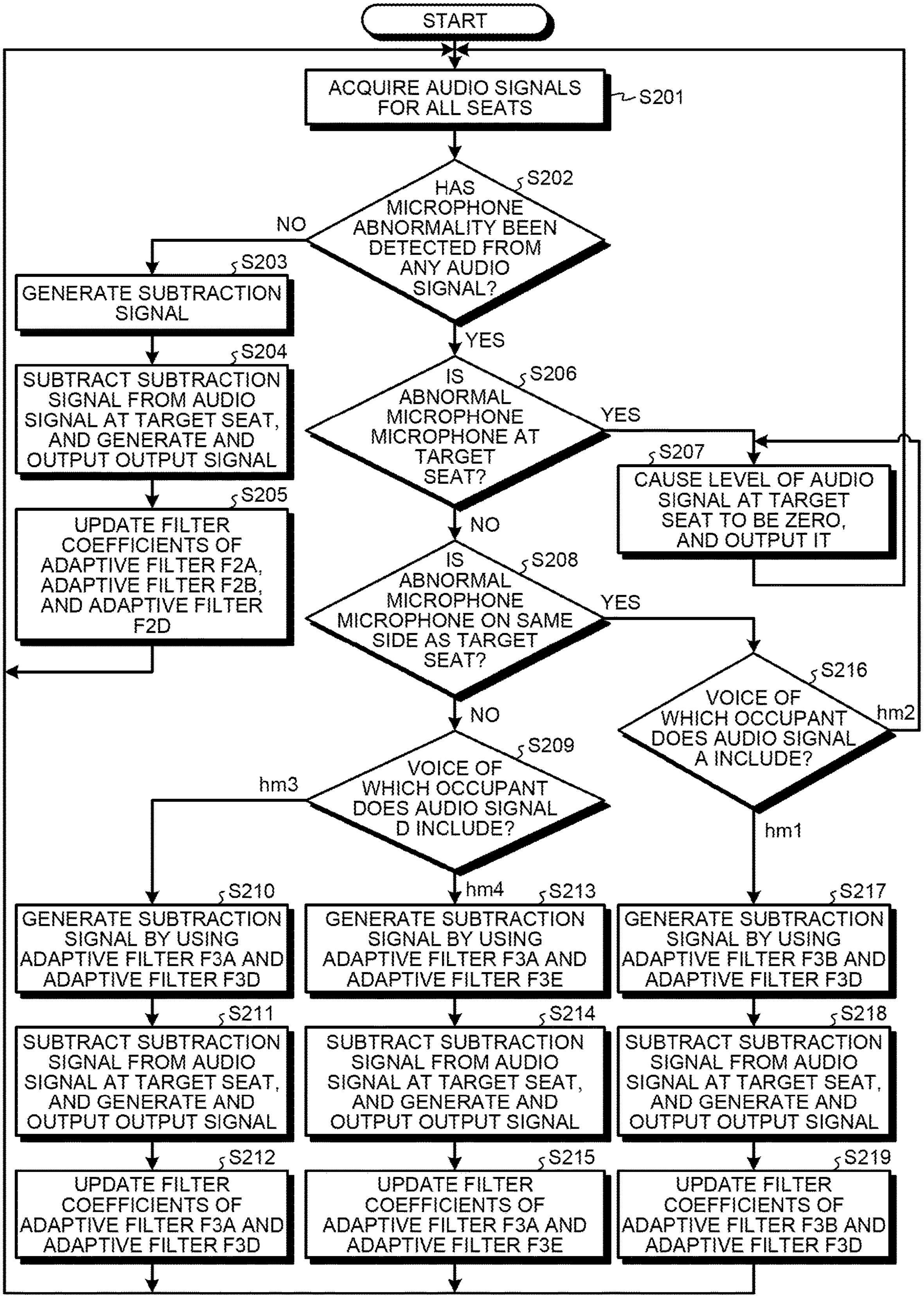
FIG. 11 is a flowchart illustrating an operation procedure of the audio processing device in the third embodiment.

FIG. 11 is a flowchart illustrating an operation procedure of the audio processing device 21B. First, the audio signal A, the audio signal B, the audio signal C, and the audio signal D are input to the voice input unit 29 (S201). Next, the abnormality detection unit 31B determines the presence or absence of abnormality of each microphone based on each audio signal (S202). The abnormality detection unit 31B may output the determination result to the control unit 28B as a flag at this time. When no abnormality is detected in any of the microphones, the abnormality detection unit 31B outputs all the audio signals to the filter unit F3. The filter unit F3 generates a subtraction signal as follows (S203). The adaptive filter F3A passes the audio signal B, and outputs the passing signal P3A. The adaptive filter F3B passes the audio signal C, and outputs the passing signal P3B. The adaptive filter F3D passes the audio signal C, and outputs the passing signal P3D. The filter unit F3 adds together the passing signal P3A, the passing signal P3B, and the passing signal P3D, and outputs these signals as a subtraction signal. The addition unit 27B subtracts the subtraction signal from the audio signal A, and generates and outputs an output signal (S204). The output signal is input to the control unit 28B, and output from the control unit 28B. Next, the control unit 28B updates the filter coefficients of the adaptive filter F3A, the adaptive filter F3B, and the adaptive filter F3D based on the output signal such that a target component included in the output signal is maximized with reference to a flag serving as a determination result output from the abnormality detection unit 31B (S205). Then, the audio processing device 21B performs Step S201 again.

When abnormality is detected in any of the microphones in Step S202 (S202: Yes), the abnormality detection unit 31B determines whether the microphone in which the abnormality has been detected is a microphone in a target seat (S206). At this time, the abnormality detection unit 31B may output the determination result to the control unit 28B as a flag. When the microphone in which the abnormality is detected is the microphone in the target seat (S206: Yes), the control unit 28B sets the strength of the audio signal A received from the voice input unit 29 to zero, and outputs the audio signal A as an output signal (S207). In this case, the control unit 28B does not update the filter coefficients of the adaptive filter F3A, the adaptive filter F3B, the adaptive filter F3C, the adaptive filter F3D, and the adaptive filter F3E. Then, the audio processing device 21B performs Step S201 again.

When the microphone in which the abnormality has been detected is not the microphone in the target seat in Step S206 (S206: No), the abnormality detection unit 31B determines whether the microphone in which the abnormality has been detected is a microphone on the same side as the target seat (S208). When the microphone in which the abnormality has been detected is not the microphone on the same side as the target seat (S208: No), the abnormality detection unit 31B may output the determination result to the control unit 28B as a flag at this time. The determination unit 35B determines which audio component has been input to the microphone, which is on the same side as the microphone in which the abnormality has been detected and in which no abnormality has been detected (S209). Description will be given below on the assumption that abnormality has been detected in the microphone MC3. Since the subsequent is similar to that in the second embodiment, detailed description thereof will be omitted. When the audio signal D is determined to include more voice of the occupant hm3, the filter unit F3 generates a subtraction signal by using the adaptive filter F3A and the adaptive filter F3D (S210). Similarly to Step S4, the addition unit 27B subtracts the subtraction signal from the audio signal A, and generates and outputs an output signal (S211). Next, the control unit 28B updates the filter coefficient of the adaptive filter to which an audio signal is input based on the output signal so that the target component included in the output signal is maximized (S212). Then, the audio processing device 21 performs Step S201 again.

When the audio signal D is determined to include more voice of the occupant hm4 in Step S209 (S209: hm3), the filter unit F3 generates a subtraction signal by using the adaptive filter F3A and the adaptive filter F3E (S213). Similarly to Step S4, the addition unit 27B subtracts the subtraction signal from the audio signal A, and generates and outputs an output signal (S214). Next, the control unit 28A updates the filter coefficient of the adaptive filter to which an audio signal is input based on the output signal so that the target component included in the output signal is maximized (S215). Then, the audio processing device 21 performs Step S201 again.

Note that, when the filter unit F3 includes two adaptive filters to which the audio signal B can be input, steps so far are partially changed as follows. For example, when the abnormality detection unit 31B can detect abnormality of the microphone MC2, and the filter unit F3 separately includes an adaptive filter F3A1 to which the audio signal B is input when the abnormality of the microphone MC2 is detected and an adaptive filter F3A2 to which the audio signal B is input when the abnormality of the microphone MC2 is not detected, the adaptive filter F3A to which the second directional signal is input in the steps so far is only required to be read as the adaptive filter F3A2. Steps to be described below are performed when the abnormality detection unit 31B can detect abnormality of the microphone MC2, and the filter unit F3 separately includes the adaptive filter F3A1 to which the audio signal B is input when the abnormality of the microphone MC2 is detected and the adaptive filter F3A2 to which the audio signal B is input when the abnormality of the microphone MC2 is not detected.

In Step S208, when the microphone in which the abnormality has been detected is the microphone on the same side as the target seat, the abnormality detection unit 31B outputs the determination result to the control unit 28B as a flag. In this example, the abnormality in the microphone MC2 is detected. Then, the determination unit 35B determines which audio component has been input to the microphone, which is on the same side as the microphone in which the abnormality has been detected and in which no abnormality has been detected (S216). For example, when abnormality is detected in the microphone MC2, the determination unit 35B determines which of voice of the driver hm1 and voice of the occupant hm2 has been input to the microphone MC1. In other words, the determination unit 35B determines which of voice of the driver hm1 and voice of the occupant hm2 the audio signal A includes more. The determination unit 35B outputs this determination result as a flag to the control unit 28B.

When the audio signal A includes more of voice of the occupant hm2, the control unit 28B sets the strength of the audio signal A to zero, and outputs the audio signal A as an output signal (S207). In this case, the control unit 28B does not update the filter coefficients of the adaptive filter F3A1, the adaptive filter F3A2, the adaptive filter F3B, the adaptive filter F3C, the adaptive filter F3D, and the adaptive filter F3E. Then, the audio processing device 21B performs Step S201 again.

When the audio signal A includes more voice of the driver hm1, the filter unit F3 generates a subtraction signal as follows (S217). The control unit 28B controls the filter unit F3 such that the audio signal B is input to the adaptive filter F3A1 with a strength of zero. In contrast, the control unit 28B controls the filter unit F3 such that the audio signal C is input to the adaptive filter F3B. Furthermore, the control unit 28B controls the filter unit F3 such that the audio signal D is input to the adaptive filter F3D. In other words, the control unit 28B does not change the strength of the audio signal C input to the adaptive filter F3B and the strength of the audio signal D input to the adaptive filter F3D, but changes the strength of the audio signal B input to the adaptive filter F3A1 to zero. The adaptive filter F3B passes the audio signal C, and outputs the passing signal P3B. The adaptive filter F3D passes the audio signal D, and outputs the passing signal P3D. The filter unit F3 adds together the passing signal P3B and the passing signal P3D, and outputs these signals as a subtraction signal. The addition unit 27B subtracts the subtraction signal from the audio signal A, and generates and outputs an output signal (S218). The output signal is input to the control unit 28B, and output from the control unit 28B. Next, the control unit 28B updates the filter coefficients of the adaptive filter F3B and the adaptive filter F3D based on the output signal such that a target component included in the output signal is maximized with reference to a flag serving as a determination result output from the abnormality detection unit 31B (S219). Then, the audio processing device 21B performs Step S201 again.

Note that, although an example in which the abnormality detection unit 31B can detect the abnormality of the microphone MC1 and the microphone MC2 has been described, the abnormality detection unit 31B may be allowed to detect the abnormality of only the microphone MC3 and the microphone MC4. In that case, Steps S206, S207, S208, and S216 to S219 are omitted in the flowchart of FIG. 11.

In the embodiment, the filter coefficient is not updated for an adaptive filter to which an audio signal is input with a strength of zero. This can reduce a processing amount of the control unit 28A as compared with that in a case where the filter coefficients of all adaptive filters are constantly updated. In contrast, the control unit 28B may constantly update the filter coefficients of all the adaptive filters. The control unit 28A can constantly perform the same processing by constantly updating the filter coefficients of all the adaptive filters, so that the processing is simplified. Furthermore, the filter coefficient of a certain adaptive filter can be accurately updated by constantly updating the filter coefficients of all the adaptive filters, for example, even immediately after the change from a state in which an audio signal with a strength of zero is input to a state in which an audio signal with a strength of not zero is input.

As described above, also in the audio processing system 5B in the third embodiment, effects similar to those in the audio processing system 5A according to the second embodiment can be obtained.

Fourth Embodiment

An audio processing system 5C according to a fourth embodiment is different from the audio processing system 5 according to the first embodiment in that the audio processing system 5C includes an audio processing device 20C instead of the audio processing device 20. The audio processing device 20C according to the fourth embodiment does not determine voice of which occupant has been input to a microphone to which voice of a plurality of occupants can be input. The audio processing device 20C performs processing of canceling a crosstalk component by using an audio signal output from the microphone. The audio processing device 20C will be described below with reference to FIGS. 12, 13, and 14. The same configurations and operations as those described in the first embodiment are denoted by the same reference signs, and the description thereof will be omitted or simplified.

Figure 12:
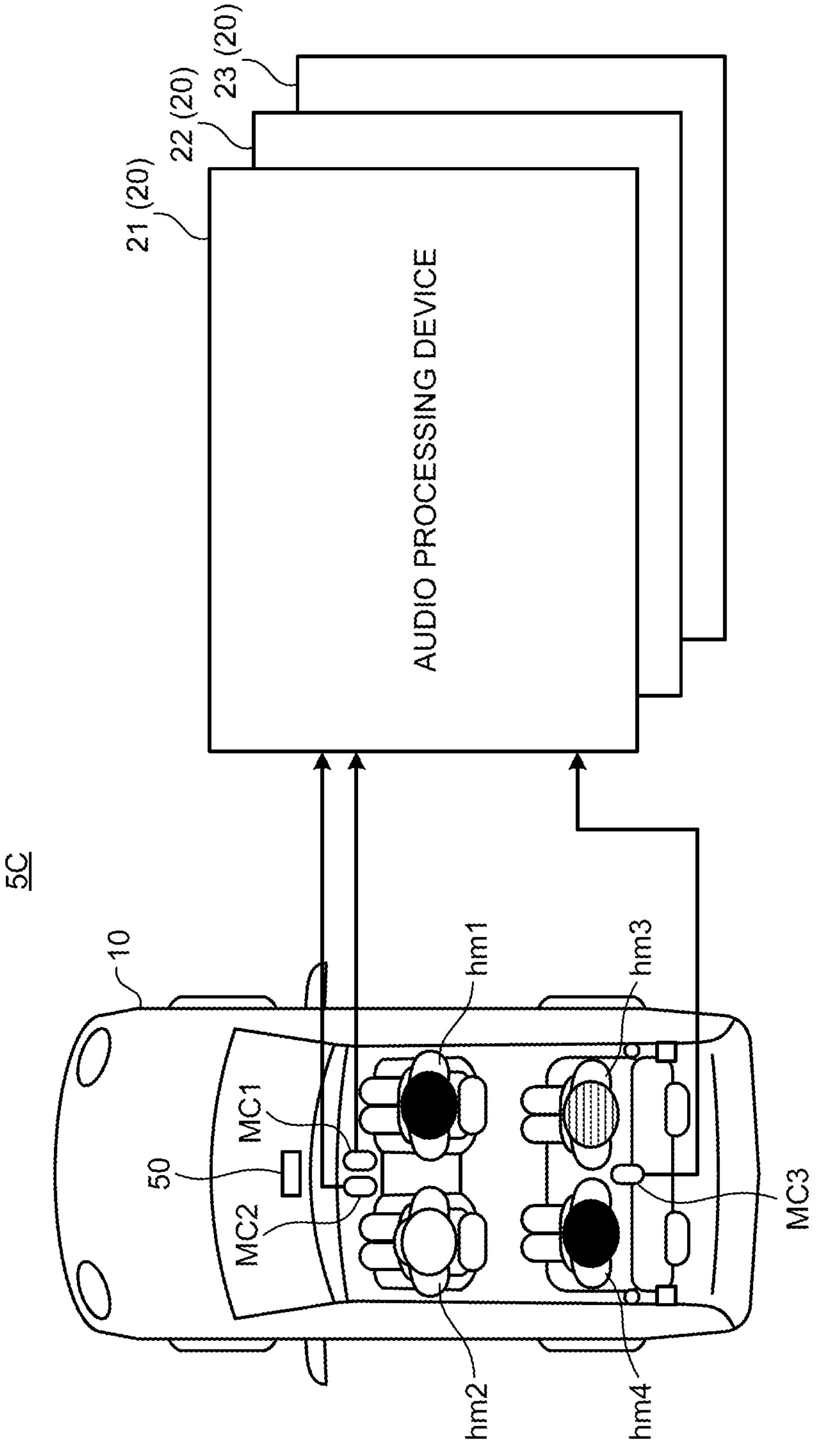
FIG. 12 illustrates one example of the schematic configuration of an audio processing system in a fourth embodiment.

Details of the audio processing system 5C according to the fourth embodiment will be described with reference to FIG. 12. FIG. 12 illustrates one example of the schematic configuration of the audio processing system 5C according to the fourth embodiment. The audio processing system 5C includes the microphone MC1, the microphone MC2, the microphone MC3, and audio processing devices 20C. Since the microphone MC1, the microphone MC2, and the microphone MC3 are similar to those in the first embodiment, detailed description thereof will be omitted.

In the embodiment, the audio processing system 5C includes a plurality of audio processing devices 20C that address the respective microphones. Specifically, the audio processing system 5C includes an audio processing device 21C, an audio processing device 22C, and an audio processing device 23C. The audio processing device 21C addresses the microphone MC1. The audio processing device 22C addresses the microphone MC2. The audio processing device 23C addresses the microphone MC3. The audio processing device 21C, the audio processing device 22C, and the audio processing device 23C may be collectively referred to as the audio processing devices 20C below.

Figure 13:
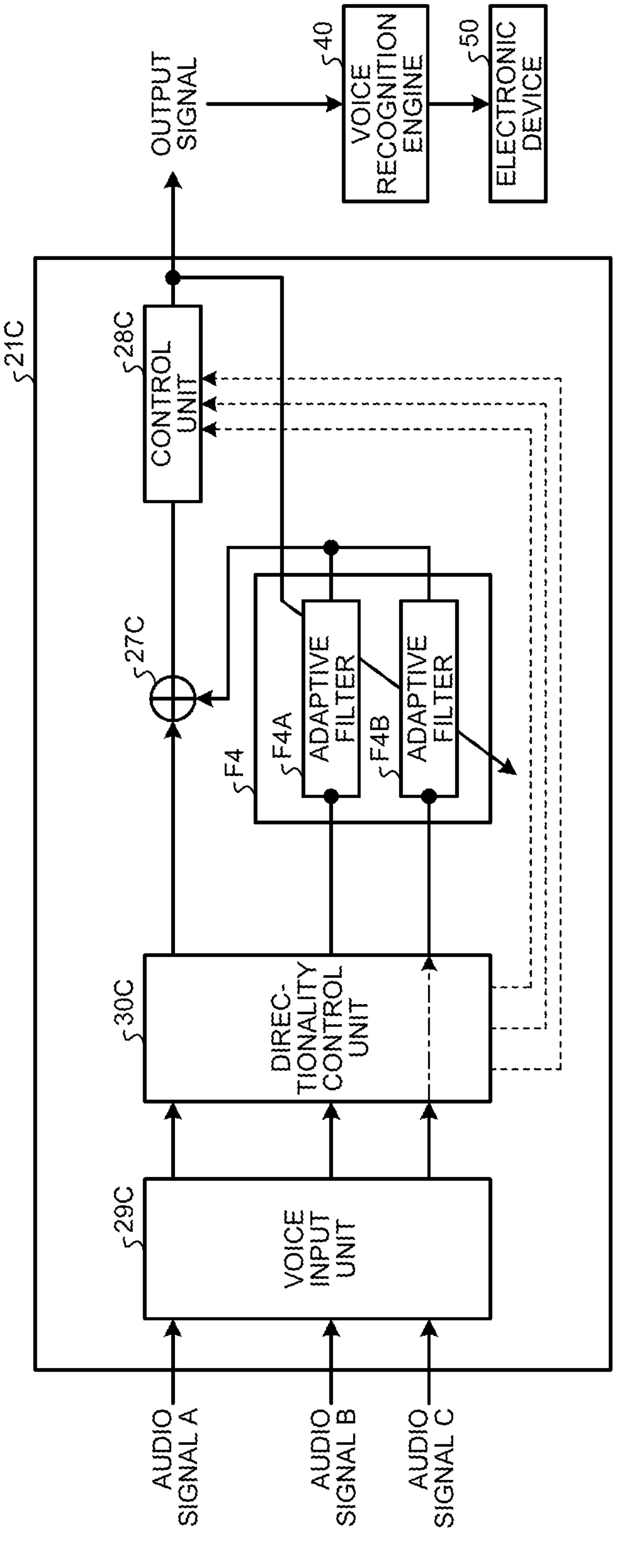
FIG. 13 is a block diagram illustrating the configuration of an audio processing device in the fourth embodiment.

Although, in the configuration in FIG. 13, the audio processing device 21C, the audio processing device 22C, and the audio processing device 23C are described as being configured by different pieces of hardware, one audio processing device 20C may implement the functions of the audio processing device 21C, the audio processing device 22C, and the audio processing device 23C. Alternatively, some of the audio processing device 21C, the audio processing device 22C, and the audio processing device 23C may be configured by common hardware, and the others may be configured by different pieces of hardware.

Also in the embodiment, each of the audio processing devices 20C is disposed in each seat near each corresponding microphone. The position of the audio processing device 20C is similar to that in the first embodiment, for example.

FIG. 13 is a block diagram illustrating the configuration of the audio processing device 21C. All of the audio processing device 21C, the audio processing device 22C, and the audio processing device 23C have similar configurations and functions except for a part of the configuration of a filter unit to be described later. Here, the audio processing device 21C will be described. The audio processing device 21C sets voice uttered by the driver hm1 as a target component. The audio processing device 21C outputs, as an output signal, an audio signal obtained by inhibiting a crosstalk component of an audio signal collected by the microphone MC1.

As illustrated in FIG. 13, the audio processing device 21C includes a voice input unit 29C, a directionality control unit 30C, a filter unit F4, a control unit 28C, and an addition unit 27C. The filter unit F4 includes a plurality of adaptive filters. The control unit 28C controls the filter coefficients of the plurality of adaptive filters.

Since the voice input unit 29C is similar to the voice input unit 29 in the first embodiment, the description thereof will be omitted.

The audio signal A, the audio signal B, and the audio signal C output from the voice input unit 29C are input to the directionality control unit 30C. The directionality control unit 30C performs directionality control processing by using the audio signal A and the audio signal B. Then, the directionality control unit 30C outputs a first directional signal obtained by performing the directionality control processing on the audio signal A. Furthermore, the directionality control unit 30C outputs a second directional signal obtained by performing the directionality control processing on the audio signal B. The directionality control unit 30C outputs the first directional signal to the addition unit 27C, and outputs the second directional signal and the audio signal C to the filter unit F4.

Furthermore, the directionality control unit 30C determines whether an audio component has been input to the microphone MC3. For example, the directionality control unit 30A determines that an audio signal has been input to the microphone MC3 when the audio signal C has a strength greater than at least one of the strength of the first directional signal and the strength of the second directional signal, and determines that an audio signal has not been input to the microphone MC3 when this is not the case.

The directionality control unit 30C outputs, to the control unit 28C, a result of determination of whether an audio component has been input to the microphone MC3. The directionality control unit 30C outputs the determination result to the control unit 28C as, for example, a flag. The flag indicates a value of "0" or "1". Here, "0" indicates that no audio component has been input to the microphone MC3, and "1" indicates that an audio component has been input to the microphone MC3.

Although, in the embodiment, the directionality control unit 30C determines whether an audio component has been input to the microphone MC3, the audio processing device 21C may include an utterance determination unit serving as a determination unit separately from the directionality control unit 30C, and the utterance determination unit may make the determination. In that case, the utterance determination unit is connected between the voice input unit 29C and the directionality control unit 30C, for example. Alternatively, the audio processing device 21C may include only the utterance determination unit, and is not required to include the directionality control unit 30C. Since the utterance determination unit has a configuration and a function similar to those of the determination unit 35 described in the first embodiment, detailed description thereof will be omitted.

The filter unit F4 includes an adaptive filter F4A and an adaptive filter F4B. The filter unit F4 is used for processing of inhibiting a crosstalk component other than voice of the driver hm1 included in voice collected by the microphone MC1. Although, in the embodiment, the filter unit F4 includes two adaptive filters, the number of adaptive filters is appropriately set based on the number of input audio signals and a processing amount of the crosstalk inhibiting processing. The processing of inhibiting crosstalk will be described in detail later.

The second directional signal is input to the adaptive filter F4A as a reference signal. The adaptive filter F4A outputs a passing signal P4A based on a filter coefficient C4A and the second directional signal. The audio signal C is input to the adaptive filter F4B as a reference signal. In the embodiment, the audio signal C is input to the adaptive filter F4B both when the audio signal C includes more voice by the occupant hm3 and when the audio signal C includes more voice by the occupant hm4. An adaptive filter F4B outputs a passing signal P4B based on a filter coefficient C4B and the audio signal C. The filter unit F4 adds together and outputs a passing signal P4A and a passing signal P4B. In the embodiment, the adaptive filter F4A and the adaptive filter F4B are implemented by a processor executing a program. The adaptive filter F4A and the adaptive filter F4B may have physically separated different hardware configurations.

The addition unit 27C generates an output signal by subtracting a subtraction signal from target audio signals output from the voice input unit 29C. In the embodiment, the subtraction signal is obtained by adding together the passing signal P4A and the passing signal P4B output from the filter unit F4. The addition unit 27C outputs an output signal to the control unit 28C.

The control unit 28C outputs the output signal output from the addition unit 27C. Use of the output signal is similar to that in the first embodiment.

Furthermore, the control unit 28C updates the filter coefficient of each adaptive filter with reference to the output signal output from the addition unit 27C. Specifically, the control unit 28C updates the filter coefficients of the adaptive filter F4A and the adaptive filter F4B such that the value of the error signal in Expression (1) approaches zero. A specific method of updating a filter coefficient is similar to that described in the first embodiment.

In the embodiment, the functions of the voice input unit 29C, the directionality control unit 30C, the filter unit F4, the control unit 28C, and the addition unit 27C are implemented by a processor executing a program held in a memory. Alternatively, the voice input unit 29C, the directionality control unit 30C, the filter unit F4, the control unit 28C, and the addition unit 27C may be configured by different pieces of hardware.

Although the audio processing device 21C has been described, the audio processing device 22C and the audio processing device 23C also have substantially similar configurations except for the filter unit. The audio processing device 22C sets voice uttered by the occupant hm2 as a target component. The audio processing device 22C outputs, as an output signal, an audio signal obtained by inhibiting a crosstalk component of an audio signal collected by the microphone MC2. Therefore, the audio processing device 22C is different from the audio processing device 21C in that the audio processing device 22C includes a filter unit to which the first directional signal and the audio signal C are input. The same applies to the audio processing device 23C.

Figure 14:
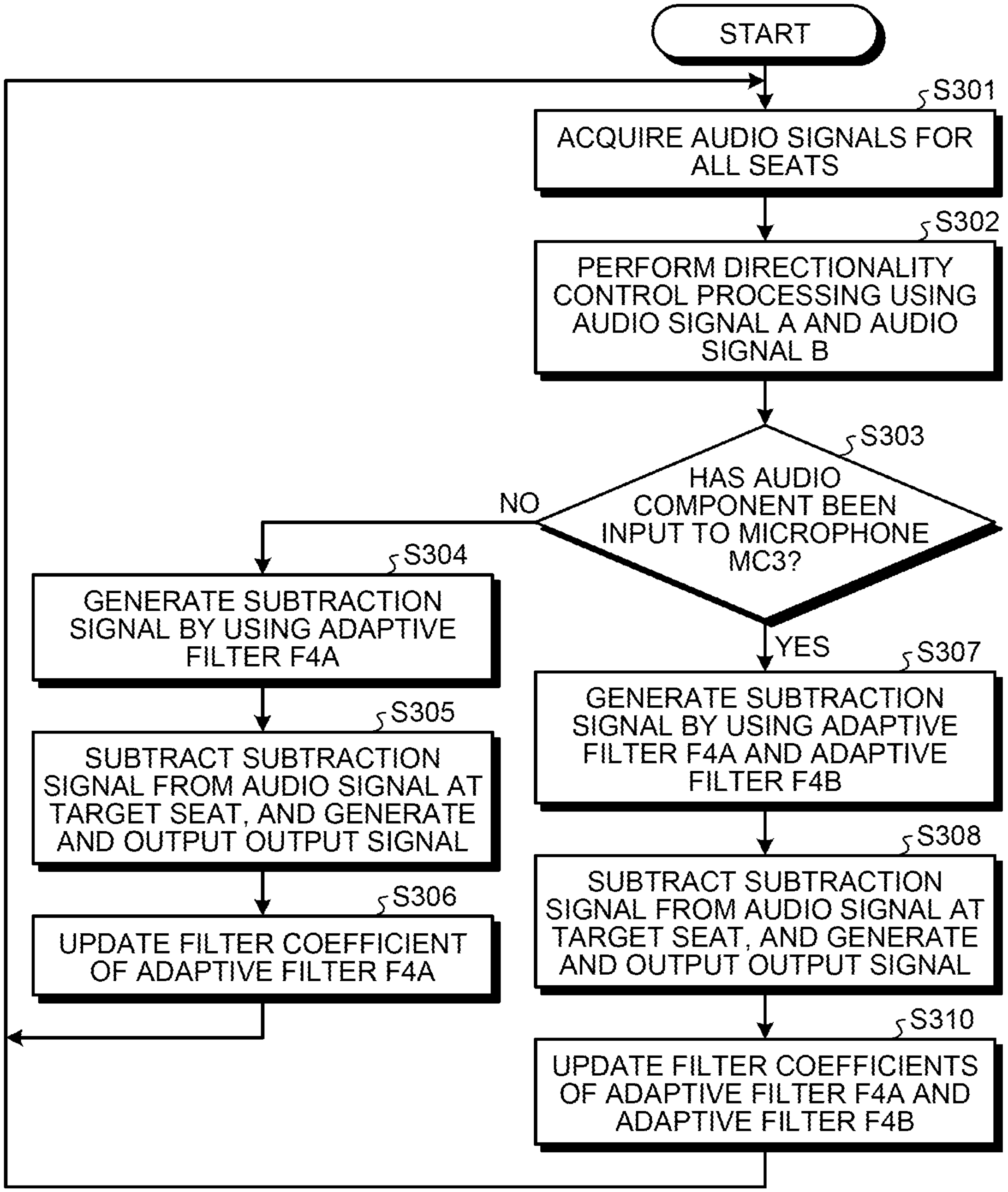
FIG. 14 is a flowchart illustrating an operation procedure of the audio processing device in the fourth embodiment.
Figure 15A:
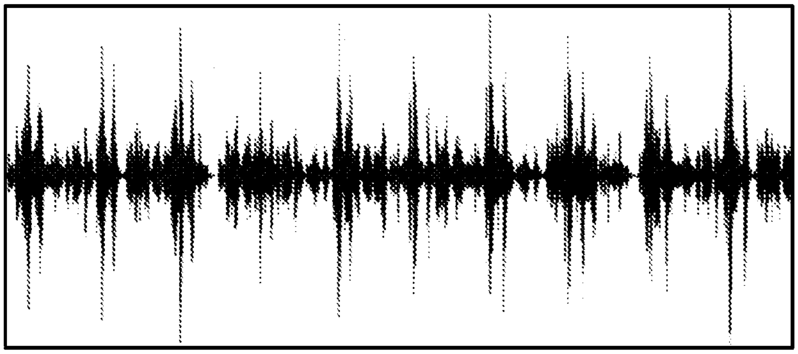
FIG. 15A illustrates an example of a spectrum of an audio signal (first directional signal) used in an audio processing device.
Figure 15B:
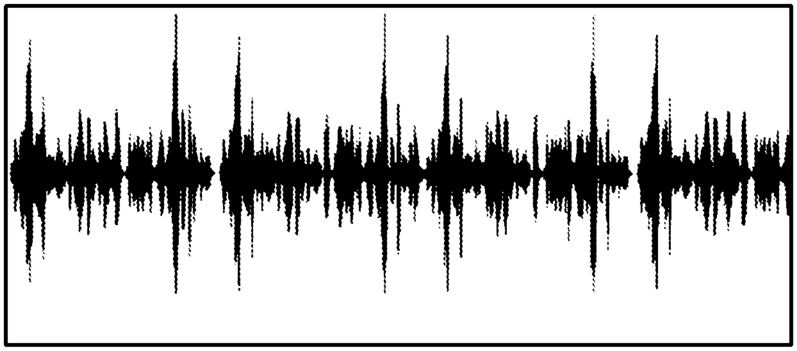
FIG. 15B illustrates an example of a spectrum of an audio signal (second directional signal) used in the audio processing device.
Figure 15C:
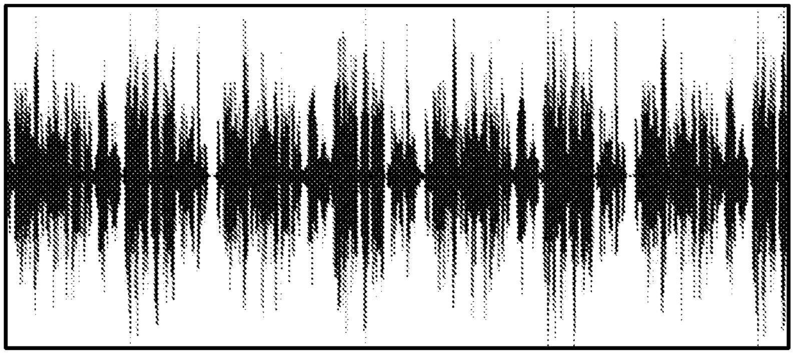
FIG. 15C illustrates an example of a spectrum of an audio signal C used in the audio processing device.
Figure 15D:
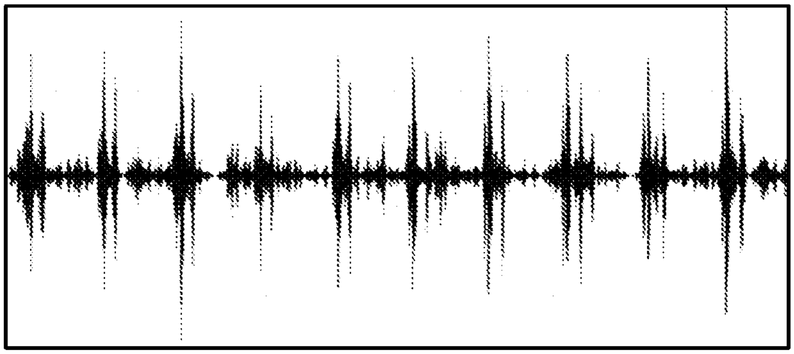
FIG. 15D illustrates an example of a spectrum of an output signal of the audio processing device.

FIG. 14 is a flowchart illustrating an operation procedure of the audio processing device 21C. First, the audio signal A, the audio signal B, and the audio signal C are input to the voice input unit 29C (S301). Next, the directionality control unit 30C performs directionality control processing using the audio signal A and the audio signal B, and generates the first directional signal and the second directional signal (S302). Then, the directionality control unit 30C determines whether an audio component has been input to the microphone MC3 (S303). The directionality control unit 30C outputs the determination result to the control unit 28C as a flag. When the directionality control unit 30C determines that the audio signal has not been input to the microphone MC3 (S303: No), the control unit 28C causes the strength of the audio signal C input to the filter unit F4 to be zero, and does not change the strength of the second directional signal. Then, the filter unit F4 generates a subtraction signal as follows (S304). The adaptive filter F4A passes the second directional signal, and outputs the passing signal P4A. The adaptive filter F4B passes the audio signal C, and outputs the passing signal P4B. The filter unit F4 adds together the passing signal P4A and the passing signal P4B, and outputs these signals as a subtraction signal. The addition unit 27C subtracts the subtraction signal from the first directional signal, and generates and outputs an output signal (S305). The output signal is input to the control unit 28C, and output from the control unit 28C. Next, the control unit 28C updates the filter coefficient of the adaptive filter F4A based on the output signal so that the target component included in the output signal is maximized (S306). Then, the audio processing device 21 performs Step S301 again.

When the directionality control unit 30C determines that an audio signal has been input to the microphone MC3 (S303: Yes), the filter unit F4 generates a subtraction signal as follows (S307). The control unit 28C controls the filter unit F4 such that the audio signal C is input to the adaptive filter F4B. Then, the filter unit F4 generates a subtraction signal by an operation similar to that in Step S304. Similarly to Step S305, the addition unit 27C subtracts the subtraction signal from the first directional signal, and generates and outputs an output signal (S308). Next, the control unit 28C updates the filter coefficient of the adaptive filter to which an audio signal is input based on the output signal so that the target component included in the output signal is maximized (S310). Specifically, the filter coefficients of the adaptive filter F4A and the adaptive filter F4B are updated. Then, the audio processing device 21C performs Step S301 again.

In the embodiment, the filter coefficient is not updated for an adaptive filter to which an audio signal is input with a strength of zero. This can reduce a processing amount of the control unit 28C as compared with that in a case where the filter coefficients of all adaptive filters are constantly updated. In contrast, the control unit 28C may constantly update the filter coefficients of all the adaptive filters. The control unit 28C can constantly perform the same processing by constantly updating the filter coefficients of all the adaptive filters, so that the processing is simplified. Furthermore, the filter coefficient of a certain adaptive filter can be accurately updated by constantly updating the filter coefficients of all the adaptive filters, for example, even immediately after the change from a state in which an audio signal with a strength of zero is input to a state in which an audio signal with a strength of not zero is input.

FIG. 15 illustrates an example of each audio signal and output signal in the audio processing device 21C. FIG. 15A illustrates a spectrum of the first directional signal. FIG. 15B illustrates a spectrum of the second directional signal. FIG. 15C illustrates a spectrum of the audio signal C. FIG. 15D illustrates a spectrum of an output signal. FIG. 15 illustrates an example of a case where the driver hm1, the occupant hm2, the occupant hm3, and the occupant hm4 simultaneously give utterance. The driver hm1 intermittently utters a specific word. The other occupants are chatting without intermission. Note that, the first directional signal and the second directional signal have an S/N ratio higher than that of the audio signal C since the directionality control processing is performed thereon. Comparing FIG. 15A with FIG. 15D, it can be seen that the output signal has an S/N ratio higher than that of the first directional signal due to processing of inhibiting a crosstalk component.

As described above, the audio processing system 5C in the fourth embodiment also determines voice of a specific speaker with high accuracy by acquiring a plurality of audio signals with a plurality of microphones and subtracting a subtraction signal generated by using an adaptive filter from a certain audio signal by using another audio signal as a reference signal. In the fourth embodiment, one microphone can collect a plurality of pieces of voice generated at different positions. Specifically, the microphone MC3 collects voice of the occupant hm3 and voice of the occupant hm4 in the rear seats. Then, even when the audio signal C output from the microphone MC3 includes any of voice of the occupant hm3 and voice of the occupant hm4, the audio signal C is input to the adaptive filter F4B. This allows an audio signal of a target component to be accurately determined even when one microphone collects a plurality of pieces of voice. Therefore, since a microphone is not required to be provided one by one for each seat, costs can be reduced. Furthermore, when a target component is determined by using an adaptive filter, the number of reference signals used for processing can be reduced as compared with that in a case where signals output from microphones provided for all the seats are used as reference signals. This can reduce an amount of processing of canceling a crosstalk component. Furthermore, in the fourth embodiment, processing of determining voice of which occupant an audio signal includes is not performed, and an occupant whose voice is included in the audio signal does not differently use adaptive filters. Therefore, an amount of processing of canceling a crosstalk component can be reduced, and the configuration of an audio processing device 5C can also be simplified. Furthermore, the filter coefficient is not required to be updated for an adaptive filter to which an audio signal is input with a strength of zero. This can further reduce a processing amount as compared with that in a case where the filter coefficients are constantly updated for all adaptive filters.

Fifth Embodiment

An audio processing system 5D according to a fifth embodiment is different from the audio processing system 5C according to the fourth embodiment in that the audio processing system 5D includes an audio processing device 20D instead of the audio processing device 20C. The audio processing device 20D according to the fifth embodiment inputs an audio signal output from a microphone to which voice of a plurality of occupants can be input to a plurality of adaptive filters. The plurality of adaptive filters includes an adaptive filter that addresses a case where voice of one occupant is input to the microphone and an adaptive filter that addresses a case where voice of another occupant is input to the microphone. The audio processing device 20D determines by which adaptive filter a crosstalk component can be further reduced, and performs processing of canceling the crosstalk component by using the adaptive filter that can further reduce the crosstalk component. The audio processing device 20D will be described below with reference to FIGS. 16, 17, and 18. The same configurations and operations as those described in the first embodiment and the fourth embodiment are denoted by the same reference signs, and the description thereof will be omitted or simplified.

Figure 16:
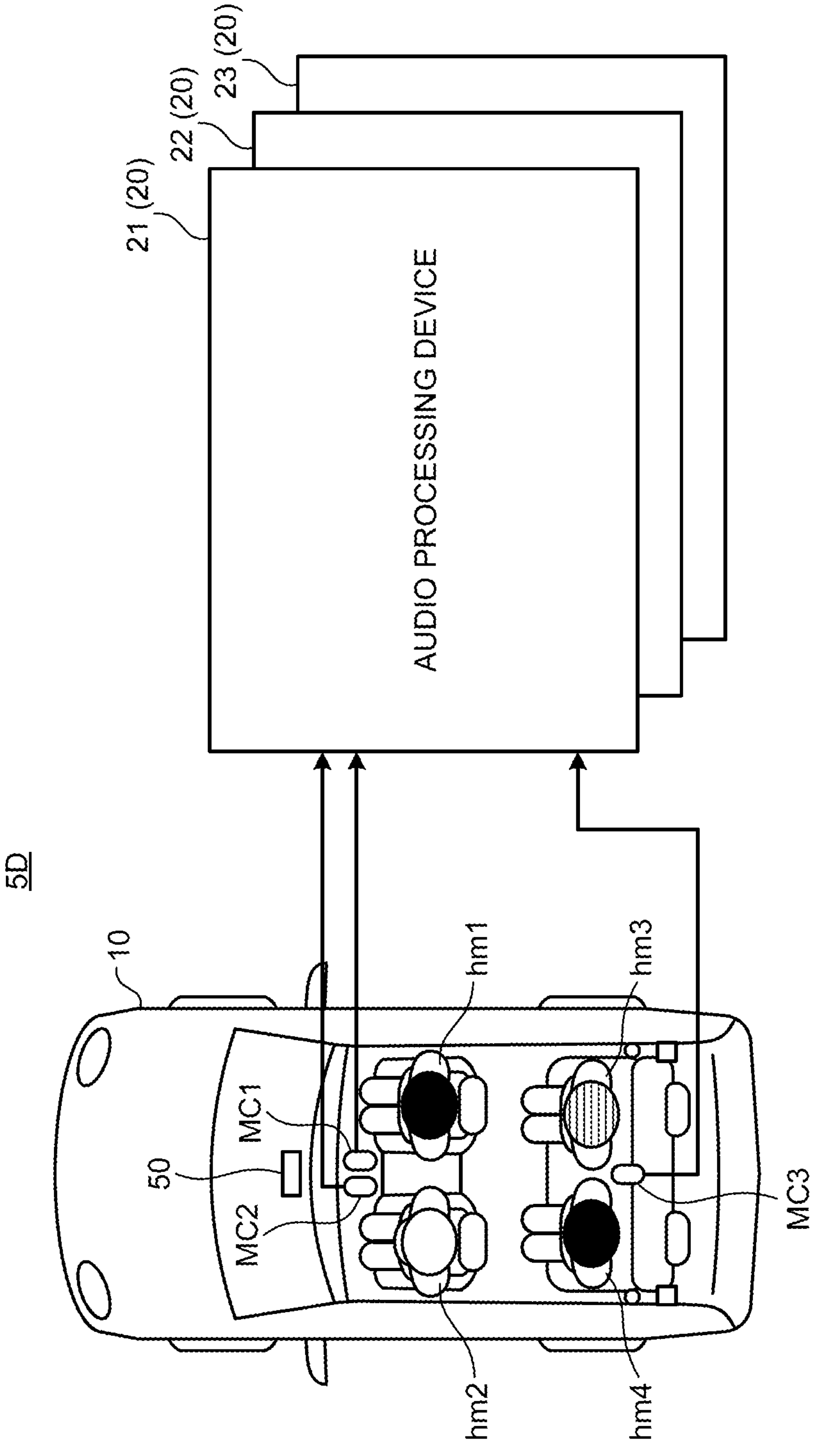
FIG. 16 illustrates one example of the schematic configuration of an audio processing system in a fifth embodiment.

Details of the audio processing system 5D according to the fifth embodiment will be described with reference to FIG. 16. FIG. 16 illustrates one example of the schematic configuration of the audio processing system 5D according to the fifth embodiment. The audio processing system 5D includes the microphone MC1, the microphone MC2, the microphone MC3, and audio processing devices 20D. Since the microphone MC1, the microphone MC2, and the microphone MC3 are similar to those in the first embodiment, detailed description thereof will be omitted.

In the embodiment, the audio processing system 5D includes a plurality of audio processing devices 20D that address the respective microphones. Specifically, the audio processing system 5D includes an audio processing device 21D, an audio processing device 22D, and an audio processing device 23D. The audio processing device 21D addresses the microphone MC1. The audio processing device 22D addresses the microphone MC2. The audio processing device 23D addresses the microphone MC3. The audio processing device 21D, the audio processing device 22D, and the audio processing device 23D may be collectively referred to as the audio processing devices 20D below.

Although, in the configuration in FIG. 16, the audio processing device 21D, the audio processing device 22D, and the audio processing device 23D are described as being configured by different pieces of hardware, one audio processing device 20D may implement the functions of the audio processing device 21D, the audio processing device 22D, and the audio processing device 23D. Alternatively, some of the audio processing device 21D, the audio processing device 22D, and the audio processing device 23D may be configured by common hardware, and the others may be configured by different pieces of hardware.

Also in the embodiment, each of the audio processing devices 20D is disposed in each seat near each corresponding microphone. The position of the audio processing device 20D is similar to that in the first embodiment, for example.

Figure 17:
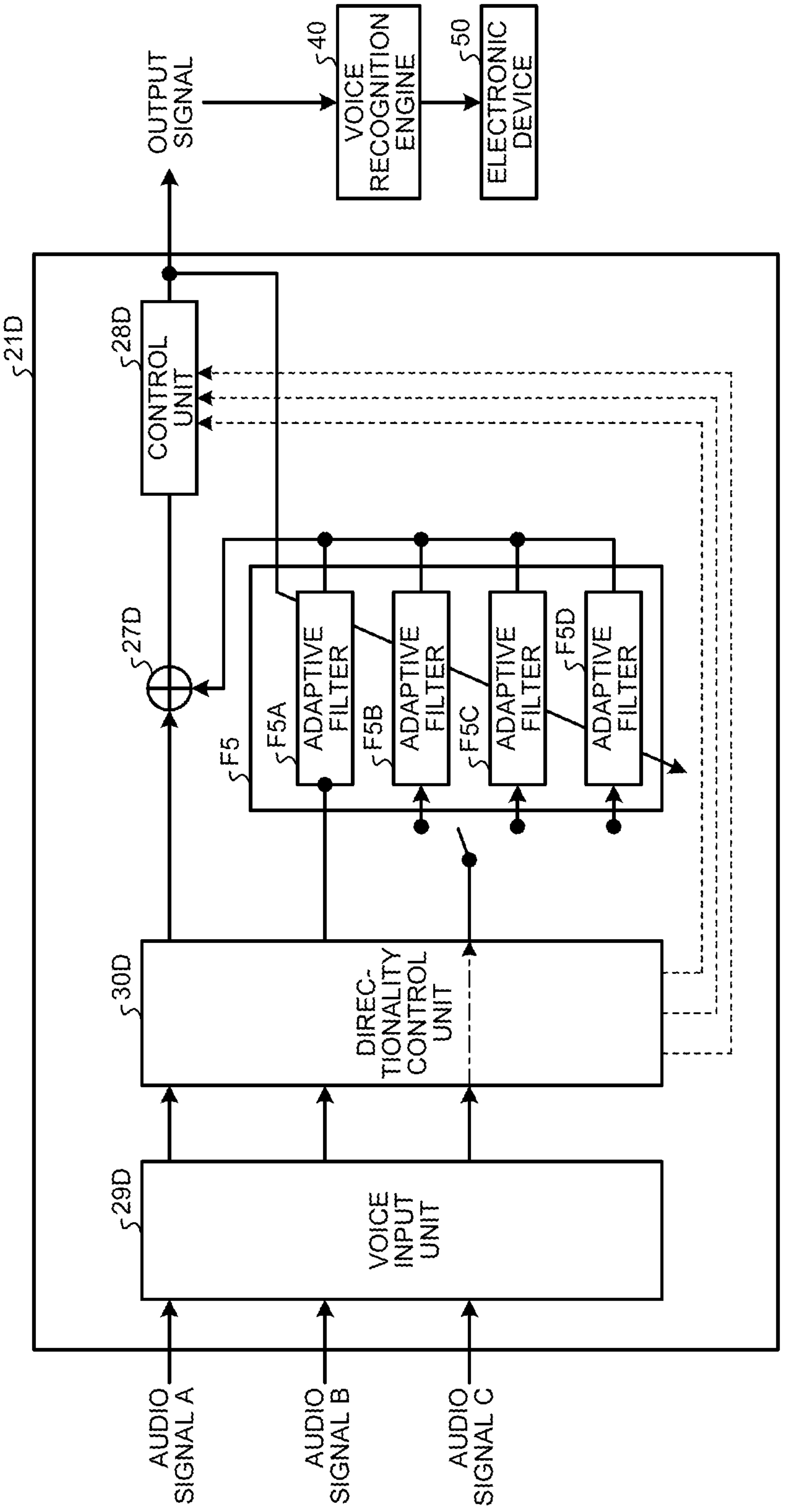
FIG. 17 is a block diagram illustrating the configuration of an audio processing device in the fifth embodiment.

FIG. 17 is a block diagram illustrating the configuration of the audio processing device 21D. All of the audio processing device 21D, the audio processing device 22D, and the audio processing device 23D have similar configurations and functions except for a part of the configuration of a filter unit to be described later. Here, the audio processing device 21D will be described. The audio processing device 21D sets voice uttered by the driver hm1 as a target component. The audio processing device 21D outputs, as an output signal, an audio signal obtained by inhibiting a crosstalk component of an audio signal collected by the microphone MC1.

As illustrated in FIG. 17, the audio processing device 21D includes a voice input unit 29D, a directionality control unit 30D, a filter unit F5, a control unit 28D, and an addition unit 27D. The filter unit F5 includes a plurality of adaptive filters. The control unit 28D controls the filter coefficients of the plurality of adaptive filters. Since the voice input unit 29D is similar to the voice input unit 29 in the first embodiment, the description thereof will be omitted.

Since the directionality control unit 30D is similar to the directionality control unit 30C in the fourth embodiment, the description thereof will be omitted. An audio processing device 5D may include an utterance determination unit serving as a determination unit. When including the utterance determination unit, the audio processing device 5D is not required to include the directionality control unit 30D.

The filter unit F5 includes an adaptive filter F5A, an adaptive filter F5B, an adaptive filter F5C, and an adaptive filter F5D. The filter unit F5 is used for processing of inhibiting a crosstalk component other than voice of the driver hm1 included in voice collected by the microphone MC1. Although, in the embodiment, the filter unit F5 includes four adaptive filters, the number of adaptive filters is appropriately set based on the number of input audio signals and a processing amount of the crosstalk inhibiting processing. The processing of inhibiting crosstalk will be described in detail later.

The second directional signal is input to the adaptive filter F5A as a reference signal. The adaptive filter F5A outputs a passing signal P5A based on a filter coefficient C5A and the second directional signal. The audio signal C is input to the adaptive filter F5B, the adaptive filter F5C, and the adaptive filter F5D as a reference signal. The adaptive filter F5B, the adaptive filter F5C, and the adaptive filter F5D correspond to two or more adaptive filters. The adaptive filter F5B corresponds to a first adaptive filter. The adaptive filter F5C corresponds to a second adaptive filter. The adaptive filter F5D corresponds to a third adaptive filter. An adaptive filter F5B outputs a passing signal P5B based on a filter coefficient C5B and the audio signal C. The passing signal P5B corresponds to a first passing signal. An adaptive filter F5C outputs a passing signal P5C based on a filter coefficient C5C and the audio signal C. The passing signal P5C corresponds to a second passing signal. An adaptive filter F5D outputs a passing signal P5D based on a filter coefficient C5D and audio signal C. The filter unit F5 outputs a subtraction signal SSA, a subtraction signal SSB, and a subtraction signal SSC. The subtraction signal SSA is obtained by adding together a passing signal P5A and the passing signal P5B. The subtraction signal SSB is obtained by adding together the passing signal P5A and the passing signal P5C. The subtraction signal SSC is obtained by adding together the passing signal P5A and the passing signal P5D. The subtraction signal SSA corresponds to a first subtraction signal. The subtraction signal SSB corresponds to a second subtraction signal. In the embodiment, the adaptive filter F5A, the adaptive filter F5B, the adaptive filter F5C, and the adaptive filter F5D are implemented by a processor executing a program. The adaptive filter F5A, the adaptive filter F5B, the adaptive filter F5C, and the adaptive filter F5D may have physically separated different hardware configurations.

The filter coefficient C5B of the adaptive filter F5B is updated such that an error signal is minimized when the audio signal C includes more voice of the occupant hm3. Furthermore, a filter coefficient C5C of the adaptive filter F5C is updated such that an error signal is minimized when the audio signal C includes more voice of the occupant hm4. In contrast, the filter coefficient C5D of the adaptive filter F5D is updated such that an error signal is minimized when the audio signal C includes both voice of the occupant hm3 and voice of the occupant hm4.

Although, in the embodiment, the filter unit F5 includes the adaptive filter F5B, the adaptive filter F5C, and the adaptive filter F5D as adaptive filters to which the audio signal C is input, the filter unit F5 may include only the adaptive filter F5B and the adaptive filter F5C as adaptive filters to which the audio signal C is input. In that case, an amount of processing of crosstalk cancellation to be described later can be reduced.

The addition unit 27D generates an output signal by subtracting a subtraction signal from the first directional signal, which is output from the voice input unit 29D and is a target audio signal. In the embodiment, each of an output signal OSA in the case of using the subtraction signal SSA, an output signal OSB in the case of using the subtraction signal SSB, and an output signal OSC in the case of using the subtraction signal SSC are generated. The output signal OSA corresponds to a first output signal. The output signal OSB corresponds to a second output signal. The addition unit 27D outputs the output signal OSA, the output signal OSB, and the output signal OSC to the control unit 28D.

The control unit 28D identifies an output signal having the smallest error signal with reference to the output signal OSA, the output signal OSB, and the output signal OSC output from the addition unit 27D. For example, when the audio signal C includes more voice of the occupant hm3, the output signal OSA has the smallest error signal. For example, when the audio signal C includes more voice of the occupant hm4, the output signal OSB has the smallest error signal. For example, when the audio signal C includes both voice of the occupant hm3 and voice of the occupant hm4, the output signal OSC has the smallest error signal. Then, the control unit 28D updates the filter coefficient of an adaptive filter that has been used to generate the output signal having the smallest error signal. A specific method of updating a filter coefficient is similar to that described in the first embodiment.

Furthermore, the control unit 28D outputs an output signal having the smallest error signal among the output signal OSA, the output signal OSB, and the output signal OSC. Use of the output signal is similar to that in the first embodiment.

In the embodiment, the functions of the voice input unit 29D, the directionality control unit 30D, the filter unit F5, the control unit 28D, and the addition unit 27D are implemented by a processor executing a program held in a memory. Alternatively, the voice input unit 29D, the directionality control unit 30D, the filter unit F5, the control unit 28D, and the addition unit 27D may be configured by different pieces of hardware.

Although the audio processing device 21D has been described, the audio processing device 22D and the audio processing device 23D also have substantially similar configurations except for the filter unit. The audio processing device 22D sets voice uttered by the occupant hm2 as a target component. The audio processing device 22D outputs, as an output signal, an audio signal obtained by inhibiting a crosstalk component of an audio signal collected by the microphone MC2. Therefore, the audio processing device 22D is different from the audio processing device 21D in that the audio processing device 22D includes a filter unit to which the first directional signal and the audio signal C are input. The same applies to the audio processing device 23D.

Figure 18:
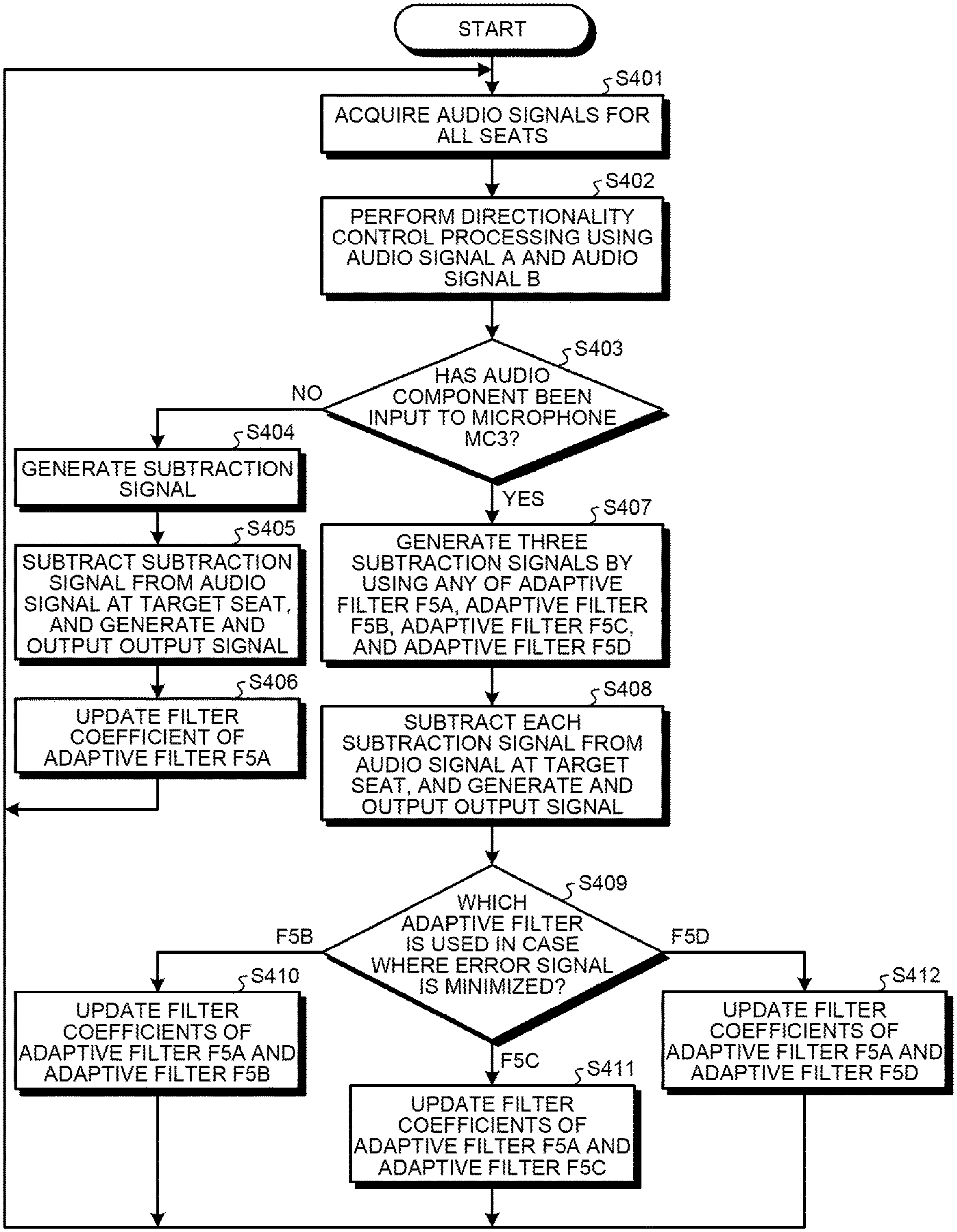
FIG. 18 is a flowchart illustrating an operation procedure of the audio processing device in the fifth embodiment.

FIG. 18 is a flowchart illustrating an operation procedure of the audio processing device 21D. First, the audio signal A, the audio signal B, and the audio signal C are input to the voice input unit 29D (S401). Next, the directionality control unit 30D performs directionality control processing using the audio signal A and the audio signal B, and generates the first directional signal and the second directional signal (S402). Then, the directionality control unit 30D determines whether an audio component has been input to the microphone MC3 by a method similar to that in the first embodiment (S403). The directionality control unit 30D outputs the determination result to the control unit 28D as a flag. When the directionality control unit 30D determines that the audio signal has not been input to the microphone MC3 (S403: No), the control unit 28D causes the strength of the audio signal C input to the filter unit F5 to be zero, and does not change the strength of the second directional signal. Then, the filter unit F5 generates a subtraction signal as follows (S404). The adaptive filter F5A passes the second directional signal, and outputs the passing signal P5A. The adaptive filter F5B passes the audio signal C, and outputs the passing signal P5B. The adaptive filter F5C passes the audio signal C, and outputs the passing signal P5C. The adaptive filter F5D passes the audio signal C, and outputs the passing signal P5D. The filter unit F5 adds together the passing signal P5A, the passing signal P5B, the passing signal P5C, and the passing signal P5D, and outputs these signals as a subtraction signal. The addition unit 27D subtracts the subtraction signal from the first directional signal, and generates and outputs an output signal (S405). The output signal is input to the control unit 28D, and output from the control unit 28D. Next, the control unit 28D updates the filter coefficient of the adaptive filter F5A based on the output signal so that the target component included in the output signal is maximized (S406). Then, the audio processing device 21 performs Step S1 again.

When the directionality control unit 30D determines that an audio signal has been input to the microphone MC3 (S403: Yes), the control unit 28D controls the filter unit F5 such that the audio signal C is input to each of the adaptive filter F5B, the adaptive filter F5C, and the adaptive filter F5D. In other words, the control unit 28D does not change the strength of the second directional signal input to the adaptive filter F5A and the strength of the audio signal C input to the adaptive filter F5B, the adaptive filter F5C, and the adaptive filter F5D. Then, the filter unit F5 generates a subtraction signal as follows (S407). The filter unit F5 generates the subtraction signal SSA, the subtraction signal SSB, and the subtraction signal SSC, and outputs these subtraction signals to the addition unit 27D. The subtraction signal SSA is obtained by adding together a passing signal P5A and the passing signal P5B. The subtraction signal SSB is obtained by adding together the passing signal P5A and the passing signal P5C. The subtraction signal SSC is obtained by adding together the passing signal P5A and the passing signal P5D. The addition unit 27D generates an output signal, and outputs the output signal to the control unit 28D as follows (S408). An addition unit 27D subtracts the subtraction signal SSA from the first directional signal, and generates the output signal OSA to output the output signal OSA to the control unit 28D. The addition unit 27D subtracts the subtraction signal SSB from the first directional signal, and generates the output signal OSB to output the output signal OSB to the control unit 28D. Furthermore, the addition unit 27D subtracts the subtraction signal SSC from the first directional signal, and generates the output signal OSC to output the output signal OSA to the control unit 28D. Next, the control unit 28D determines which adaptive filter is used in the case where an error signal is minimized based on the output signal OSA, the output signal OSB, and the output signal OSC (S409). When determining that the error signal is minimized in the case of using the adaptive filter F5B, the control unit 28D updates the filter coefficient of the adaptive filter to which an audio signal is input such that the target component included in the output signal OSA is maximized (S410). Specifically, the filter coefficients of the adaptive filter F5A and the adaptive filter F5B are updated. Then, the audio processing device 21D performs Step S401 again.

When determining, in Step S409, that the error signal is minimized in the case of using the adaptive filter F5C, the control unit 28D updates the filter coefficient of the adaptive filter to which an audio signal is input such that the target component included in the output signal OSB is maximized (S411). Specifically, the filter coefficients of the adaptive filter F5A and the adaptive filter F5C are updated. Then, the audio processing device 21D performs Step S401 again.

When determining, in Step S409, that the error signal is minimized in the case of using the adaptive filter F5D, the control unit 28D updates the filter coefficient of the adaptive filter to which an audio signal is input such that the target component included in the output signal OSC is maximized (S412). Specifically, the filter coefficients of the adaptive filter F5A and the adaptive filter F5D are updated. Then, the audio processing device 21D performs Step S401 again.

In the embodiment, the filter coefficient is not updated for an adaptive filter to which an audio signal is input with a strength of zero. This can reduce a processing amount of the control unit 28D as compared with that in a case where the filter coefficients of all adaptive filters are constantly updated. In contrast, the control unit 28D may constantly update the filter coefficients of all the adaptive filters. The control unit 28D can constantly perform the same processing by constantly updating the filter coefficients of all the adaptive filters, so that the processing is simplified. Furthermore, the filter coefficient of a certain adaptive filter can be accurately updated by constantly updating the filter coefficients of all the adaptive filters, for example, even immediately after the change from a state in which an audio signal with a strength of zero is input to a state in which an audio signal with a strength of not zero is input.

As described above, the audio processing system 5D in the fifth embodiment also determines voice of a specific speaker with high accuracy by acquiring a plurality of audio signals with a plurality of microphones and subtracting a subtraction signal generated by using an adaptive filter from a certain audio signal by using another audio signal as a reference signal. In the fifth embodiment, one microphone can collect a plurality of pieces of voice generated at different positions. Specifically, the audio processing system 5D collects voice of the occupant hm3 and voice of the occupant hm4 in the rear seats with the microphone MC3. Then, the audio processing system 5D generates each of output signals in the case where the audio signal C is input to the adaptive filter F5B, the adaptive filter F5C, and the adaptive filter F5D, and identifies an output signal in the case where the error signal is minimized. This allows an audio signal of a target component to be accurately determined even when one microphone collects a plurality of pieces of voice. Therefore, since a microphone is not required to be provided one by one for each seat, costs can be reduced. Furthermore, when a target component is determined by using an adaptive filter, the number of reference signals used for processing can be reduced as compared with that in a case where signals output from microphones provided for all the seats are used as reference signals. This can reduce an amount of processing of canceling a crosstalk component. Furthermore, in the fifth embodiment, processing of determining voice of which occupant an audio signal includes is not performed. Therefore, an amount of processing of canceling a crosstalk component can be reduced. Furthermore, the filter coefficient is not required to be updated for an adaptive filter to which an audio signal is input with a strength of zero. This can further reduce a processing amount as compared with that in a case where the filter coefficients are constantly updated for all adaptive filters.

Sixth Embodiment

An audio processing system 5E according to a sixth embodiment is different from the audio processing system 5A according to the second embodiment in that the audio processing system 5E includes an audio processing device 20E instead of the audio processing device 20A. The audio processing device 20E according to the sixth embodiment performs processing of canceling a crosstalk component by using a result obtained by adding up audio signals output from a plurality of microphones as a reference signal. The audio processing device 20E will be described below with reference to FIGS. 19, 20, and 21. The same configurations and operations as those described in the first embodiment and the second embodiment are denoted by the same reference signs, and the description thereof will be omitted or simplified.

Figure 19:
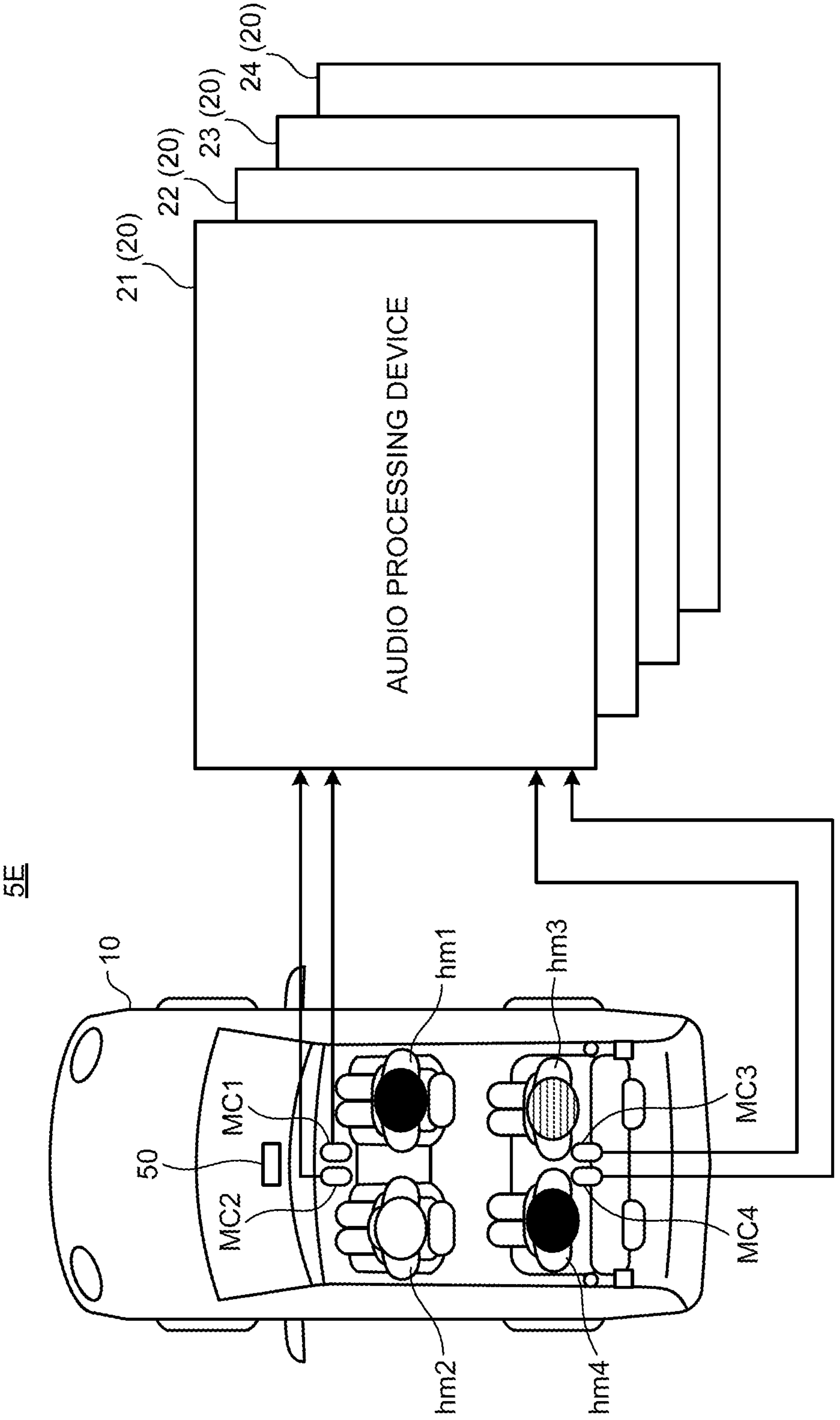
FIG. 19 illustrates one example of the schematic configuration of an audio processing system in a sixth embodiment.

Details of the audio processing system 5E according to the sixth embodiment will be described with reference to FIG. 19. FIG. 19 illustrates one example of the schematic configuration of the audio processing system 5E according to the sixth embodiment. The audio processing system 5E includes the microphone MC1, the microphone MC2, the microphone MC3, the microphone MC4, and the audio processing device 20E. Since the microphone MC1, the microphone MC2, the microphone MC3, and the microphone MC4 are similar to those in the second embodiment, detailed description thereof will be omitted.

In the embodiment, the audio processing system 5E includes a plurality of audio processing devices 20E that address the respective microphones. Specifically, the audio processing system 5E includes an audio processing device 21E, an audio processing device 22E, an audio processing device 23E, and an audio processing device 24E. The audio processing device 21E addresses the microphone MC1. The audio processing device 22E addresses the microphone MC2. The audio processing device 23E addresses the microphone MC3. The audio processing device 24E addresses the microphone MC4. The audio processing device 21E, the audio processing device 22E, the audio processing device 23E, and the audio processing device 24E may be collectively referred to as the audio processing devices 20E below.

Although, in the configuration in FIG. 19, the audio processing device 21E, the audio processing device 22E, the audio processing device 23E, and the audio processing device 24E are described as being configured by different pieces of hardware, one audio processing device 20E may implement the functions of the audio processing device 21E, the audio processing device 22E, the audio processing device 23E, and the audio processing device 24E. Alternatively, some of the audio processing device 21E, the audio processing device 22E, the audio processing device 23E, and the audio processing device 24E may be configured by common hardware, and the others may be configured by different pieces of hardware.

In the embodiment, each of the audio processing devices 20E is disposed in each seat near each corresponding microphone. The position of the audio processing device 20E is similar to that in the second embodiment, for example.

Figure 20:
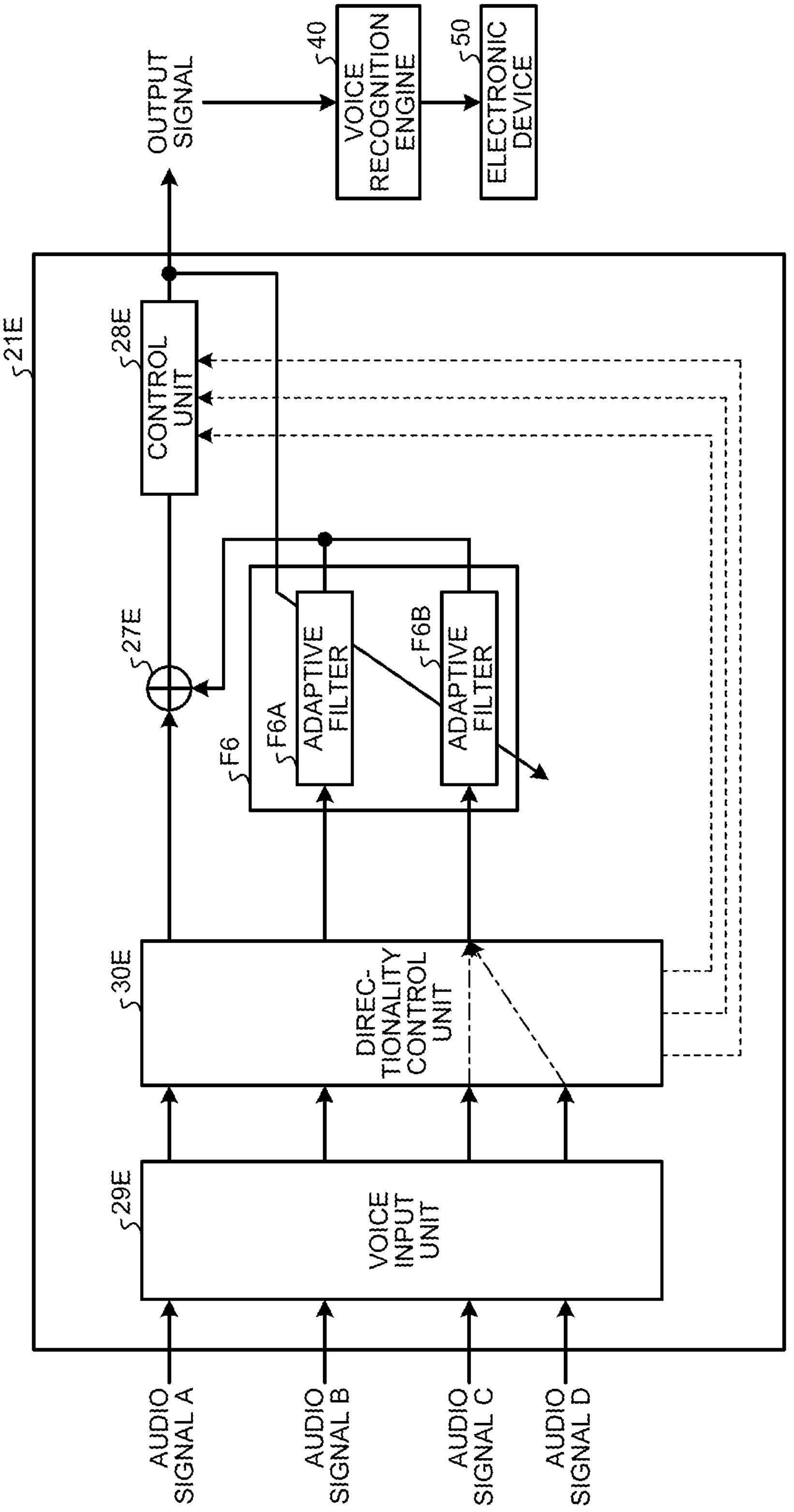
FIG. 20 is a block diagram illustrating the configuration of an audio processing device in the sixth embodiment.

FIG. 20 is a block diagram illustrating the configuration of the audio processing device 21E. All of the audio processing device 21E, the audio processing device 22E, the audio processing device 23E, and the audio processing device 24E have similar configurations and functions except for a part of the configuration of a filter unit to be described later. Here, the audio processing device 21E will be described. The audio processing device 21E sets voice uttered by the driver hm1 as a target. The audio processing device 21E outputs, as an output signal, an audio signal obtained by inhibiting a crosstalk component of an audio signal collected by the microphone MC1.

As illustrated in FIG. 20, the audio processing device 21E includes a voice input unit 29E, a directionality control unit 30E, a filter unit F6, a control unit 28E, and an addition unit 27E. The filter unit F6 includes a plurality of adaptive filters. The control unit 28E controls the filter coefficients of the adaptive filters of the filter unit F6.

Since the voice input unit 29E is similar to the voice input unit 29A in the second embodiment, the description thereof will be omitted.

The audio signal A, the audio signal B, the audio signal C, and the audio signal D output from the voice input unit 29E are input to the directionality control unit 30E. The directionality control unit 30E performs the directionality control processing by using audio signals output from a microphone near a seat of a target occupant and a microphone on the same side as the microphone. Since the audio processing device 21E targets voice uttered by the driver hm1, the directionality control unit 30E performs the directionality control processing by using the audio signal A and the audio signal B. Then, the directionality control unit 30E outputs two directional signals obtained by performing the directionality control processing by using two audio signals. For example, the directionality control unit 30E outputs a first directional signal obtained by performing the directionality control processing on the audio signal A. Furthermore, the directionality control unit 30E outputs a second directional signal obtained by performing the directionality control processing on the audio signal B. The directionality control unit 30E may perform the directionality control processing by using all the audio signals, and output the obtained directional signal. For example, in addition to the first directional signal and the second directional signal, the directionality control unit 30E outputs a third directional signal and a fourth directional signal. The third directional signal is obtained by performing the directionality control processing on the audio signal C. The fourth directional signal is obtained by performing the directionality control processing on the audio signal D.

Furthermore, the directionality control unit 30E determines whether an audio component has been input to a microphone on the side different from the microphone near the seat of the target occupant. Specifically, the directionality control unit 30E determines whether an audio component has been input to the microphone MC3 and the microphone MC4. For example, the directionality control unit 30 determines that an audio signal has been input to the microphone MC3 when the audio signal C has a strength greater than at least one of the strength of the first directional signal and the strength of the second directional signal, and determines that no audio signal has been input to the microphone MC3 when this is not the case. The same applies to the microphone MC4.

Although, in the embodiment, the directionality control unit 30E determines whether an audio component has been input to the microphone on the side different from the microphone near the seat of the target occupant, the audio processing device 21E may include an utterance determination unit serving as a determination unit separately from the directionality control unit 30E, and the utterance determination unit may make the determination. In that case, the utterance determination unit is connected between the voice input unit 29E and the directionality control unit 30E, for example. Since the utterance determination unit has a configuration and a function similar to those described in the first embodiment, detailed description thereof will be omitted. When including the utterance determination unit, the audio processing system 5E is not required to include the directionality control unit 30E.

The filter unit F6 includes an adaptive filter F6A and an adaptive filter F6B. The filter unit F6 is used for processing of inhibiting a crosstalk component other than voice of the driver hm1 included in voice collected by the microphone MC1. Although, in the embodiment, the filter unit F6 includes two adaptive filters, the number of adaptive filters is appropriately set based on the number of input audio signals and a processing amount of the crosstalk inhibiting processing. The processing of inhibiting crosstalk will be described in detail later.

The second directional signal is input to the adaptive filter F6A as a reference signal. The adaptive filter F6A outputs a passing signal P6A based on a filter coefficient C6A and the second directional signal. The audio signal C and the audio signal D are input to the adaptive filter F6B as reference signals. The adaptive filter F6B outputs a passing signal P62B based on a filter coefficient C6B, the audio signal C, and the audio signal D. The adaptive filter F6B corresponds to "the adaptive filter to which the first signal and the second signal are input". The filter unit F6 adds together and outputs the passing signal P6A and a passing signal P6B. In the embodiment, the adaptive filter F6A and the adaptive filter F6B are implemented by a processor executing a program. The adaptive filter F6A and the adaptive filter F6B may have physically separated different hardware configurations.

The addition unit 27E generates an output signal by subtracting a subtraction signal from the first directional signal, which is output from the voice input unit 29E and is a target audio signal. In the embodiment, the subtraction signal is obtained by adding together the passing signal P6A and the passing signal P6B output from the filter unit F6. The addition unit 27E outputs an output signal to the control unit 28E.

The control unit 28E outputs the output signal output from the addition unit 27E. The output signal of the control unit 28E is input to the voice recognition engine 40. Alternatively, the output signal may be directly input from the control unit 28E to the electronic device 50. When the output signal is directly input from the control unit 28E to the electronic device 50, the control unit 28E and the electronic device 50 may be connected by wire or wirelessly. For example, the electronic device 50 may be a mobile terminal, and the output signal may be directly input from the control unit 28E to the mobile terminal via a wireless communication network. The output signal input to the mobile terminal may be output as voice from a speaker of the mobile terminal.

Furthermore, the control unit 28E updates the filter coefficient of each adaptive filter based on the output signal output from the addition unit 27E. The control unit 28E updates the filter coefficient of each adaptive filter such that the value of the error signal in Expression (1) approaches zero. A specific method of updating a filter coefficient is similar to that described in the first embodiment.

In the embodiment, the functions of the voice input unit 29E, the directionality control unit 30E, the filter unit F6, the control unit 28E, and the addition unit 27E are implemented by a processor executing a program held in a memory. Alternatively, the voice input unit 29E, the directionality control unit 30E, the filter unit F6, the control unit 28E, and the addition unit 27E may be configured by different pieces of hardware.

Although the audio processing device 21E has been described, the audio processing device 22E, the audio processing device 23E, and an audio processing device 24E also have substantially similar configurations except for the filter unit. The audio processing device 22E sets voice uttered by the occupant hm2 as a target component. The audio processing device 22E outputs, as an output signal, an audio signal obtained by inhibiting a crosstalk component of an audio signal collected by the microphone MC2. Therefore, the audio processing device 22E is different from the audio processing device 21E in that the audio processing device 22E includes a filter unit to which the first directional signal, the audio signal C, and the audio signal D are input. The same applies to the audio processing device 23E and the audio processing device 24E.

Figure 21:
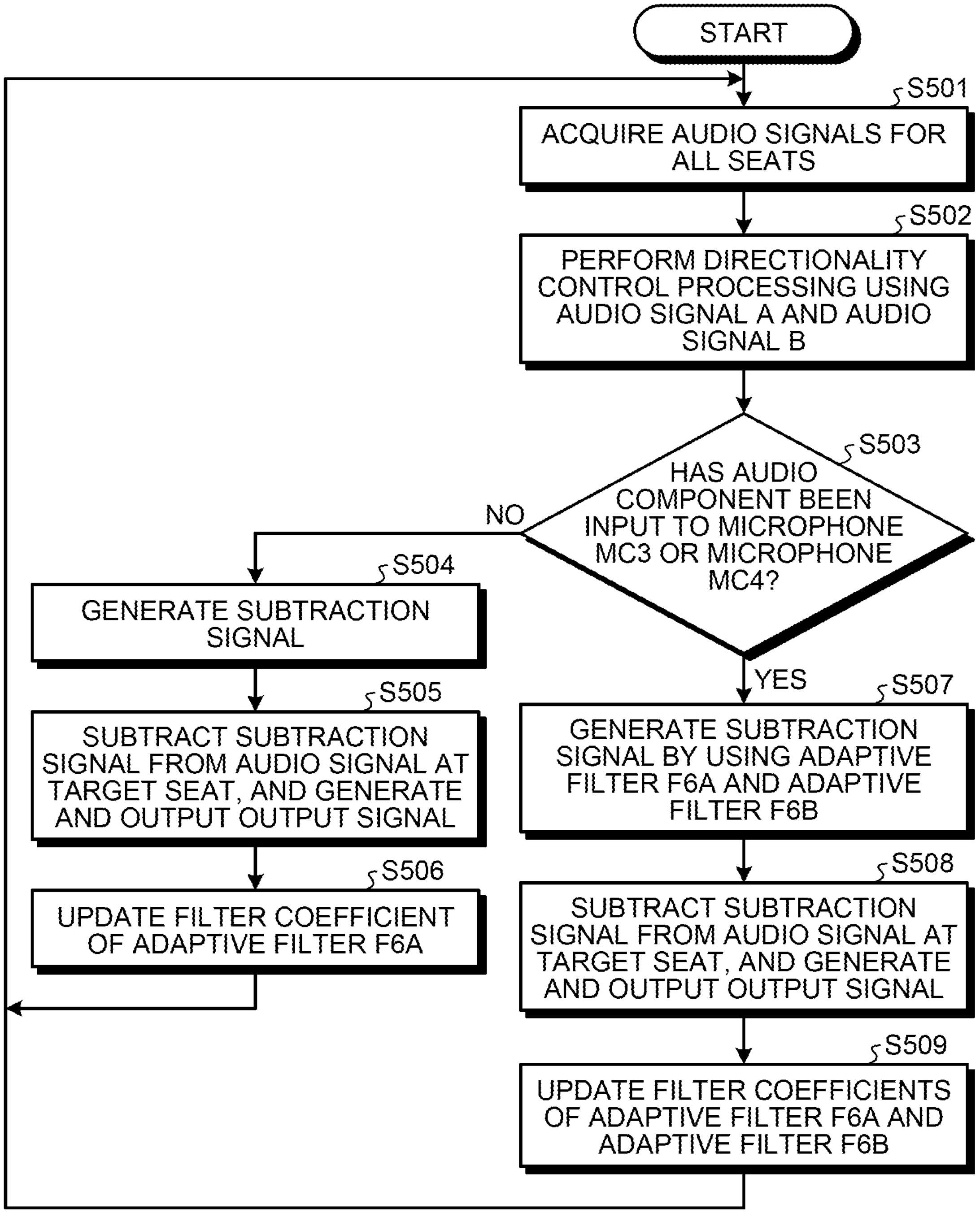
FIG. 21 is a flowchart illustrating an operation procedure of the audio processing device in the sixth embodiment.

FIG. 21 is a flowchart illustrating an operation procedure of the audio processing device 21E. First, the audio signal A, the audio signal B, the audio signal C, and the audio signal D are input to the voice input unit 29E (S501). Next, the directionality control unit 30E performs directionality control processing using the audio signal A and the audio signal B, and generates the first directional signal and the second directional signal (S502). Then, the directionality control unit 30E determines whether an audio component has been input to the microphone MC3 or the microphone MC4 by a method similar to that in the first embodiment (S503). The directionality control unit 30E outputs the determination result to the control unit 28E as a flag. When the directionality control unit 30E determines that the audio signal has not been input to the microphone MC3 or the microphone MC4 (S503: No), the control unit 28E sets the strengths of the audio signal C and the audio signal D input to the filter unit F6 to zero, and does not change the strength of the second directional signal. Then, the filter unit F6 generates a subtraction signal as follows (S504). The adaptive filter F6A passes the second directional signal, and outputs the passing signal P6A. The adaptive filter F6B passes the audio signal C and the audio signal D, and outputs the passing signal P6B. The filter unit F6 adds together the passing signal P5A and the passing signal P5B, and outputs these signals as a subtraction signal. The addition unit 27E subtracts the subtraction signal from the first directional signal, and generates and outputs an output signal (S505). The output signal is input to the control unit 28E, and output from the control unit 28E. Next, the control unit 28E updates the filter coefficient of the adaptive filter F6A based on the output signal so that the target component included in the output signal is maximized (S506). Then, the audio processing device 21E performs Step S501 again.

When the directionality control unit 30E determines that the audio signal has been input to the microphone MC3 or the microphone MC4 in Step S503 (S503: Yes), the control unit 28E controls the filter unit F6 such that the audio signal C and the audio signal D are input to the adaptive filter F6B without change in the strengths. In other words, the control unit 28E does not change the strength of the second directional signal input to the adaptive filter F6A and the strengths of the audio signals C and the audio signal D input to the adaptive filter F6B. The filter unit F6 generates a subtraction signal obtained by adding together the passing signal P6A and the passing signal P6B, and outputs the subtraction signal to the addition unit 27E (S507). The addition unit 27E subtracts the subtraction signal from the first directional signal, generates an output signal, and outputs the output signal to the control unit 28E (S508). The control unit 28E updates the filter coefficient of the adaptive filter to which an audio signal is input so that the target component included in the output signal is maximized (S509). Specifically, the filter coefficients of the adaptive filter F6A and the adaptive filter F6B are updated. Then, the audio processing device 21E performs Step S501 again.

In the embodiment, the filter coefficient is not updated for an adaptive filter to which an audio signal is input with a strength of zero. This can reduce a processing amount of the control unit 28E as compared with that in a case where the filter coefficients of all adaptive filters are constantly updated. In contrast, the control unit 28E may constantly update the filter coefficients of all the adaptive filters. The control unit 28E can constantly perform the same processing by constantly updating the filter coefficients of all the adaptive filters, so that the processing is simplified. Furthermore, the filter coefficient of a certain adaptive filter can be accurately updated by constantly updating the filter coefficients of all the adaptive filters, for example, even immediately after the change from a state in which an audio signal with a strength of zero is input to a state in which an audio signal with a strength of not zero is input.

As described above, the audio processing system 5E in the sixth embodiment also determines voice of a specific speaker with high accuracy by acquiring a plurality of audio signals with a plurality of microphones and subtracting a subtraction signal generated by using an adaptive filter from a certain audio signal by using another audio signal as a reference signal. In the sixth embodiment, a result of adding together a plurality of audio signals is used as a reference signal. As a result, audio signals can be collected individually at each seat while an amount of processing of canceling a crosstalk component can be reduced as compared with a case where all signals obtained at each seat are used as reference signals. Specifically, the audio processing system 5E individually collects voice of the occupant hm3 and voice of the occupant hm4 in the rear seats with the microphone MC3 and the microphone MC4. Then, the audio processing system 5E inputs both the audio signal C and the audio signal D to the adaptive filter F6B, and uses these audio signals as reference signals. Furthermore, in the sixth embodiment, processing of determining voice of which occupant an audio signal includes is not performed. Therefore, an amount of processing of canceling a crosstalk component can be reduced. Furthermore, the filter coefficient is not required to be updated for an adaptive filter to which an audio signal is input with a strength of zero. This can further reduce a processing amount as compared with that in a case where the filter coefficients are constantly updated for all adaptive filters.

Item 1 (Fourth Embodiment)

An audio processing system including:

a first microphone that acquires a first audio signal and outputs a first signal based on the first audio signal, the first audio signal including at least one of a first audio component generated at a first position and a second audio component generated at a second position different from the first position;

an adaptive filter that receives the first signal and outputs a passing signal based on the first signal; and a control unit that controls a filter coefficient of the adaptive filter, both when the first audio signal includes the first audio component and when the first audio signal includes the second audio component, the first signal is input to the adaptive filter.

Item 2 (Fifth Embodiment)

An audio processing system including:

a first microphone that acquires a first audio signal and outputs a first signal based on the first audio signal, the first audio signal including at least one of a first audio component generated at a first position and a second audio component generated at a second position different from the first position;

a second microphone that acquires a second audio signal including at least one of the first audio component and the second audio component, outputs a second signal based on the second audio signal, and is located farther from the first position than the first microphone is;

a third microphone that acquires a third audio signal including at least one of the first audio component and the second audio component, outputs a third signal based on the third audio signal, and is located farther from the second position than the first microphone is;

two or more adaptive filters that receive the first signal and output a passing signal based on the first signal;

a control unit that controls filter coefficients of the two or more adaptive filters; and an addition unit that subtracts a subtraction signal based on the passing signal from the second signal or the third signal, wherein the two or more adaptive filters include a first adaptive filter and a second adaptive filter, the first adaptive filter receives the first signal, and outputs a first passing signal based on the first signal, the second adaptive filter receives the first signal, and outputs a second passing signal based on the first signal, the addition unit outputs a first output signal obtained by subtracting a first subtraction signal based on the first passing signal from the second signal or the third signal and a second output signal obtained by subtracting a second subtraction signal based on the second passing signal from the second signal or the third signal, and the control unit determines which of the first adaptive filter and the second adaptive filter is to be used to generate the subtraction signal based on the first output signal and the second output signal.

Item 3

The audio processing system according to Item 2, wherein, when the first audio signal includes the first audio component, the first signal is input to the first adaptive filter, and when the first audio signal includes the second audio component, the first signal is input to the second adaptive filter.

Item 4

The audio processing system according to Item 3, wherein the two or more adaptive filters include a third adaptive filter, and when the first audio signal includes the first audio component and the second audio component, the first signal is input to the third adaptive filter.

Item 5 (Sixth Embodiment)

An audio processing system including:

a first microphone that acquires a first audio signal and outputs a first signal based on the first audio signal, the first audio signal including at least one of a first audio component generated at a first position and a second audio component generated at a second position different from the first position;

a second microphone that acquires a second audio signal including at least one of the first audio component and the second audio component, outputs a second signal based on the second audio signal, and is located farther from the second position than the first microphone is;

a third microphone that acquires a third audio signal including at least one of the first audio component and the second audio component, outputs a third signal based on the third audio signal, and is located farther from the first position than the first microphone is or located farther from the second position than the second microphone is;

an adaptive filter that receives the first signal and the second signal and outputs a passing signal based on the first signal and the second signal; and an addition unit that subtracts a subtraction signal based on the passing signal from the third signal.

Item 6

The audio processing system according to Item 5, further including:

a fourth microphone that acquires a fourth audio signal including at least one of the first audio component and the second audio component, outputs a fourth signal based on the fourth audio signal, and is located farther from the second position than the first microphone and the second microphone are; and a directionality control unit that performs directionality control processing on the third signal to output a first directional signal, and performs directionality control processing on the fourth signal to output a second directional signal, wherein the third microphone is located farther from the first position than the first microphone is.

According to the present disclosure, target voice can be obtained by removing surrounding voice even when the number of voice collection devices is smaller than the number of voice sources that can emit voice. Alternatively, according to the present disclosure, an amount of processing for obtaining target voice by removing surrounding voice can be reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audio processing system comprising:

a first microphone that acquires a first audio signal and outputs a first signal based on the first audio signal, the first audio signal including a first audio component originating from a first position and a second audio component originating from a second position different from the first position;

a second microphone that acquires a second audio signal including at least one of the first audio component and the second audio component, outputs a second signal based on the second audio signal, the second microphone being located farther from the first position than the first microphone;

a third microphone that acquires a third audio signal including at least one of the first audio component and the second audio component and outputs a third signal based on the third audio signal, the third microphone being located farther from the second position than the first microphone;

an adaptive filter having a first filter coefficient and a second filter coefficient different from the first filter coefficient, the adaptive filter receives the first signal and outputs a passing signal based on the first signal;

a memory; and a processor that is coupled to the memory, and, when executing a program stored in the memory:

determines whether the first audio signal includes more of the first audio component or more of the second audio component based on the second signal and the third signal, wherein when the processor determines that the first audio signal includes more of the first audio component than the second audio component, the adaptive filter outputs the passing signal based on the first signal and the first filter coefficient, and when the processor determines that the first audio signal includes more of the second audio component than the first audio component, the adaptive filter outputs the passing signal based on the first signal and the second filter coefficient.

2. The audio processing system according to claim 1, wherein the processor further performs outputting a first directional signal obtained by performing directionality control processing on the second signal and outputting a second directional signal obtained by performing directionality control processing on the third signal.

3. The audio processing system according to claim 2, wherein the processor determines whether the first audio signal includes more of the first audio component or more of the second audio component based on the first directional signal and the second directional signal.

4. The audio processing system according to claim 2, wherein the processor functions as:

a determination unit that makes the determination; and a directionality control unit that outputs the first directional signal and the second directional signal, and the directionality control unit includes the determination unit.

5. The audio processing system according to claim 1, wherein the first microphone comprises:

a fourth microphone that acquires a fourth audio signal including at least one of the first audio component and the second audio component and outputs a fourth signal based on the fourth audio signal; and a fifth microphone that acquires a fifth audio signal including at least one of the first audio component and the second audio component, outputs a fifth signal based on the fifth audio signal, and is located closer to the second position than the fourth microphone is, the processor further performs detecting presence or absence of abnormality of the first microphone, and the processor performs controlling a filter coefficient of the adaptive filter based on abnormality information on the abnormality of the first microphone and the result of the determination.

6. The audio processing system according to claim 5, wherein the processor performs causing a strength of the fourth signal input to the adaptive filter to be zero when detecting abnormality of the fourth microphone, and causing a strength of the fifth signal input to the adaptive filter to be zero when detecting abnormality of the fifth microphone.

7. The audio processing system according to claim 5, wherein the processor functions as:

a determination unit that makes the determination; and an abnormality detection unit that detects presence or absence of the abnormality and transmits the abnormality information, and the abnormality detection unit includes the determination unit.

8. An audio processing device comprising:

a memory;

a processor that is coupled to the memory, and, when executing a program stored in the memory, performs receiving a first signal based on a first audio signal including a first audio component originating from a first position and a second audio component originating from a second position different from the first position; and an adaptive filter to which the first signal is input and that outputs a passing signal based on the first signal, and the processor further performs:

making a determination whether the first audio signal includes more of the first audio component or more of the second audio component based on a second signal and a third signal; and controlling a filter coefficient of the adaptive filter based on a result of the determination, wherein the adaptive filter has a first filter coefficient and a second filter coefficient different from the first filter coefficient, when the processor determines that the first audio signal includes more of the first audio component than the second audio component, the adaptive filter outputs the passing signal based on the first signal and the first filter coefficient, and when the processor determines that the first audio signal includes more of the second audio component than the first audio component, the adaptive filter outputs the passing signal based on the first signal and the second filter coefficient.

9. An audio processing method executed in an audio processing device, comprising:

receiving a first signal based on a first audio signal including a first audio component originating from a first position and a second audio component originating from a second position different from the first position;

providing the first signal to an adaptive filter having a first filter coefficient and a second filter coefficient different from the first filter coefficient;

outputting, by the adaptive filter, a passing signal based on the first signal;

determining whether the first audio signal includes more of which of the first audio component or more of the second audio component based on a second signal and a third signal; and controlling a filter coefficient of the adaptive filter based on a result of the determination, wherein in response to determining that the first audio signal includes more of the first audio component than the second audio component, controlling the filter coefficient includes controlling the adaptive filter to output the passing signal based on the first signal and the first filter coefficient, and in response to determining that the first audio signal includes more of the second audio component than the first audio component, controlling the filter coefficient includes controlling the adaptive filter to output the passing signal based on the first signal and the second filter coefficient.

* * * * *